United States Patent [19]
Shimamura

[11] Patent Number: 6,100,997
[45] Date of Patent: Aug. 8, 2000

[54] IMAGE HALF-TONE PROCESSOR AND METHOD THEREOF

[75] Inventor: Kaoru Shimamura, Kawasaki, Japan

[73] Assignee: Fujitsu Limited, Kawasaki, Japan

[21] Appl. No.: 08/860,282

[22] PCT Filed: Oct. 18, 1996

[86] PCT No.: PCT/JP96/03036

§ 371 Date: Jun. 17, 1997

§ 102(e) Date: Jun. 17, 1997

[87] PCT Pub. No.: WO97/15029

PCT Pub. Date: Apr. 24, 1997

[30] Foreign Application Priority Data

Oct. 20, 1995 [JP] Japan .................................. 7-273184

[51] Int. Cl.[7] .................................................. H04N 1/405
[52] U.S. Cl. .......................... 358/1.9; 358/456; 358/458; 358/462
[58] Field of Search .......................... 358/1.9, 456, 298, 358/458, 462, 466; 382/237, 270

[56] References Cited

FOREIGN PATENT DOCUMENTS

| 0448109A2 | 9/1991 | European Pat. Off. . |
|---|---|---|
| 1-282967 | 11/1989 | Japan . |
| 5-40826 | 2/1993 | Japan . |
| 5-160996 | 6/1993 | Japan . |
| 6-130908 | 5/1994 | Japan . |
| 6-168322 | 6/1994 | Japan . |
| 7-199903 | 8/1995 | Japan . |

OTHER PUBLICATIONS

Partial European Search Report dated Jan. 28, 1999.

*Primary Examiner*—Scott Rogers
*Attorney, Agent, or Firm*—Staas & Halsey

[57] ABSTRACT

A primary binary image is converted into a weighted multivalued image with pixel values weighted. An upper shift-inverting unit inverts the pixel values, shifts them upward by one dot, and thus converts the primary binary image into an inverted upper-shifted image. A lower shift inverting unit inverts the pixel values, shifts them downward by one dot, and thus converts the primary binary image into an inverted lower-shifted image. A right shift inverting unit inverts the pixel values, shifts them rightward by one dot, and thus converts the primary binary image into an inverted right-shifted image. A left shift inverting unit inverts the pixel values, shifts them leftward by one dot, and thus converts the primary binary image into an inverted left-shifted image. A gradation processing unit subtracts the inverted upper-shifted image, inverted lower-shifted image, inverted right-shifted image and inverted left-shifted image from the weighted multivalued image, thereby synthesizing these pieces of image data. The primary binary image is thus converted into the half-tone image with gradations containing half-tones.

22 Claims, 32 Drawing Sheets

FIG. 5

| 1 | 0 | 0 | 1 | 1 | 1 | 1 | 1 | 1 |
|---|---|---|---|---|---|---|---|---|
| 1 | 1 | 0 | 0 | 1 | 1 | 1 | 1 | 1 |
| 1 | 1 | 1 | 0 | 0 | 1 | 1 | 1 | 1 |
| 1 | 1 | 1 | 0 | 0 | 0 | 1 | 1 | 1 |
| 1 | 1 | 1 | 1 | 0 | 0 | 0 | 1 | 1 |
| 1 | 1 | 1 | 1 | 0 | 0 | 0 | 1 | 1 |
| 1 | 1 | 1 | 1 | 1 | 0 | 0 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

FIG. 6

| 1 | 1 | 1 | 1 | 1 | 1 | 1 | 1 | 1 |
|---|---|---|---|---|---|---|---|---|
| 1 | 1 | 1 | 1 | 1 | 1 | 1 | 1 | 1 |
| 1 | 0 | 0 | 1 | 1 | 1 | 1 | 1 | 1 |
| 1 | 1 | 0 | 0 | 1 | 1 | 1 | 1 | 1 |
| 1 | 1 | 1 | 0 | 0 | 1 | 1 | 1 | 1 |
| 1 | 1 | 1 | 0 | 0 | 0 | 1 | 1 | 1 |
| 1 | 1 | 1 | 1 | 0 | 0 | 0 | 1 | 1 |
| 1 | 1 | 1 | 1 | 0 | 0 | 0 | 1 | 1 |
| 1 | 1 | 1 | 1 | 1 | 0 | 0 | 1 | 1 |
| 1 | 1 | 1 | 1 | 1 | 1 | 1 | 1 | 1 |

FIG. 7

| 1 | 1 | 1 | 1 | 1 | 1 | 1 | 1 | 1 |
|---|---|---|---|---|---|---|---|---|
| 1 | 1 | 0 | 0 | 1 | 1 | 1 | 1 | 1 |
| 1 | 1 | 1 | 0 | 0 | 1 | 1 | 1 | 1 |
| 1 | 1 | 1 | 1 | 0 | 0 | 1 | 1 | 1 |
| 1 | 1 | 1 | 1 | 0 | 0 | 0 | 1 | 1 |
| 1 | 1 | 1 | 1 | 1 | 0 | 0 | 0 | 1 |
| 1 | 1 | 1 | 1 | 1 | 0 | 0 | 0 | 1 |
| 1 | 1 | 1 | 1 | 1 | 1 | 0 | 0 | 1 |
| 1 | 1 | 1 | 1 | 1 | 1 | 1 | 1 | 1 |
| 1 | 1 | 1 | 1 | 1 | 1 | 1 | 1 | 1 |

FIG. 8

| 1 | 1 | 1 | 1 | 1 | 1 | 1 | 1 | 1 |
|---|---|---|---|---|---|---|---|---|
| 0 | 0 | 1 | 1 | 1 | 1 | 1 | 1 | 1 |
| 1 | 0 | 0 | 1 | 1 | 1 | 1 | 1 | 1 |
| 1 | 1 | 0 | 0 | 1 | 1 | 1 | 1 | 1 |
| 1 | 1 | 0 | 0 | 0 | 1 | 1 | 1 | 1 |
| 1 | 1 | 1 | 0 | 0 | 0 | 1 | 1 | 1 |
| 1 | 1 | 1 | 0 | 0 | 0 | 1 | 1 | 1 |
| 1 | 1 | 1 | 1 | 0 | 0 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

FIG. 12

| 0 | 0 | 1 | 1 | 1 | 1 | 1 | 1 | 1 |
|---|---|---|---|---|---|---|---|---|
| 1 | 0 | 0 | 1 | 1 | 1 | 1 | 1 | 1 |
| 1 | 1 | 0 | 0 | 1 | 1 | 1 | 1 | 1 |
| 1 | 1 | 0 | 0 | 0 | 1 | 1 | 1 | 1 |
| 1 | 1 | 1 | 0 | 0 | 0 | 1 | 1 | 1 |
| 1 | 1 | 1 | 0 | 0 | 0 | 1 | 1 | 1 |
| 1 | 1 | 1 | 1 | 0 | 0 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

FIG. 13

| 1 | 1 | 1 | 1 | 1 | 1 | 1 | 1 | 1 |
|---|---|---|---|---|---|---|---|---|
| 1 | 1 | 1 | 1 | 1 | 1 | 1 | 1 | 1 |
| 1 | 1 | 0 | 0 | 1 | 1 | 1 | 1 | 1 |
| 1 | 1 | 1 | 0 | 0 | 1 | 1 | 1 | 1 |
| 1 | 1 | 1 | 1 | 0 | 0 | 1 | 1 | 1 |
| 1 | 1 | 1 | 1 | 0 | 0 | 0 | 1 | 1 |
| 1 | 1 | 1 | 1 | 1 | 0 | 0 | 0 | 1 |
| 1 | 1 | 1 | 1 | 1 | 0 | 0 | 0 | 1 |
| 1 | 1 | 1 | 1 | 1 | 1 | 0 | 0 | 1 |
| 1 | 1 | 1 | 1 | 1 | 1 | 1 | 1 | 1 |

FIG. 14

| 1 | 1 | 0 | 0 | 1 | 1 | 1 | 1 | 1 |
|---|---|---|---|---|---|---|---|---|
| 1 | 1 | 1 | 0 | 0 | 1 | 1 | 1 | 1 |
| 1 | 1 | 1 | 1 | 0 | 0 | 1 | 1 | 1 |
| 1 | 1 | 1 | 1 | 0 | 0 | 0 | 1 | 1 |
| 1 | 1 | 1 | 1 | 1 | 0 | 0 | 0 | 1 |
| 1 | 1 | 1 | 1 | 1 | 0 | 0 | 0 | 1 |
| 1 | 1 | 1 | 1 | 1 | 1 | 0 | 0 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

FIG. 15

| 1 | 1 | 1 | 1 | 1 | 1 | 1 | 1 | 1 |
|---|---|---|---|---|---|---|---|---|
| 1 | 1 | 1 | 1 | 1 | 1 | 1 | 1 | 1 |
| 1 | 1 | 0 | 0 | 1 | 1 | 1 | 1 | 1 |
| 1 | 1 | 1 | 0 | 0 | 1 | 1 | 1 | 1 |
| 1 | 1 | 1 | 1 | 0 | 0 | 1 | 1 | 1 |
| 1 | 1 | 1 | 1 | 0 | 0 | 0 | 1 | 1 |
| 1 | 1 | 1 | 1 | 1 | 0 | 0 | 0 | 1 |
| 1 | 1 | 1 | 1 | 1 | 0 | 0 | 0 | 1 |
| 1 | 1 | 1 | 1 | 1 | 1 | 0 | 0 | 1 |
| 1 | 1 | 1 | 1 | 1 | 1 | 1 | 1 | 1 |

IMAGE HALF-TONE PROCESSOR AND METHOD THEREOF

TECHNICAL FIELD

The present invention relates generally to processing of a binary image consisting of binary pixels as in the case of a character font image and, more particularly, to an image half-tone processor for expressing the binary image as a multi-gradated image containing half-tones and capable of providing a comparatively easy-to-see display or print, etc. for an output dot density.

BACKGROUND ARTS

In recent years, there has increasingly been a rapid enhancement in terms of MMI (Man-Machine Interface) owing to an advancement in GUI (Graphical User Interface) in computers. Corresponding to such a trend, there increases an occasion in which the image data containing the images and characters are displayed in a variety of sizes, or printed by a printer, etc. and outputted.

On the other hand, with a diversification of the display information, a prevailing type of display device is, though low of its resolution in a so-called monochrome display, capable of displaying with multi-gradations. For example, the great majority of liquid crystal display devices exhibiting a low resolution are capable of 8- or 16-gradation display containing half-tones in addition to two gradations in black and white.

By the way, a comparatively inexpensive output device, especially a small-sized display device is generally low of the resolution and tends to be hard to see enough to worsen a visual recognizability because of an image the outline of which becomes conspicuous of sharp ruggedness when displaying binary image data consisting of rather definite binary data. A more remarkable tendency of this sort can be seen in the liquid crystal display often used for particularly a carriable type appliance such as a so-called notebook type personal computer because of rectangular dots being uniform in terms of display dots.

When outputting letter, i.e., characters having the same logic size (e.g., 10.5 point) to a display device and a printer that are defined as outputting devices, a letter image, viz., a character image actually displayed on the display device and a character image printed by the printer are expressed with different numbers of dots on account of a difference in resolution between the outputting devices. Therefore, the display device generally exhibiting a lower resolution than the printer comes to display a conspicuously rugged rough image of the character.

It is an object of the present invention, which was contrived under such circumstances, to provide an image half-tone processor capable of giving an easy-to-see display with a high visual recognizability by converting a primary binary image (an original binary image) into a multi-gradated image and outputting the image based on the multi-gradation expression in a system for outputting the binary image by use of an outputting device possible of expressing it with the multi-gradations containing half-tones.

DISCLOSURE OF INVENTION

A first image half-tone processor according to the present invention comprises a pixel converting unit for weighting each of pixels of a primary binary image, and converting the primary binary image into a multivalued image consisting of weighted pixel values, a shift inversion processing unit for forming respectively a plurality of shift-inverted images into which the primary binary image is inverted and shifted in a plurality of peripheral directions corresponding to a pixel array of the primary binary image, a gradation processing unit for forming a half-tone image on the basis of the multivalued image obtained by the pixel converting unit and the plurality of shift-inverted images obtained by the shift inversion processing unit, and an image outputting device for outputting the half-tone image formed by the gradation processing unit.

The shift inversion processing unit may be a unit for forming respectively four shift-inverted images into which the primary binary image is inverted and shifted in upper-, lower-, left- and right-directions, and the gradation processing unit may be a unit for forming a half-tone image on the basis of the multivalued image obtained by the pixel converting unit and the four shift-inverted images obtained by the shift inversion processing unit.

The shift inversion processing unit may be a unit for forming respectively four shift-inverted images into which the primary binary image is inverted and shifted in left-upper-, left-lower-, right-upper- and right-lower-directions, and the gradation processing unit may be a unit for forming a half-tone image on the basis of the multivalued image obtained by the pixel converting unit and the four shift-inverted images obtained by the shift inversion processing unit.

The shift inversion processing unit may be a unit for forming respectively eight shift-inverted images into which the primary binary image is inverted and shifted in upper-, lower-, left-, right-, left-upper-, left-lower-, right-upper- and right-lower-directions, and the gradation processing unit may be a unit for forming a half-tone image on the basis of the multivalued image obtained by the pixel converting unit and the eight shift-inverted images obtained by the shift inversion processing unit.

The gradation processing unit may be a unit for additionally synthesizing the multivalued image obtained by the pixel converting unit and the plurality of shift-inverted images obtained by the shift inversion processing unit per pixel corresponding to the multivalued image.

A second image half-tone processor according to the present invention comprises a pixel converting unit for weighting each of pixels of a primary binary image, and converting the primary binary image into a multivalued image consisting of weighted pixel values, a shift processing unit for forming respectively a plurality of shifted images shifted in a plurality of peripheral directions corresponding to a pixel array thereof, a gradation processing unit for forming a half-tone image on the basis of the multivalued image obtained by the pixel converting unit and the plurality of shifted images obtained by the shift processing unit, and an image outputting device for outputting the half-tone image formed by the gradation processing unit.

The shift inversion processing unit may be a unit for forming respectively four shift-inverted images into which the primary binary image is shifted in upper-, lower-, left- and right-directions, and the gradation processing unit may be a unit for forming a half-tone image on the basis of the multivalued image obtained by the pixel converting unit and the four shift-inverted images obtained by the shift inversion processing unit.

The shift inversion processing unit may be a unit for forming respectively four shift-inverted images into which the primary binary image is shifted in left-upper-, leftlower-, right-upper- and right-lower-directions, and the gradation processing unit may be a unit for forming a half-tone image on the basis of the multivalued image obtained by the pixel converting unit and the four shift-inverted images obtained by the shift inversion processing unit.

The shift inversion processing unit may be a unit for forming respectively eight shift-inverted images into which the primary binary image is shifted in upper-, lower-, left-, right-, left-upper-, left-lower-, right-upper- and right-lower-directions, and the gradation processing unit may be a unit for forming a half-tone image on the basis of the multivalued image obtained by the pixel converting unit and the eight shift-inverted images obtained by the shift inversion processing unit.

The gradation processing unit may be a unit for additionally synthesizing the multivalued image obtained by the pixel converting unit and the plurality of shifted images obtained by the shift inversion processing unit per pixel corresponding to the multivalued image.

A third image half-tone processor according to then present invention comprises an enlarged image forming unit for forming a primary binary image having a size that is (x×y) times as large as a desired output size, a pixel converting unit for weighting each of pixels of the primary binary image, and converting the primary binary image into a multivalued image consisting of weighted pixel values, a shift inversion processing unit for forming respectively a plurality of shift-inverted images into which the primary binary image is inverted and shifted in a plurality of peripheral directions corresponding to a pixel array thereof, a gradation processing unit for forming a half-tone image on the basis of the multivalued image obtained by the pixel converting unit and the plurality of shifted images obtained by the shift processing unit, a reduction processing unit for reducing the half-tone image formed by the gradation processing unit down to a size by a factor of (1/x)×(1/y), and an image outputting device for outputting the half-tone image formed by the reduction processing unit.

The shift inversion processing unit may be a unit for forming respectively four shift-inverted images into which the primary binary image is inverted and shifted in upper-, lower-, left- and right-directions, and the gradation processing unit ma be a unit for forming a half-tone image on the basis of the multivalued image obtained by the pixel converting unit and the four shift-inverted images obtained by the shift inversion processing unit.

The shift inversion processing unit may be a unit for forming respectively four shift-inverted images into which the primary binary image is inverted and shifted in left-upper-, left-lower-, right-upper- and right-lower-directions, and the gradation processing unit may be a unit for forming a half-tone image on the basis of the multivalued image obtained by the pixel converting unit and the four shift-inverted images obtained by the shift inversion processing unit.

The shift inversion processing unit may be a unit for forming respectively eight shift-inverted images into which the primary binary image is inverted and shifted in upper-, lower-, left-, right-, left-upper-, left-lower-, right-upper- and right-lower-directions, and the gradation processing unit may be a unit for forming a half-tone image on the basis of the multivalued image obtained by the pixel converting unit and the eight shift-inverted images obtained by the shift inversion processing unit.

The gradation processing unit may be a unit for additionally synthesizing the multivalued image obtained by the pixel converting unit and the plurality of shift-inverted images obtained by the shift inversion processing unit per pixel corresponding to the multivalued image.

A fourth image half-tone processor according to the present invention comprises an enlarged image forming unit for forming a primary binary image having a size that is (x×y) times as large as a desired output size, a pixel converting unit for weighting each of pixels of the primary binary image, and converting the primary binary image into a multivalued image consisting of weighted pixel values, a shift processing unit for forming respectively a plurality of shifted images shifted in a plurality of peripheral directions corresponding to a pixel array thereof, a gradation processing unit for forming a half-tone image on the basis of the multivalued image obtained by the pixel converting unit and the plurality of shifted images obtained by the shift processing unit, a reduction processing unit for reducing the half-tone image formed by the gradation processing unit down to a size by a factor of (1/x)×(1/y), and an image outputting device for outputting the half-tone image formed by the gradation processing unit.

The shift processing unit may be a unit for forming respectively four shifted images into which the primary binary image is shifted in upper-, lower-, left- and right-directions, and the gradation processing unit may be a unit for forming a half-tone image on the basis of the multivalued image obtained by the pixel converting unit and the four shifted images obtained by the shift processing unit.

The shift processing unit may be a unit for forming respectively four shifted images into which the primary binary image is shifted in left-upper-, left-lower-, right-upper- and right-lower-directions, and the gradation processing unit may be a unit for forming a half-tone image on the basis of the multivalued image obtained by the pixel converting unit and the four shifted images obtained by the shift processing unit.

The shift processing unit may be a unit for forming respectively eight shifted images into which the primary binary image is shifted in upper-, lower-, left-, right-, left-upper-, left-lower-, right-upper- and right-lower-directions, and the gradation processing unit may be a unit for forming a half-tone image on the basis of the multivalued image obtained by the pixel converting unit and the eight shifted images obtained by the shift processing unit.

The gradation processing unit may be a unit for additionally synthesizing the multivalued image obtained by the pixel converting unit and the plurality of shifted images obtained by the shift processing unit per pixel corresponding to the multivalued image.

A fifth image half-tone processor according to the present invention comprises a pixel converting unit for weighting each of pixels of a primary binary image, and converting the primary binary image into a multivalued image consisting of weighted pixel values, a gradation processing unit for forming a half-tone image by gradating the pixel values of the multivalued image on the basis of pixel data corresponding to adjacent pixels peripheral to the respective pixels of the multivalued image, and an image outputting device for outputting the half-tone image formed by the gradation processing unit.

The gradation processing unit may be a unit for executing the gradating process based on the data of the pixels disposed upward, downward, leftward and rightward adjacent to the respective pixels of the multivalued image.

The gradation processing unit may be a unit for executing the gradating process based on the data of the pixels disposed left upward, left downward, right upward and right downward adjacent to the respective pixels of the multivalued image.

The gradation processing unit may be a unit for executing the gradating process based on the data of the pixels disposed upward, downward, leftward, rightward, left upward, left downward, right upward and right downward adjacent to the respective pixels of the multivalued image.

The gradation processing unit may be a unit for executing the gradating process based on the data of such pixels that the pixel values of the respective adjacent pixels are background pixel values.

A sixth image half-tone processor according to the present invention comprises an enlarged image forming unit for forming a primary binary image having a size that is (x×y) times as large as a desired output size, a pixel converting unit for weighting each of pixels of the primary binary image, and converting the primary binary image into a multivalued image consisting of weighted pixel values, a gradation processing unit for forming a half-tone image by gradating pixel values of the multivalued image on the basis of pixel data corresponding to adjacent pixels peripheral to the respective pixels of the multivalued image, a reduction processing unit for reducing the half-tone image formed by the gradation processing unit down to a size by a factor of (1/x)×(1/y), and an image outputting device for outputting the half-tone image formed by the reduction processing unit.

The gradation processing unit may be a unit for executing the gradating process based on the data of the pixels disposed upward, downward, leftward and rightward adjacent to the respective pixels of the multivalued image.

The gradation processing unit may be a unit for executing the gradating process based on the data of the pixels disposed left upward, left downward, right upward and right downward adjacent to respective pixels of the multivalued image.

The gradation processing unit may be a unit for executing the gradating process based on the data of the pixels disposed upward, downward, leftward, rightward, left upward, left downward, right upward and right downward adjacent to the respective pixels of the multivalued image.

The gradation processing unit may be a unit for executing the gradating process based on the data of such pixels that the pixel values of the respective adjacent pixels are background pixel values.

The primary binary image may be a character font image.

In the image half-tone processor according to the present invention, each of pixels of a primary binary image is weighted, and the primary binary image is converted into a multivalued image consisting of weighted pixel values. There are formed respectively a plurality of shift-inverted images or shifted imaged into which the primary binary image is inverted and shifted, or shifted without being inverted in a plurality of peripheral directions corresponding to a pixel array of the primary binary image. A half-tone image is formed based on the multivalued image and the plurality of shifted images, and then outputted. Hence, the primary binary image is converted into the multi-gradated image containing such half-tones as to smooth an apparent outline of the primary binary image, and then outputted to give an easy-to-see display with a high visual recognizability.

Further, in another image half-tone processor according to the present invention, after previously forming the primary binary image having a size that is (x×y) times as large as the desired output size, each of the pixels of the primary binary image is weighted, and the primary binary image is thus converted into the multivalued image consisting of the weighted pixel values. Then, there are formed respectively the plurality of shift-inverted images or the plurality of shifted images into which the primary binary image is inverted and shifted, or shifted without being inverted in the plurality of peripheral directions corresponding to the pixel array thereof. The half-tone image is formed based on the multivalued image and the plurality of shifted images, and thereafter the half-tone image is outputted after being reduced down to a size by a factor of (1/x)×(1/y).

In still another image half-tone processor according to the present invention, each of the pixels of the primary binary image is weighted, and the primary binary image is converted into the multivalued image consisting of the weighted pixel values. Then, the pixel values of the multivalued image are processed with gradations on the basis of the pixel data corresponding to the adjacent pixels peripheral to the respective pixels of the multivalued image, thereby forming the half-tone image. This half-tone image is then outputted.

In yet another image half-tone processor according to the present invention, after previously forming the primary binary image having a size that is (x×y) times as large as a desired output size, the respective pixels of the primary binary image are weighted, and the primary binary image is converted into the multivalued image consisting of the weighted pixel values. Then, the pixel values of the multivalued image are processed with gradations on the basis of the pixel data corresponding to the adjacent pixels peripheral to the respective pixels of the multivalued image, thereby forming the half-tone image. Thereafter, this half-tone image is reduced down to a size by a factor of (1/x)×(1/y), and then outputted.

According to the image half-tone processor of the present invention, in the system for outputting the binary image by use of the outputting device capable of giving the expression with multi-gradations containing the half-tones, the primary binary image is converted into the multi-gradated image containing the half-tones enough to smooth the apparent outline of the primary binary image. Thus, it is possible to output the image based on the multi-gradated expression and to provide the easy-to-see display with the high visual recognizability.

BRIEF DESCRIPTION OF THE DRAWINGS

FIG. 5 is a schematic diagram showing the image data for explaining the operation in the image processor in FIG. 1;

FIG. 6 is a schematic diagram showing the image data for explaining the operation in the image processor in FIG. 1;

FIG. 7 is a schematic diagram showing image data for explaining an operation in the image processor in FIG. 1;

FIG. 8 is a schematic diagram showing the image data for explaining the operation in the image processor in FIG. 1;

FIG. 12 is a schematic diagram showing image data for explaining an operation in the image processor in FIG. 11;

FIG. 13 is a schematic diagram showing the image data for explaining the operation in the image processor in FIG. 11;

FIG. 14 is a schematic diagram showing the image data for explaining the operation in the image processor in FIG. 11;

FIG. 15 is a schematic diagram showing the image data for explaining the operation in the image processor in FIG. 11;

FIG. 36 is a diagram showing the output image data by a normal system for a comparison with FIG. 35;

FIG. 37 is a diagram showing an enlarged image of the output image data in FIG. 35;

BEST MODE FOR CARRYING OUT THE INVENTION

Embodiment 1

Figure 1:
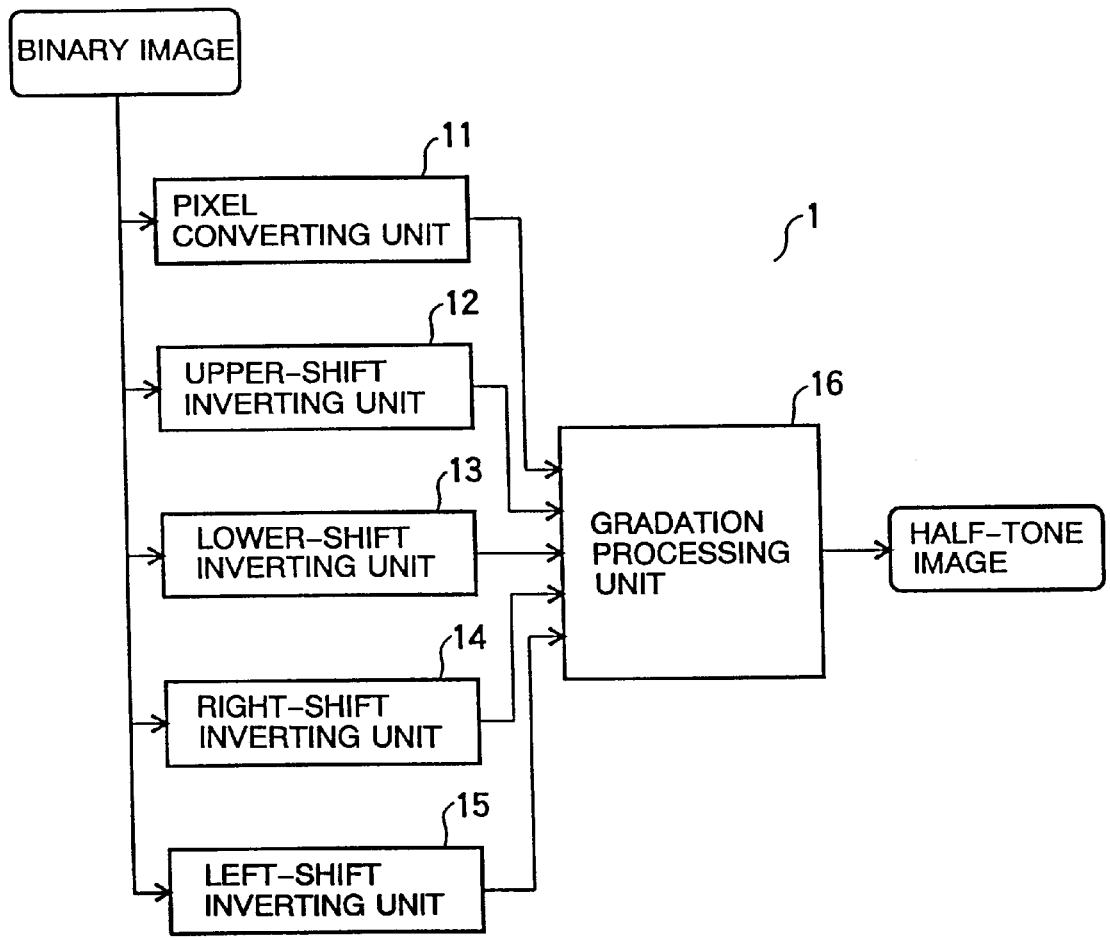
FIG. 1 is a block diagram illustrating a functional construction of a half-tone processing unit defined as a principal portion of an image half-tone processor in a first embodiment of the present invention.

FIG. 1 shows a functional construction of a half-tone processing unit defined as a principal unit of an image half-tone processor in accordance with a first embodiment of the present invention.

Such a process can be actualized also by an image processing single-purpose apparatus or by a program provided in the form of being stored on a recording medium such as a CD-ROM, a flexible disk, a magnetic disk and a magneto-optic disk in a computer system capable of treating normal image data.

A half-tone processing unit 1 in FIG. 1 includes a pixel converting unit 11, an upper-shift inverting unit 12, a lower-shift inverting unit 13, a right-shift inverting unit 14, a left-shift inverting unit 15, and a gradation processing unit 16.

The pixel converting unit 11 weights each of pixels constituting a primary binary image. A specific weighting process by this pixel converting unit 11 is that, for example, with a white pixel set to "0" and a black pixel set to "1", "0" is, as it is, allocated to the white pixel, while the black pixel is allocated with a value of "5" in this case, which is larger than "1", with respect to a binary image consisting of those binary numbers, i.e., "0" and "1".

The upper-shift inverting unit 12 black-and-white-inverts a primary binary image and shifts it upward by one pixel, i.e., by one dot on pixel coordinates. That is, the upper-shift inverting unit 12 forms an inverted binary image with an exchange of the white pixel "0" and the black pixel "1" of the given binary image, shifts this inverted binary image upward by one dot, and further forms a binary image wherein the lowermost single row is filled with "1".

The lower-shift inverting unit 13 black-and-white-inverts the primary binary image and shifts it downward by one pixel, i.e., by one dot on the pixel coordinates. That is, the lower-shift inverting unit 13 forms an inverted binary image with the exchange of the white pixel "0" and the black pixel "1" of the given binary image, shifts this inverted binary image downward by one dot, and further forms a binary image wherein the uppermost single row is filled with "1".

The right-shift inverting unit 14 black-and-white-inverts the primary binary image and shifts it rightward by one pixel, i.e., by one dot the on the pixel coordinates. That is, the right-shift inverting unit 14 forms an inverted binary image with the exchange of the white pixel "0" and the black pixel "1" of the given binary image, shifts the inverted binary image rightward by one dot, and further forms a binary image wherein the leftest single row is filled with "1".

The left-shift inverting unit 15 black-and-white-inverts the primary binary image and shifts it leftward by one pixel, i.e., by one dot on the pixel coordinates. That is, the left-shift inverting unit 15 forms an inverted binary image with the exchange of the white pixel "0" and the black pixel "1" of the given binary image, shifts this inverted binary image leftward by one dot, and further forms a binary image wherein the rightest single row is filled with "1".

The gradation processing unit 16 forms a half-tone image based on a multivalued image obtained by the pixel converting unit 11, and four pieces of binary images obtained respectively by the upper-shift inverting unit 12, the lower-shift inverting unit 13, the right-shift inverting unit 14 and the left-shift inverting unit 15. The gradation processing unit 16 executes a subtracting process on the pixel basis between the multivalued image obtained by the pixel converting unit 11 and the four binary images obtained respectively by the upper-shift inverting unit 12, the lower-shift inverting unit 13, the right-shift inverting unit 14 and the left-shift inverting unit 15, and thereby obtains the half-tone image by additionally synthesizing these images. More specifically, the gradation processing unit 16 subtracts "1" from the weighted pixels described above, when the pixels of the thus inverted/shifted binary image which pixels are disposed in corresponding coordinate positions, are "1" with respect to the weighted pixels having the pixel values "5" in the coordinate positions where the multivalued image exists. At this time, no subtracting process is effected on the pixels "0" of the multivalued image. This subtracting process is repeated with respect to each of the four inverted/shifted binary images. For instance, if all the pixel values of the four binary images in the coordinate positions corresponding to the pixel values "5" of the above multivalued image, are "1", the pixel value of the relevant pixel as a result (5–1–1–1–1=1) of executing all the subtractions, becomes "1". The half-tone image is a result of all the four inverted/shifted binary images being subtracted per pixel by the gradation processing unit 16.

Figure 2:
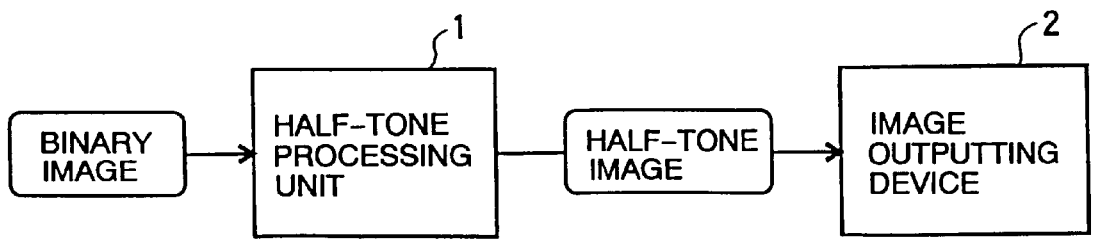
FIG. 2 is a block diagram showing a system construction of the image half-tone processor using the half-tone processing unit in FIG. 1.

The image half-tone processor using the thus operated half-tone processing 1 is, as illustrated in FIG. 2, constructed of the half-tone processing unit 1 and the image output device 2.

The image outputting device 2 is a display or a printer expressing the image with multi-gradations and outputting the image. In this case, it is assumed that the image outputting device 2 be a display such as, e.g., a liquid crystal display.

Next, one example of the image half-tone processor shown in FIG. 2 will be specifically explained with reference to FIGS. 3 through 10 with an emphasis upon, particularly, the processing operation of the half-tone processing unit 1 illustrated in FIG. 1.

Figure 3:
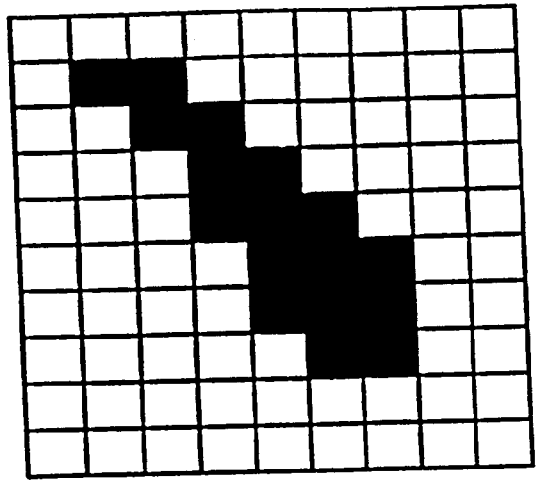
FIG. 3 is a schematic diagram showing image data for explaining an operation in the image processor in FIG. 1.

FIG. 3 illustrates one example of the primary binary image consisting of the white and black pixels inputted to the half-tone processing unit 1 shown in FIG. 1. The primary binary image is expressed in such a way that the pixel value of the white pixel is "0", white the pixel value of the black pixel is "0".

Figure 4:
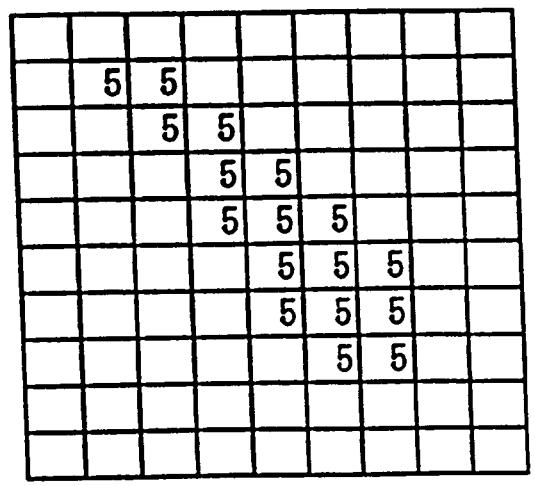
FIG. 4 is a schematic diagram showing the image data for explaining the operation in the image processor in FIG. 1.

The pixel converting unit 11 makes the pixel values of the white pixels remain to be "0", and weights the pixel values of the black pixels with pixel values "5", whereby the primary binary image in FIG. 3 is thus converted into a weighted multivalued image as illustrated in FIG. 4.

Further, the upper-shift inverting unit 12 black-and-white-inverts the primary binary image in FIG. 3 by exchanging the pixel values "0" and the pixel values "1" to eahc other, and shifts the entire image upward by one pixel, i.e., by one dot, whereby the primary binary image is converted into an inverted upper-shifted image as shown in FIG. 5. At this time, the lowermost single row is filled with "1".

The lower-shift inverting unit 13 exchanges the pixel values "0" and the pixel values "1" to each other, of the primary binary image in FIG. 3, and shifts the entire image downward by one pixel, i.e., by one dot, whereby the primary binary image is converted into an inverted lower-shifted image as shown in FIG. 6. At this time, the uppermost single row is filled with "1".

The right-shift inverting unit 14 exchanges the pixel values "0" and the pixel values "1" to each other, of the primary binary image in FIG. 3, and shifts the entire image rightward by one pixel, i.e., by one dot, whereby the primary binary image is converted into an inverted right-shifted image as shown in FIG. 7. At this time, the leftest single row is filled with "1".

Similarly, the left-shift inverting unit 15 exchanges the pixel values "0" and the pixel values "1" to each other, of the primary binary image in FIG. 3, and shifts the entire image leftward by one pixel, i.e., by one dot, whereby the primary binary image is converted into an inverted left-shifted image as shown in FIG. 8. At this time, the rightest single row is filled with "1".

Figure 9:
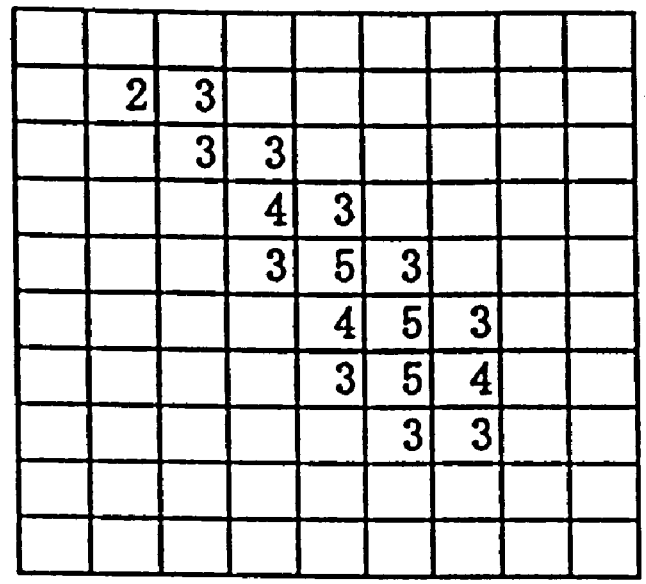
FIG. 9 is a schematic diagram showing the image data for explaining the operation in the image processor in FIG. 1.

The gradation processing unit 16 subtracts the inverted upper-shifted image (FIG. 5), the inverted lower-shifted image (FIG. 6), the inverted right-shifted image (FIG. 7) and the inverted left-shifted image (FIG. 8) that are composed of the binary images formed respectively by the upper-shift inverting unit 12, the lower-shift inverting unit 13, the right-shift inverting unit 14 and the left-shift inverting unit 15, from the weighted multivalued image formed by the pixel converting unit 11 that is shown in FIG. 4. The gradation processing unit 16 thereby synthesizes image data thereof and thus forms a half-tone image with gradations containing a half-tone as shown in FIG. 9. More specifically, the half-tone image in FIG. 9 is formed by subtracting the pixel values "0" or "1" of the inverted upper-shifted image, the inverted lower-shifted image, the inverted right-shifted image and the inverted left-shifted image, from the pixel values "5" with respect to the pixels having the pixel values "5" excluding the pixel values "0" of the weighted multivalued image.

Figure 10:
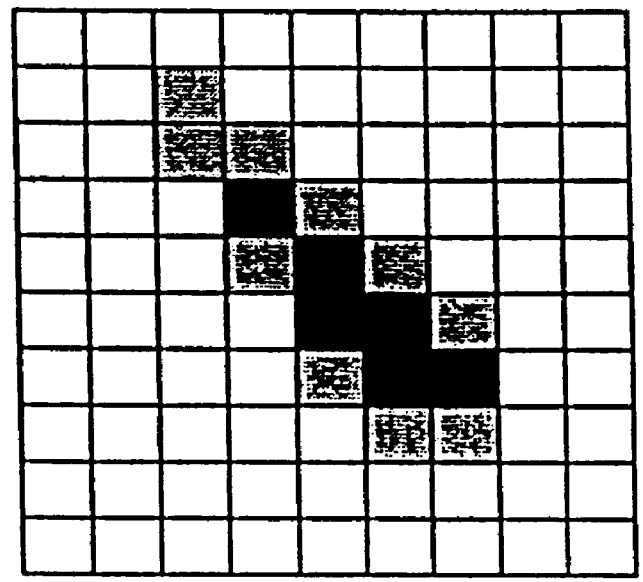
FIG. 10 is a schematic diagram showing the image data for explaining the operation in the image processor in FIG. 1.

The thus formed half-tone image is provided with gradations, e.g., density gradations corresponding to the pixel values and then outputted by the image outputting device 2 illustrated in FIG. 2. FIG. 10 shows one example of outputting, wherein, for example, the pixels having the pixel values "5" are expressed in 100% black, the pixels having the pixel values "4" are in 75% black, the pixels having the pixel values "3" are in 50% black, the pixels having the pixel values "2" are in 25% black, and the pixels having the pixel values "0" are in 0% black (i.e., white).

With this arrangement, a protruded portion of rugged portions of outline of the primary binary image is expressed with a low gradation, thereby smoothing the whole outline in terms of a visual aspect. This makes it feasible to provide an easy-to-see display or print with a high visual recognizability.

Embodiment 2

In the above-mentioned gradation processing unit 1 shown in FIG. 1, the inverted image of the primary binary image is upper- lower- left- and right-shifted, and the subtraction from the weighted multivalued image is executed, thereby forming the half-tone image. The half-tone image may also be, however, formed by subtracting an inverted image shifted in four oblique left-upper-, left-lower-, right-upper- and right-lower-directions in addition to the upper-, lower-, left- and right-directions. This is a second embodiment of the present invention.

Figure 11:
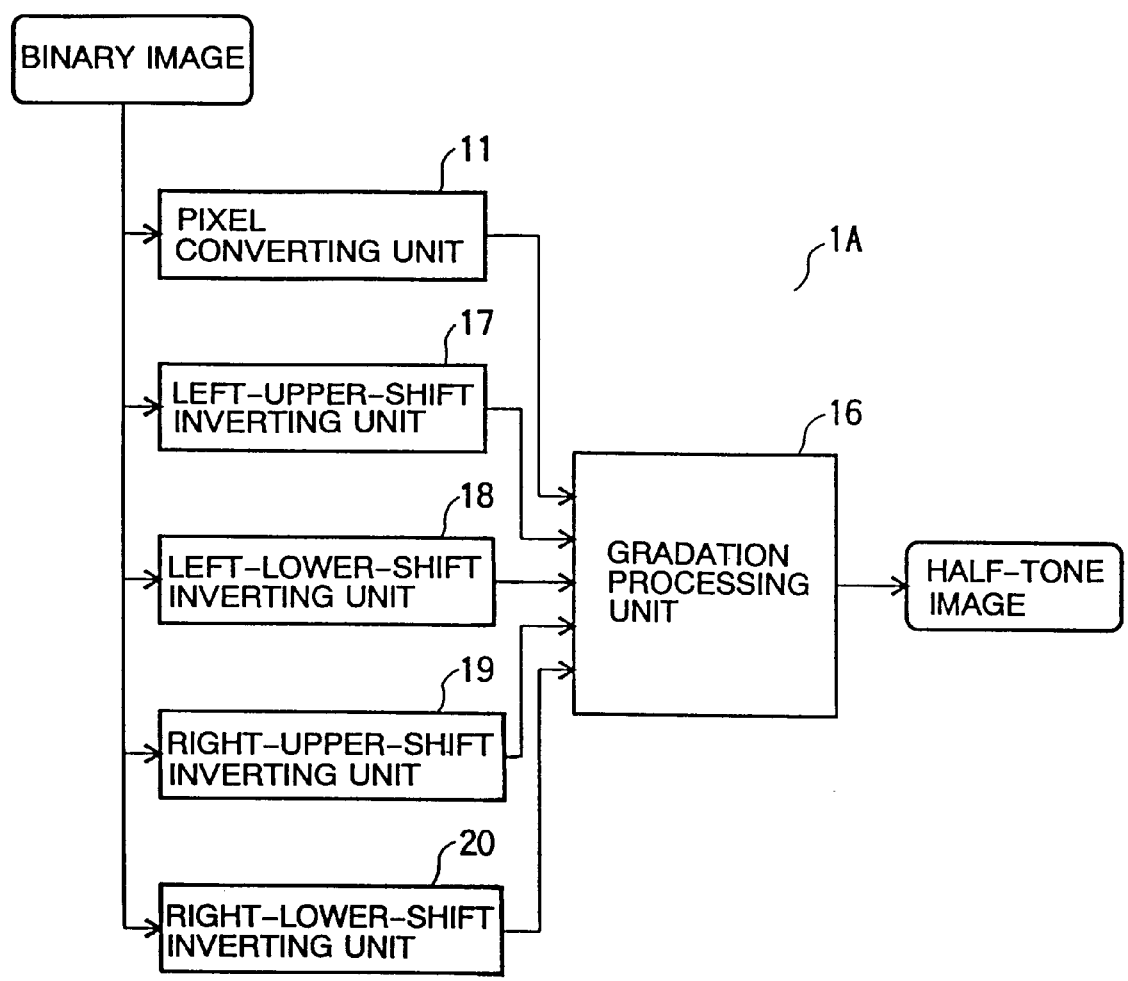
FIG. 11 is a block diagram illustrating a functional construction of the half-tone processing unit defined as a principal portion of the image half-tone processor in a second embodiment of the present invention.

FIG. 11 illustrates a functional construction of the half-tone processing unit defined as the principal unit of the image half-tone processor in accordance with the second embodiment of the present invention.

A half-tone processing unit 1A in FIG. 11 includes a left-upper-shift inverting unit 17, a left-lower-shift inverting unit 18, a right-upper-shift inverting unit 19, and a right-lower-shift inverting unit 20 in addition to the pixel converting unit 11 and the gradation processing unit 19 that incorporate the same functions as those in FIG. 1.

The pixel converting unit 11, as already stated, weights each of the pixels constituting the primary binary image. A specific weighting process by this pixel converting unit 11 is that, for instance, "0" is, as it is, allocated to the white pixel, while the black pixel is allocated with a value of "5", which is larger than "1", with respect to the binary image consisting of the white pixels set to "0" and the black pixels set to "1".

The left-upper-shift inverting unit 17 black-and-white-inverts the primary binary image and shifts it leftward upward by one pixel, i.e., by one dot on the pixel coordinates. That is, the left-upper-shift inverting unit 17 forms an invented binary image with the exchange of the white pixel "0" and the black pixel "1" of the given binary image, shifts this inverted binary image leftward by one dot and upward by one dot, and further forms a binary image wherein each of the rightest and lowermost rows is filled with "1".

The left-lower-shift inverting unit 18 black-and-white-inverts the primary binary image and shifts it leftward downward by one pixel, i.e., by one dot on the pixel coordinates. That is, the left-lower-shift inverting unit 18 forms an inverted binary image with the exchange of the white pixel "0" and the black pixel "1" of the given binary image, shifts this inverted binary image leftward by one dot and downward by one dot, and further forms a binary image wherein each of the rightest and uppermost rows is filled with "1".

The right-upper-shift inverting unit 19 black-and-white-inverts the primary binary image and shifts it rightward upward by one pixel, i.e., by one dot the on the pixel coordinates. That is, the right-upper-shift inverting unit 19 forms an inverted binary image with the exchange of the white pixel "0" and the black pixel "1" of the given binary image, shifts the inverted binary image rightward by one dot and upward by one dot, and further forms a binary image wherein each of the leftest and lowermost rows is filled with "1".

The right-lower-shift inverting unit 20 black-and-white-inverts the primary binary image and shifts it rightward downward by one pixel, i.e., by one dot on the pixel coordinates. That is, the right-lower-shift inverting unit 20 forms an inverted binary image with the exchange of the white pixel "0" and the black pixel "1" of the given binary image, shifts this inverted binary image rightward by one dot and downward by one dot, and further forms a binary image wherein the leftest and uppermost rows-is filled with "1".

The gradation processing unit 16 forms a half-tone image based on a multivalued image obtained by the pixel converting unit 11, and four pieces of binary images obtained respectively by, in this case, the left-upper-shift inverting unit 17, the left-lower-shift inverting unit 18, the right-upper-shift inverting unit 19 and the right-lower-shift inverting unit 20. The gradation processing unit 16 executes a subtracting process on the pixel basis between the multivalued image obtained by the pixel converting unit 11 and the four binary images obtained respectively by the left-upper-shift inverting unit 17, the left-lower-shift inverting unit 18, the right-upper-shift inverting unit 19 and the right-lower-shift inverting unit 20, and thereby obtains the half-tone image by additionally synthesizing these images. More specifically, the gradation processing unit 16 subtracts "1" from the weighted pixels described above, when the pixels of the thus inverted/shifted binary image which pixels are disposed in corresponding coordinate positions, are "1" with respect to the weighted pixels having the pixel values "5" in the coordinate positions where the multivalued image exists. At this time, no subtracting process is effected on the pixels "0" of the multivalued image. This subtracting process is repeated with respect to each of the four inverted/shifted binary images. The half-tone image is a result of all the four inverted/shifted binary images being subtracted per pixel by the gradation processing unit 16.

The image half-tone processor using the thus operated half-tone processing 1A is, as in the same way in FIG. 2, constructed. In this case, the half-tone processing unit 1 is replaced with the half-tone processing unit 1A.

Next, a processing operation of the half-tone processing unit 1A illustrated in FIG. 11 will be specifically explained with reference to FIGS. 3, 4 and 12 through 17.

FIG. 3 illustrates one example of the primary binary image consisting of the white and black pixels inputted to the half-tone processing unit 1A shown in FIG. 11. As already described the primary binary image is expressed in such a way that the pixel value of the white pixel is "0", white the pixel value of the black pixel is "0".

The pixel converting unit 11 makes the pixel values of the white pixels remain to be "0", and weights the pixel values of the black pixels with pixel values "5", whereby the primary binary image in FIG. 3 is thus converted into a weighted multivalued image as illustrated in FIG. 4.

Further, the left-upper-shift inverting unit 17 black-and-white-inverts the primary binary image in FIG. 3 by exchanging the pixel values "0" and the pixel values "1" to each other, and shifts the entire image leftward by one dot and upward by one dot in the Figure, whereby the primary binary image is converted into an inverted left-upper-shifted image as shown in FIG. 12. At this time, each of the rightest and lowermost rows is filled with "1".

The left-lower-shift inverting unit 18 exchanges the pixel values "0" and the pixel values "1" to each other, of the primary binary image in FIG. 3, and shifts the entire image leftward by one dot and downward by one dot in the Figure, whereby the primary binary image is converted into an inverted left-lower-shifted image as shown in FIG. 13. At this time, each of the rightest and uppermost rows is filled with "1".

The right-upper-shift inverting unit 19 exchanges the pixel values "0" and the pixel values "1" to each other, of the primary binary image in FIG. 3, and shifts the entire image rightward by one dot and upward by one dot in the Figure, whereby the primary binary image is converted into an inverted right-upper-shifted image as shown in FIG. 14. At this time, each of the leftest and lowermost rows is filled with "1".

Similarly, the right-lower-shift inverting unit 20 exchanges the pixel values "0" and the pixel values "1" to each other, of the primary binary image in FIG. 3, and shifts the entire image rightward by one dot and downward by one dot in the Figure, whereby the primary binary image is converted into an inverted right-lower-shifted image as shown in FIG. 15. At this time, each of the leftest and uppermost rows is filled with "1".

Subtracted from the weighted multivalued image formed by the pixel converting unit 11 that is shown in FIG. 4 are the inverted left-upper-shifted image (FIG. 12), the inverted left-lower-shifted image (FIG. 13), the inverted right-upper-shifted image (FIG. 14), and the inverted right-lower-shifted image (FIG. 15) that are composed of the binary images formed respectively by the left-upper-shift inverting unit 17, the left-lower-shift inverting unit 18, the right-upper-shift inverting unit 19 and the right-lower-shift inverting unit 20.

Figure 16:
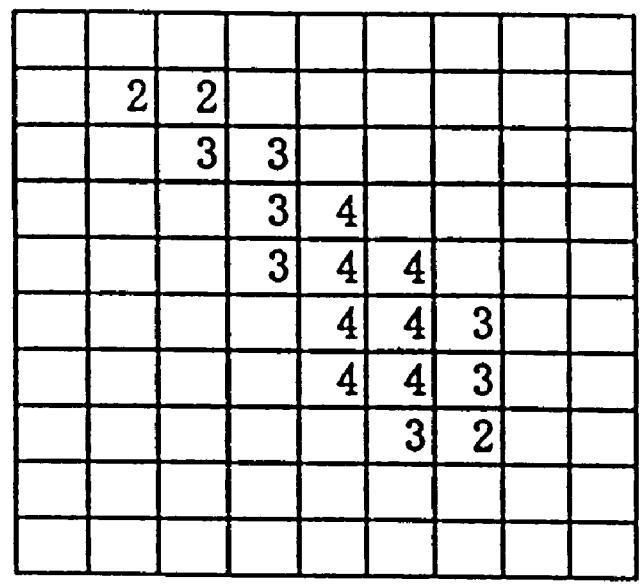
FIG. 16 is a schematic diagram showing image data for explaining an operation in the image processor in FIG. 11.

Then, the image data thereof are synthesized, and a half-tone image with gradations containing a half-tone as shown in FIG. 16 is formed. More specifically, the half-tone image in FIG. 16 is formed by subtracting the pixel values "0" or "1" of the inverted left-upper-shifted image, the inverted left-lower-shifted image, the inverted right-upper-shifted image and the inverted right-lower-shifted image, from the pixel values "5" with respect to the pixels having the pixel values "5" excluding the pixel values "0" of the weighted multi-valued image.

Figure 17:
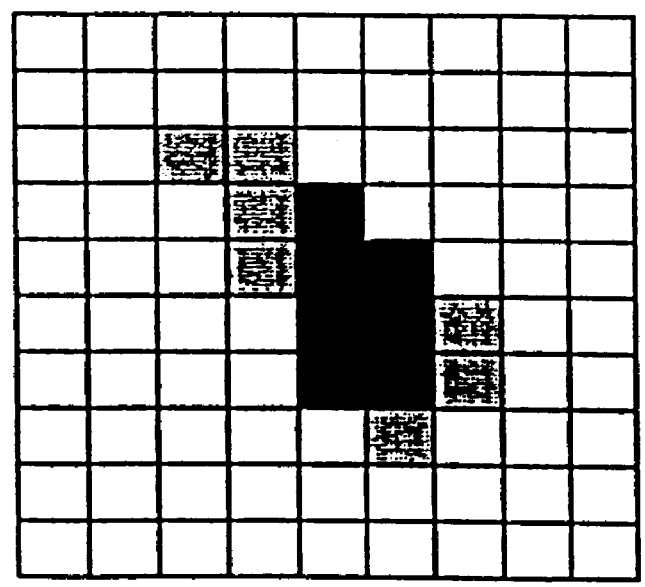
FIG. 17 is a schematic diagram showing the image data for explaining the operation in the image processor in FIG. 11.

The thus formed half-tone image is provided with gradations, e.g., density gradations corresponding to the pixel values and then outputted by the image outputting device 2. FIG. 17 shows one example of outputting, wherein, for example, the pixels having the pixel values "4" are expressed in 100% black, the pixels having the pixel values "3" are in 66% black, the pixels having the pixel values "2" are in 33% black, and the pixels having the pixel values "0" are in 0% black (i.e., white).

With this arrangement also, a protruded portion of rugged portions of outline of the primary binary image is expressed with a low gradation, thereby smoothing the whole outline in terms of a visual aspect. This makes it feasible to provide an easy-to-see display or print with a high visual recognizability.

Embodiment 3

In the above-mentioned gradation processing unit 1 shown in FIG. 1, the inverted image of the primary binary image is upper- lower- left- and right-shifted, and the subtraction from the weighted multivalued image is executed, thereby forming the half-tone image. The gradation processing unit 1A in FIG. 11 forms the half-tone image by shifting the inverted image of the primary binary Image left upward, left downward, right upward and right downward and performing the subtraction from the weighted multivalued image. The half-tone image may also be, however, formed by subtracting an inverted Image shifted in totally eight directions containing the four upper-, lower-, left- and right-directions plus four oblique left-upper-, left-lower, right-upper- and right-lower directions. This is a third embodiment of the present invention.

Figure 18:
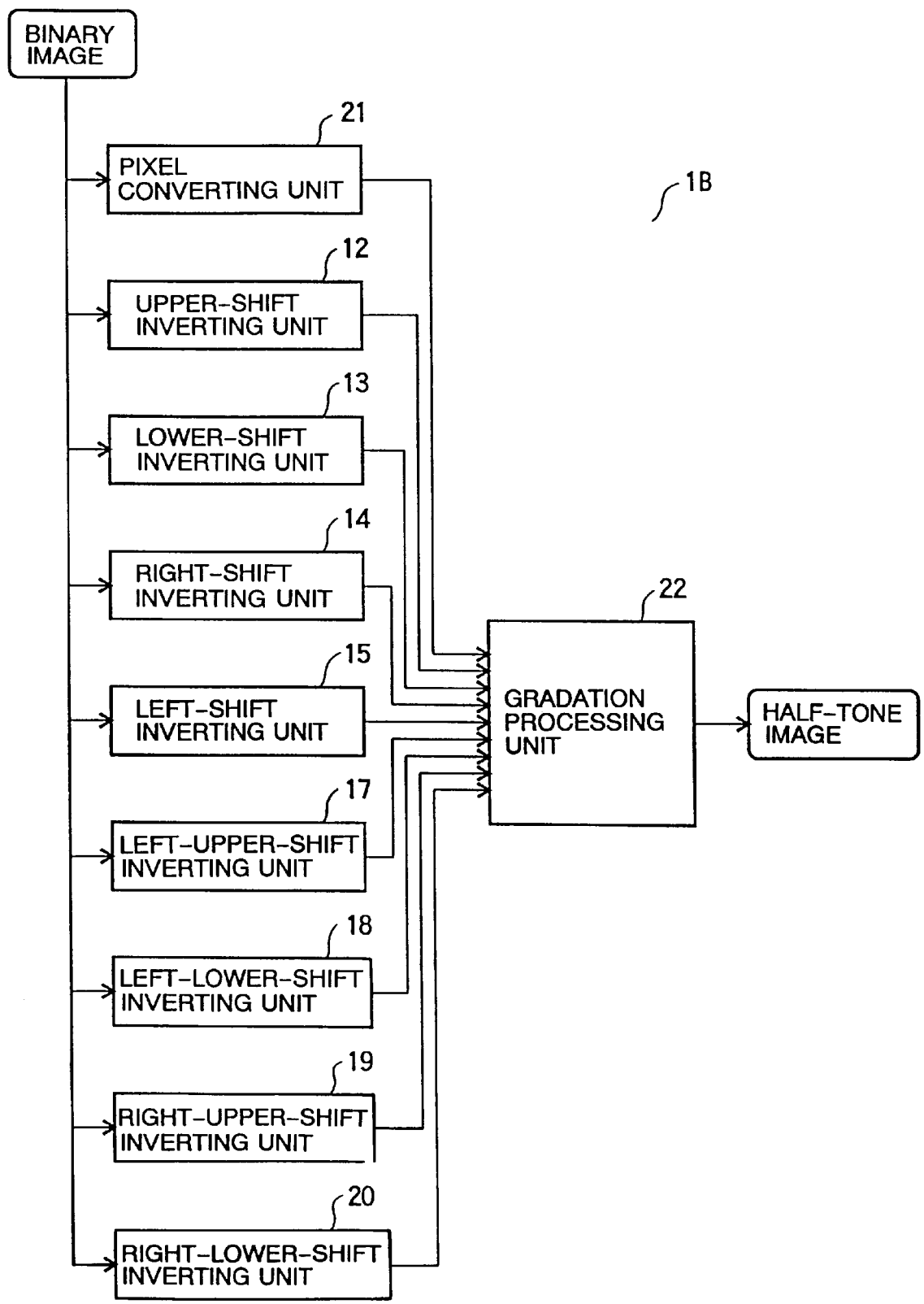
FIG. 18 is a block diagram illustrating a functional construction of the half-tone processing unit defined as a principal portion of the image half-tone processor in a third embodiment of the present invention.

FIG. 18 illustrates a functional construction of the half-tone processing unit defined as the principal unit of the image half-tone processor in accordance with the third embodiment of the present invention.

A half-tone processing unit 1B in FIG. 18 includes the upper-shift inverting unit 12, the lower-shift inverting unit 13, the right-shift inverting unit 14, the left-shift inverting unit 15, the left-upper-shift inverting unit 17, the left-lower-shift inverting unit 18, the right-upper-shift inverting unit 19, and the right-lower-shift inverting unit 20 in addition to a pixel converting unit 21 and a gradation processing unit 22, which incorporate the same functions as those in FIGS. 1 and 11.

The pixel converting unit 21 weights each of the pixels constituting the primary binary image. A specific weighting process by this pixel converting unit 21 is that, for instance, "0" is, as it is, allocated to the white pixel, while the black pixel is allocated with a value of "9", which is larger than "1", with respect to the binary image consisting of the white pixels set to "0" and the black pixels set to "1".

The upper-shift inverting unit 12, the lower-shift inverting unit 13, the left-shift inverting unit 14, the right-shift inverting unit 15, the left-upper-shift inverting unit 17, the left-lower-shift inverting unit 18, the right-upper-shift inverting unit 19 and the right-lower-shift inverting unit 20 black-and-white-invert the primary binary image and shift it upward, downward, leftward, rightward, left upward, left downward, right upward, and right downward by one dot on the pixel coordinates, and space areas produced due to shifting are filled with "1", thereby generating the binary image.

The gradation processing unit 22 forms a half-tone image on the basis of the multivalued image obtained by the pixel converting unit 21, and eight pieces of binary images obtained respectively by, in this case, the upper-shift inverting unit 12, the lower-shift inverting unit 13, the left-shift inverting unit 14, the right-shift inverting unit 15, the left-upper-shift inverting unit 17, the left-lower-shift inverting unit 18, the right-upper-shift inverting unit 19 and the right-lower-shift inverting unit 20. The gradation processing unit 22 executes a subtracting process on the pixel basis between the multivalued image obtained by the pixel converting unit 21 and the eight binary images obtained respectively by the upper-shift inverting unit 12, the lower-shift inverting unit 13, the right-shift inverting unit 14, the left-shift inverting unit 15, the left-upper-shift inverting unit 17, the left-lower-shift inverting unit 18, the right-upper-shift inverting unit 19 and the right-lower-shift inverting unit 20, and thereby obtains the half-tone image by additionally synthesizing these images. More specifically, the gradation processing unit 22 subtracts "1" from the weighted pixels described above, when the pixels of the thus inverted/shifted binary image which pixels are disposed in corresponding coordinate positions, are "1" with respect to the weighted pixels having the pixel values "9" in the coordinate positions where the multivalued image exists. At this time, no subtracting process is effected on the pixels "0" of the multivalued image. This subtracting process is repeated with respect to each of the eight inverted/shifted binary images. The half-tone image is a result of all the eight inverted/shifted binary images being subtracted per pixel by the gradation processing unit 22.

The image half-tone processor using the thus operated half-tone processing 1B is constructed in the same way as illustrated in FIG. 2. In this case, the half-tone processing unit 1B substitutes for the half-tone processing unit 1.

Next, the processing operation of the image half-tone processing unit 1B illustrated in FIG. 18 will be specifically explained with reference to FIGS. 3, 5 through 8, 12 through 15 and 19 through 21.

FIG. 3 illustrates one example of the primary binary image consisting of the white and black pixels inputted to the half-tone processing unit 1B shown in FIG. 18. As previously stated, the primary binary image is expressed in such a way that, for example, the pixel value of the white pixel is "0", white the pixel value of the black pixel is "0".

Figure 19:
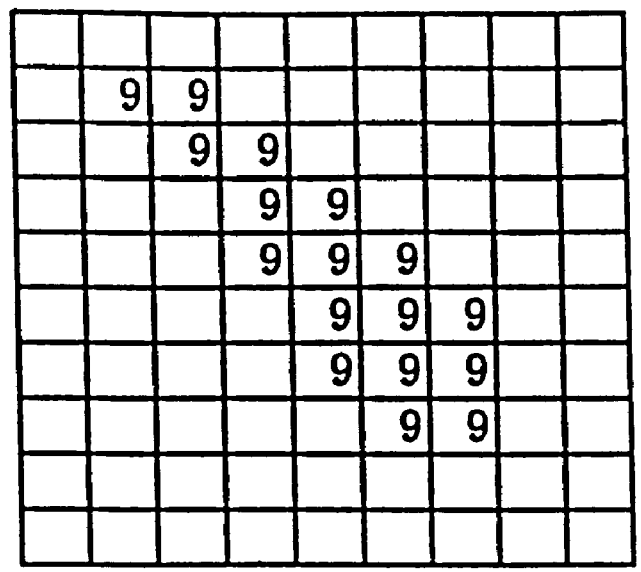
FIG. 19 is a schematic diagram showing image data for explaining an operation in the image processor in FIG. 18.

The pixel converting unit 21 makes the pixel values of the white pixels remain to be "0", and weights the pixel values of the black pixels with pixel values "9", whereby the primary binary image in FIG. 3 is thus converted into a weighted multivalued image as illustrated in FIG. 19.

The upper-shift inverting unit 12 exchanges the pixel values "0" and the pixel values "1" to each other, of the primary binary image in FIG. 3, and shifts the entire image upward by one pixel, i.e., by one dot, whereby the primary binary image is converted into an inverted upper-shifted image as shown in FIG. 5. At this time, the lowermost single row is filled with "1".

The lower-shift inverting unit 13 exchanges the pixel values "0" and the pixel values "1" to each other, of the primary binary image in FIG. 3, and shifts the entire image downward by one pixel, i.e., by one dot, whereby the primary binary image is converted into an inverted lower-shifted image as shown in FIG. 6. At this time, the uppermost single row is filled with "1".

The right-shift inverting unit 14 exchanges the pixel values "0" and the pixel values "1" to each other, of the primary binary image in FIG. 3, and shifts the entire image rightward by one pixel, i.e., by one dot, whereby the primary binary image is converted into an inverted right-shifted image as shown in FIG. 7. At this time, the leftest single row is filled with "1".

The left-shift inverting unit 15 exchanges the pixel values "0" and the pixel values "1" to each other, of the primary binary image in FIG. 3, and shifts the entire image leftward by one pixel, i.e., by one dot, whereby the primary binary image is converted into an inverted left-shifted image as shown in FIG. 8. At this time, the rightest single row is filled with "1".

The left-upper-shift inverting unit 17 exchanges the pixel values "0" and the pixel values "1" to each other, of the primary binary image in FIG. 3, and shifts the entire image leftward by one dot and upward by one dot in the Figure, whereby the primary binary image is converted into an inverted left-upper-shifted image as shown in FIG. 12. At this time, each of the rightest and lowermost rows is filled with "1".

The left-lower-shift inverting unit 18 exchanges the pixel values "0" and the pixel values "1" to each other, of the primary binary image in FIG. 3, and shifts the entire image leftward by one dot and downward by one dot in the Figure, whereby the primary binary image is converted into an inverted left-lower-shifted image as shown in FIG. 13. At this time, each of the rightest and uppermost rows is filled with "1".

The right-upper-shift inverting unit 19 exchanges the pixel values "0" and the pixel values "1" to each other, of the primary binary image in FIG. 3, and shifts the entire image rightward by one dot and upward by one dot in the Figure, whereby the primary binary image is converted into an inverted right-upper-shifted image as shown in FIG. 14. At this time, each of the leftest and lowermost rows is filled with "1".

Similarly, the right-lower-shift inverting unit 20 exchanges the pixel values "0" and the pixel values "1" to each other, of the primary binary image in FIG. 3, and shifts the entire image rightward by one dot and downward by one dot in the Figure, whereby the primary binary image is converted into an inverted right-lower-shifted image as shown in FIG. 15. At this time, each of the leftest and uppermost rows is filled with "1".

Figure 20:
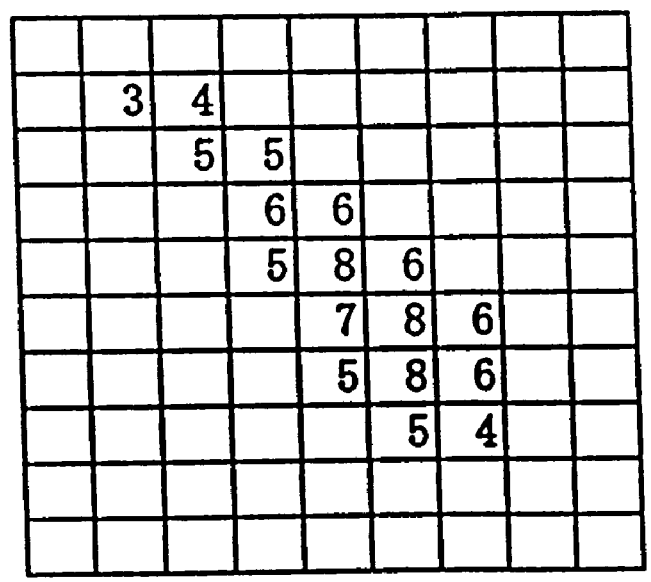
FIG. 20 is a schematic diagram showing the image data for explaining the operation in the image processor in FIG. 18.

Subtracted from the weighted multivalued image formed by the pixel converting unit 21 that is shown in FIG. 19 are the inverted upper-shifted image (FIG. 5), the inverted lower-shifted image (FIG. 6), the inverted right-shifted image (FIG. 7), the inverted left-shifted image (FIG. 8), the inverted left-upper-shifted image (FIG. 12), the inverted left-lower-shifted image (FIG. 13), the inverted right-upper-shifted image (FIG. 14), and the inverted right-lower-shifted image (FIG. 15) that are composed of the binary images formed respectively by the upper-shift inverting unit 12, the lower-shift inverting unit 13, the left-shift inverting unit 14, the right-shift inverting unit 15, the left-upper-shift inverting unit 17, the left-lower-shift inverting unit 18, the right-upper-shift inverting unit 19 and the right-lower-shift inverting unit 20. Then, the image data thereof are synthesized, and a half-tone image with gradations containing a half-tone as shown in FIG. 20 is formed. More specifically, the half-tone image in FIG. 20 is formed by subtracting the pixel values "0" or "1" of the inverted upper-shifted image, the inverted lower-shifted image, the inverted right-shifted image, the inverted left-shifted image, the inverted left-upper-shifted image, the inverted left-lower-shifted image, the inverted right-upper-shifted image and the inverted right-lower-shifted image, from the pixel values "9" with respect to the pixels having the pixel values "9" excluding the pixel values "0" of the weighted multivalued image.

Figure 21:
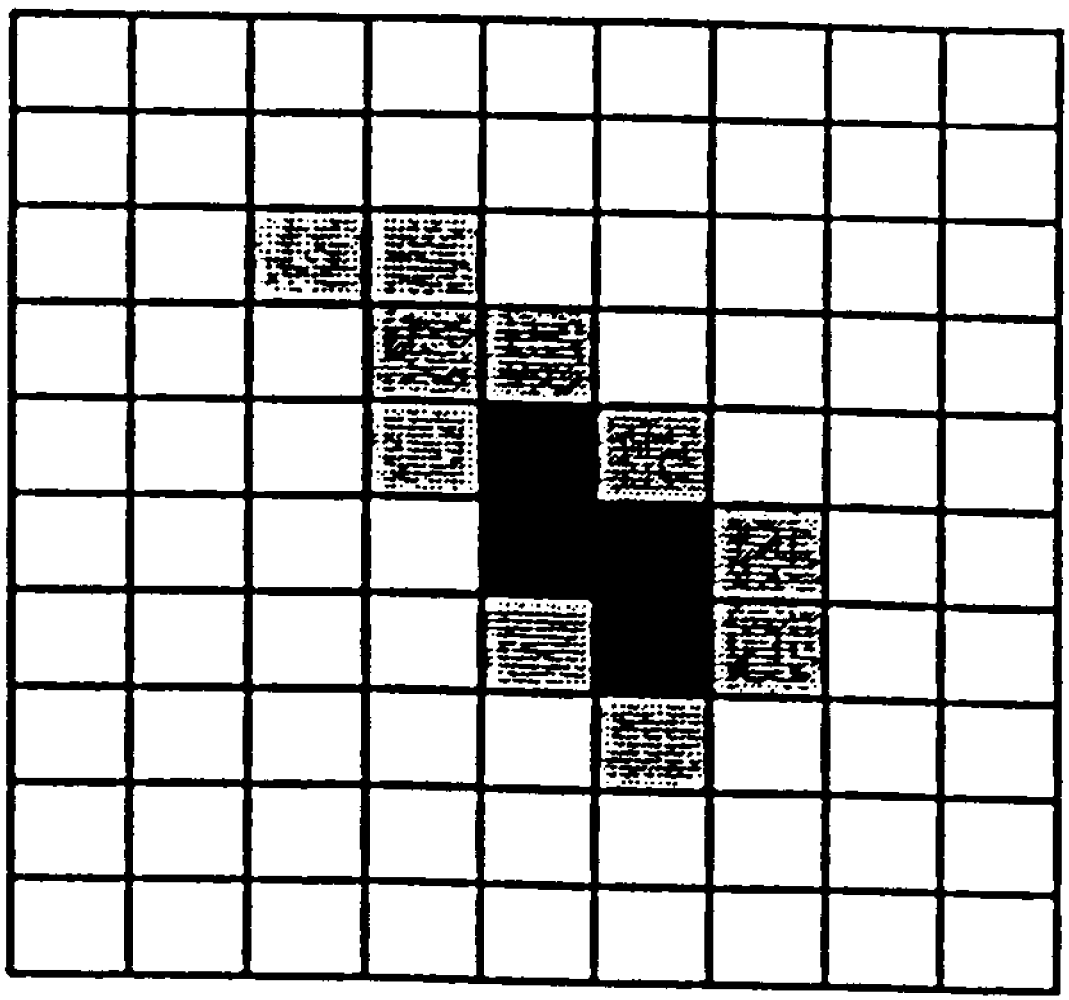
FIG. 21 is a schematic diagram showing the image data for explaining the operation in the image processor in FIG. 18.

The thus formed half-tone image is provided with gradations, e.g., density gradations corresponding to the pixel values and then outputted by the image outputting device 2. FIG. 21 shows one example of outputting, wherein, for example, the pixels having the pixel values "8" are expressed in 100% black, the pixels having the pixel values "7" are in 80% black, the pixels having the pixel values "6" are in 64% black, the pixels having the pixel values "5" are in 48% black, the pixels having the pixel values "4" are in 32% black, the pixels having the pixel values "3" are in 16% black, and the pixels having the pixel values "0" are in 0% black (i.e., white).

With this arrangement, a protruded portion of rugged portions of outline of the primary binary image is expressed with multi-gradations, thereby further smoothing the whole outline in terms of the visual aspect. This makes it feasible to provide the easy-to-see display or print with a high visual recognizability.

Embodiment 4

In the above-mentioned gradation processing unit 1 shown in FIG. 1, the inverted image of the primary binary image is upper- lower- left- and right-shifted, and the subtraction from the weighted multivalued image is executed, thereby forming the half-tone image. The half-tone image may be formed by subtracting the pixels having the pixel values "0" of the upper- lower- left- and right-shifted image without inverting the primary binary image. This is a fourth embodiment of the present invention.

Figure 22:
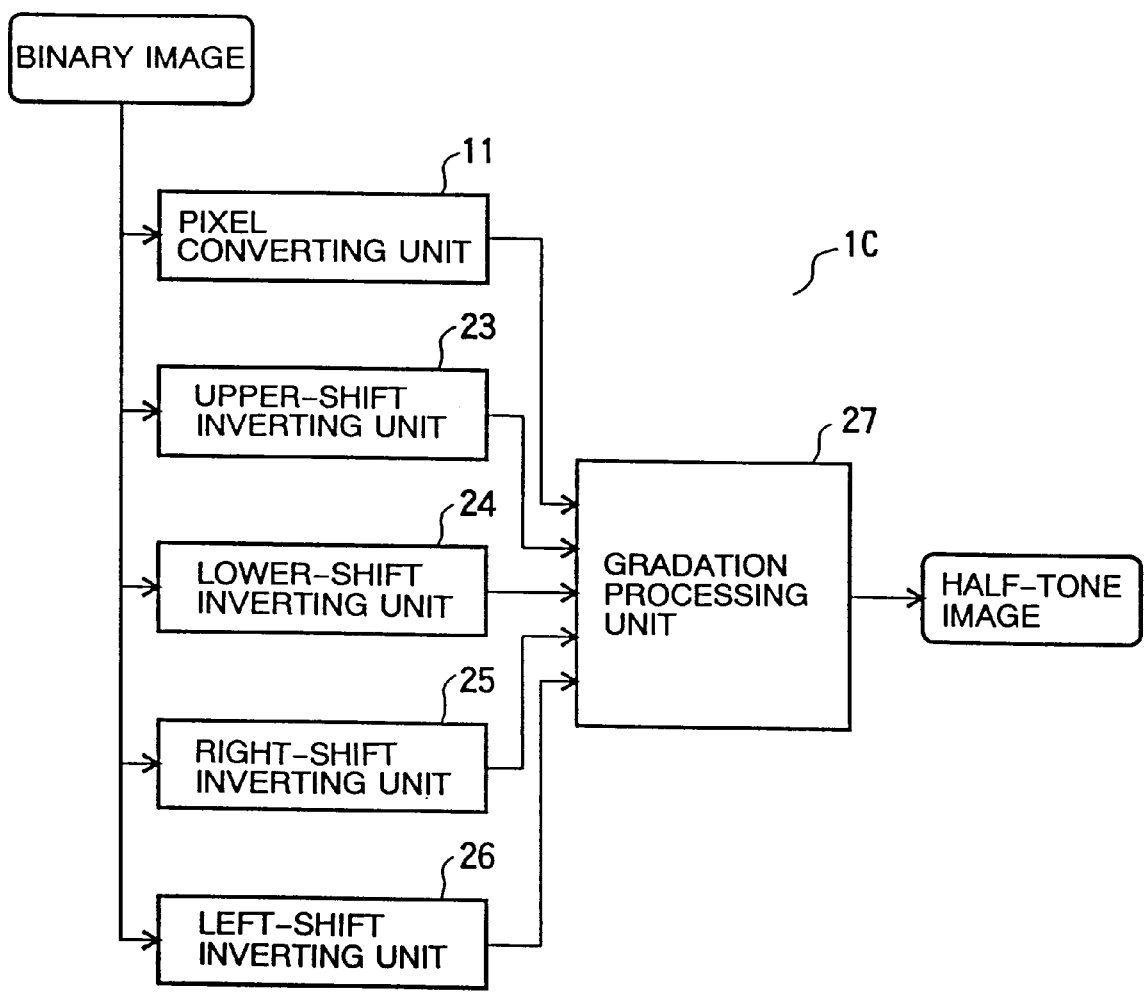
FIG. 22 is a block diagram illustrating a functional construction of the half-tone processing unit defined as a principal portion of the image half-tone processor in a fourth embodiment of the present invention.

FIG. 22 illustrates a functional construction of the half-tone processing unit defined as the principal unit of the image half-tone processor in accordance with the fourth embodiment of the present invention.

A half-tone processing unit 1C in FIG. 22 includes an upper-shift processing unit 23, a lower-shift processing unit 24, a right-shift processing unit 25, a left-shift processing unit 26, and a gradation processing unit 27 in addition to the image converting unit 11 incorporating the same function as that in FIG. 1.

The pixel converting unit 11 weights each of the pixels constituting the primary binary image. A specific weighting process by this pixel converting unit 11 is that, for Instance, "0" is, as it is, allocated to the white pixel, while the black pixel is allocated with a value of "5" in this case, which is larger than "1", with respect to the binary image consisting of the white pixels set to "0" and the black pixels set to "1".

The upper-shift processing unit 23 shifts the primary binary image upward by one pixel, i.e., by one dot on the pixel coordinates. That is, the upper-shift processing unit 23 shifts the given binary image upward by one dot, and further forms a binary image wherein the lowermost single row is filled with "0".

The lower-shift processing unit 24 shifts the primary binary image downward by one pixel, i.e., by one dot on the pixel coordinates. That is, the lower-shift processing unit 24 shifts the given binary image downward by one dot, and further forms a binary image wherein the uppermost single row is filled with "0".

The right-shift processing unit 25 shifts the primary binary image rightward by one pixel, i.e., by one dot on the pixel coordinates. That is, the right-shift processing unit 25 shifts the given binary image rightward by one dot, and further forms a binary image wherein the leftest single row is filled with "0".

The left-shift processing unit 26 shifts the primary binary image leftward by one pixel, i.e., by one dot on the pixel coordinates. That is, the left-shift processing unit 26 shifts the given binary image leftward by one dot, and further forms a binary image wherein the rightest single row is filled with "0".

The gradation processing unit 27 forms a half-tone image based on a multivalued image obtained by the pixel converting unit 11, and four pieces of binary images obtained respectively by the upper-shift processing unit 23, the lower-shift processing unit 24, the right-shift processing unit 25 and the left-shift processing unit 26. The gradation processing unit 27 executes a subtracting process on the pixel basis on the basis of the four binary images obtained respectively by the upper-shift processing unit 23, the lower-shift processing unit 24, the right-shift processing unit 25 and the left-shift processing unit 26, and thereby obtains the half-tone image by additionally synthesizing these images. More specifically, the gradation processing unit 27 subtracts "1" from the weighted pixels described above, when the pixels of the thus shifted binary image which pixels are disposed in corresponding coordinate positions, are "0" with respect to the weighted pixels having the pixel values "5" in the coordinate positions where the multivalued image exists. At this time, no subtracting process is effected on the pixels "0" of the multivalued image. This subtracting process is repeated with respect to each of the four shifted binary images. For example, if all the pixel values of the four binary images in the coordinate positions corresponding to the pixel values "5" of the multivalued image, are "0", the pixel value of the relevant pixel as a result (5−1−1−1−1=1) of performing all the subtractions, becomes "1". The half-tone image is a result of all the four shifted binary images being subtracted per pixel by the gradation processing unit 27.

The image half-tone processor using the thus operated half-tone processing 1C is constructed as in the same way in FIG. 2. In this case, the half-tone processing unit 1 is replaced with the half-tone processing unit 1C.

The image half-tone processor using the half-tone processing unit 1C illustrated in FIG. 22 forms the same half-tone image as the image shown in FIG. 9, and the thus formed half-tone image is provided with gradations, e.g., density gradations corresponding to the pixel values and then outputted. FIG. 17 shows outputting, wherein, for example, the pixels having the pixel values "5" are expressed in 100% black, the pixels having the pixel values "4" are in 75% black, the pixels having the pixel values "3" are in 50% black, the pixels having the pixel values "2" are in 25% black, and the pixels having the pixel values "0" are in 0% black (i.e., white).

Embodiment 5

In the above-mentioned gradation processing unit 1C shown in FIG. 22, the half-tone image is formed by shifting the primary binary image upward, downward, leftward and rightward and effecting the subtraction from the weighted multivalued image. The half-tone image may also be, however, formed by performing the subtraction based on the image that is shifted in four oblique directions, i.e., left upward, left downward, right upward, and right downward instead of the upper-, lower-, left- and right-directions. This is a fifth embodiment of the present invention.

Figure 23:
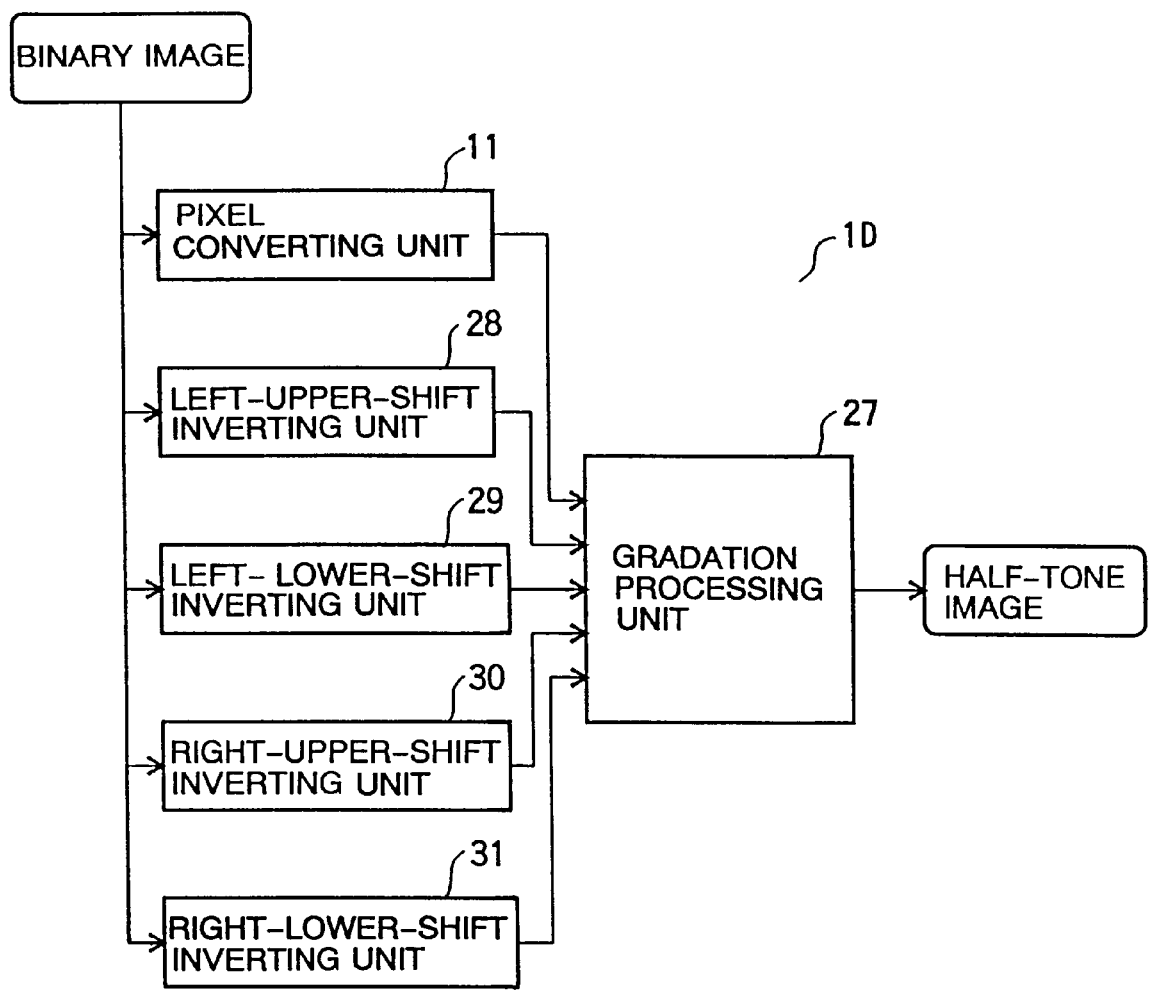
FIG. 23 is a block diagram illustrating a functional construction of the half-tone processing unit defined as a principal portion of the image half-tone processor in a fifth embodiment of the present invention.

FIG. 23 illustrates a functional construction of the half-tone processing unit defined as the principal unit of the image half-tone processor in accordance with the fifth embodiment of the present invention.

A half-tone processing unit 1D in FIG. 23 includes a left-upper-shift processing unit 28, a left-lower-shift processing unit 29, a right-upper-shift processing unit 30, and a right-lower-shift processing unit 31 in addition to the image converting unit 11 and the gradation processing unit 27 that incorporate the same functions as those in FIG. 22.

The pixel converting unit 11, as already described, weights each of the pixels constituting the primary binary image. A specific weighting process by this pixel converting unit 11 is that, for instance, "0" is, as it is, allocated to the white pixel, while the black pixel is allocated with a value of "5", which is larger than "1", with respect to the binary image consisting of the white pixels set to "0" and the black pixels set to "1".

The left-upper-shift processing unit 28 shifts the primary binary image left upward by one dot on the pixel coordinates. That is, the left-upper-shift processing unit 28 shifts the given binary image leftward by one dot and upward by one dot, and further forms a binary image wherein each of the rightest and lowermost rows is filled with "0".

The left-lower-shift processing unit 29 shifts the primary binary image left downward by one dot on the pixel coordinates. That is, the left-lower-shift processing unit 29 shifts the given binary image leftward by one dot and downward by one dot, and further forms a binary image wherein each of the rightest and uppermost rows is filled with "0".

The right-upper-shift processing unit 30 shifts the primary binary image right upward by one dot on the pixel coordinates. That is, the right-upper-shift processing unit 30 shifts the given binary image rightward by one dot and upward by one dot, and further forms a binary image wherein each of the leftest and lowermost rows is filled with "0".

The right-lower-shift processing unit 31 shifts the primary binary image right downward by one dot on the pixel coordinates. That is, the right-lower-shift processing unit 31 shifts the given binary image rightward by one dot and downward by one dot, and further forms a binary image wherein each of the leftest and uppermost rows is filled with "0".

The gradation processing unit 27 forms a half-tone image based on a multivalued image obtained by the pixel converting unit 11, and four pieces of binary images obtained respectively by, in this case, the left-upper-shift processing unit 28, the left-lower-shift processing unit 29, the right-upper-shift processing unit 30 and the right-lower-shift processing unit 31. The gradation processing unit 27 executes a subtracting process on the pixel basis between the multivalued image obtained by the pixel converting unit 11 and the four binary images obtained respectively by the left-upper-shift processing unit 28, the left-lower-shift processing unit 29, the right-upper-shift processing unit 30 and the right-lower-shift processing unit 31, and thereby obtains the half-tone image by additionally synthesizing these images. More specifically, the gradation processing unit 27 subtracts "1" from the weighted pixels described above, when the pixels of the thus shifted binary image which pixels are disposed in corresponding coordinate positions, are "0" with respect to the weighted pixels having the pixel values "5" in the coordinate positions where the multivalued image exists. At this time, no subtracting process is effected on the pixels "0" of the multivalued image. This subtracting process is repeated with respect to each of the four shifted binary images. The half-tone image is a result of all the four shifted binary images being subtracted per pixel by the gradation processing unit 27.

The image half-tone processor using the thus operated half-tone processing 1D is constructed as in the same way in FIG. 2. In this case, the half-tone processing unit 1 is replaced with the half-tone processing unit 1D.

The image half-tone processor using the half-tone processing unit 1D illustrated in FIG. 23 forms the same half-tone image as the image shown in FIG. 16, and the half-tone image is provided with gradations, e.g., density gradations corresponding to the pixel values and then outputted. Obtained is outputting shown in FIG. 17, wherein, for example, the pixels having the pixel values "4" are expressed in 100% black, the pixels having the pixel values "3" are in 66% black, the pixels having the pixel values "2" are in 33% black, and the pixels having the pixel values "0" are in 0% black (i.e., white).

Embodiment 6

In the above-mentioned gradation processing unit 1C shown in FIG. 22, the half-tone image is formed by shifting the primary binary image upward, downward, leftward and rightward and effecting the subtraction from the weighted multivalued image. In the gradation processing unit 1D shown in FIG. 23, the half-tone image is formed by shifting the primary binary image left upward, left downward, right upward, and right downward and executing the subtraction from the weighted multivalued image. The half-tone image may also be, however, formed by subtracting the image shifted in totally eight directions containing four oblique left-upper-, left-lower-, right-upper- and right-lower-directions plus the upper-, lower-, left- and right-directions. This is a sixth embodiment of the present invention.

Figure 24:
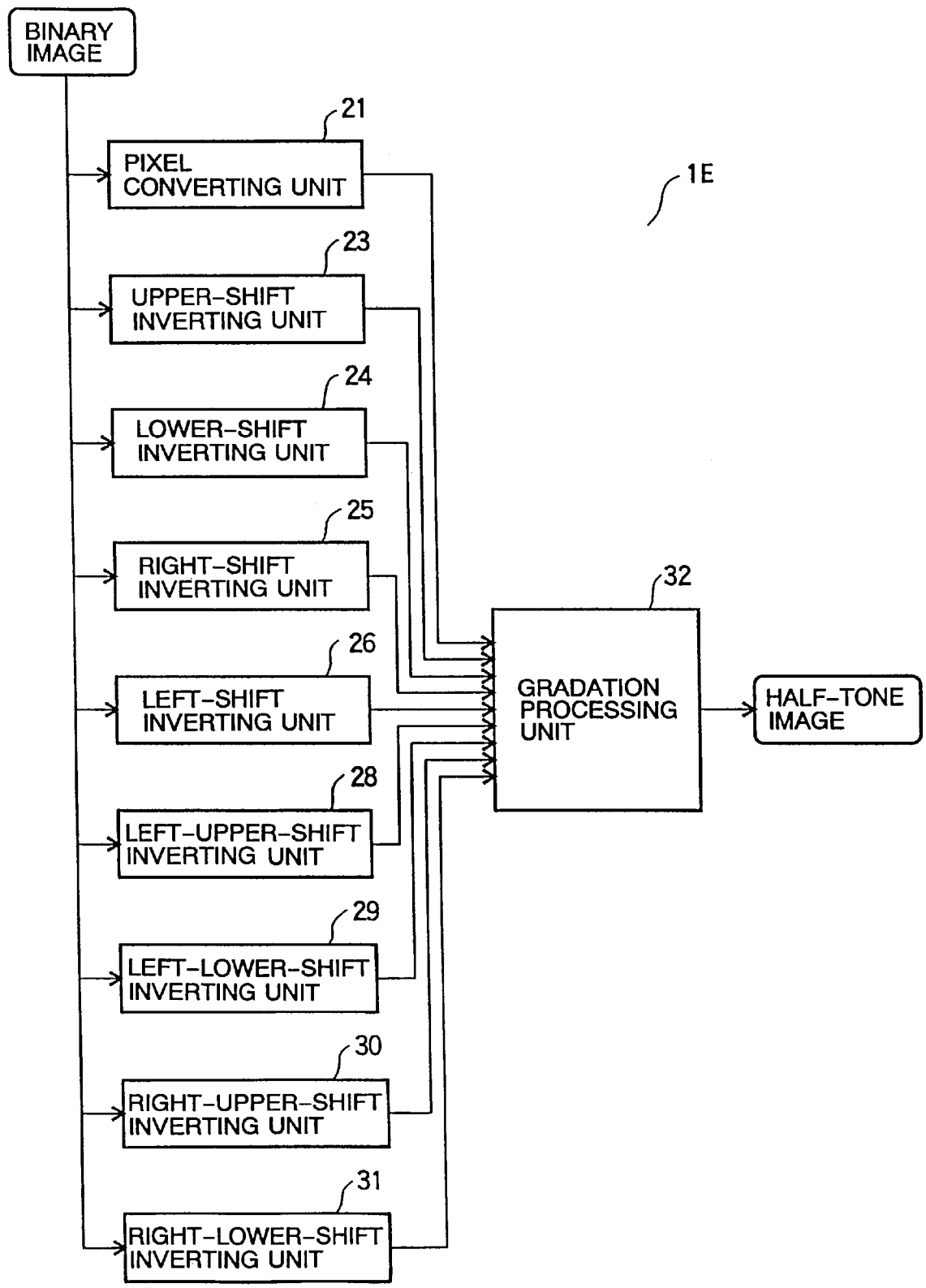
FIG. 24 is a block diagram illustrating a functional construction of the half-tone processing unit defined as a principal portion of the image half-tone processor in a sixth embodiment of the present invention.

FIG. 24 illustrates a functional construction of the half-tone processing unit defined as the principal unit of the image half-tone processor in accordance with the sixth embodiment of the present invention.

A half-tone processing unit 1E in FIG. 24 includes the pixel converting unit 21 incorporating the same function as that in FIG. 18, the upper-shift processing unit 23, the lower-shift processing unit 24, the right-shift processing unit 25, the left-shift processing unit 26, the left-upper-shift processing unit 28, the left-lower-shift processing unit 29, the right-upper-shift processing unit 30, and the right-lower-shift processing unit 31. The half-tone processing unit 1E also, in addition to the above units, a gradation processing unit 32.

The pixel converting unit 21, as already stated, weights each of the pixels constituting the primary binary image. A specific weighting process by this pixel converting unit 21 is that, for instance, "0" is, as it is, allocated to the white pixel, while the black pixel is allocated with a value of "9", which is larger than "1", with respect to the binary image consisting of the white pixels set to "0" and the black pixels set to "1".

The upper-shift processing unit 23, the lower-shift processing unit 24, the right-shift processing unit 25, the left-shift processing unit 26, the left-upper-shift processing unit 28, the left-lower-shift processing unit 29, the right-upper-shift processing unit 30, and the right-lower-shift processing unit 31, shift the primary binary image by one dot upward, downward, leftward, rightward, left upward, left downward, right upward and right downward on the pixel coordinates. Then, a binary image is formed by filling space portions produced by shifting with "0".

The gradation processing unit 32 forms a half-tone image based on a multivalued image obtained by the pixel converting unit 21, and eight pieces of binary images obtained respectively by, in this case, the upper-shift processing unit 23, the lower-shift processing unit 24, the right-shift processing unit 25, the left-shift processing unit 26, the left-upper-shift processing unit 28, the left-lower-shift processing unit 29, the right-upper-shift processing unit 30, and the right-lower-shift processing unit 31. The gradation processing unit 32 executes a subtracting process on the pixel basis between the multivalued image obtained by the pixel converting unit 21 and the eight binary images obtained respectively by the upper-shift processing unit 23, the lower-shift processing unit 24, the right-shift processing unit 25, the left-shift processing unit 26, the left-upper-shift processing unit 28, the left-lower-shift processing unit 29, the right-upper-shift processing unit 30 and the right-lower-shift processing unit 31, and thereby obtains the half-tone image by additionally synthesizing these images. More specifically, the gradation processing unit 32 subtracts "1" from the weighted pixels described above, when the pixels of the thus shifted binary image which pixels are disposed in corresponding coordinate positions, are "0" with respect to the weighted pixels having the pixel values "9" in the coordinate positions where the multivalued image exists. At this time, no subtracting process is effected on the pixels "0" of the multivalued image. This subtracting process is repeated with respect to each of the eight shifted binary images. The half-tone image is a result of all the eight shifted binary images being subtracted per pixel by the gradation processing unit 32.

The image half-tone processor using the thus operated half-tone processing 1E is constructed as in the same way in FIG. 2. In this case, the half-tone processing unit 1 is replaced with the half-tone processing unit 1E.

The image half-tone processor using the half-tone processing unit 1E illustrated in FIG. 24 forms the same half-tone image as the image shown in FIG. 20, and the half-tone image is provided with gradations, e.g., density gradations corresponding to the pixel values and then outputted. Obtained is outputting shown in FIG. 21, wherein, for example, the pixels having the pixel values "8" are expressed in 100% black, the pixels having the pixel values "7" are in 80% black, the pixels having the pixel values "6" are in 64% black, the pixels having the pixel values "5" are in 48% black, the pixels having the pixel values "4" are in 32% black, the pixels having the pixel values "3" are in 16% black, and the pixels having the pixel values "0" are in 0% black (i.e., white).

Embodiment 7

Figure 25:
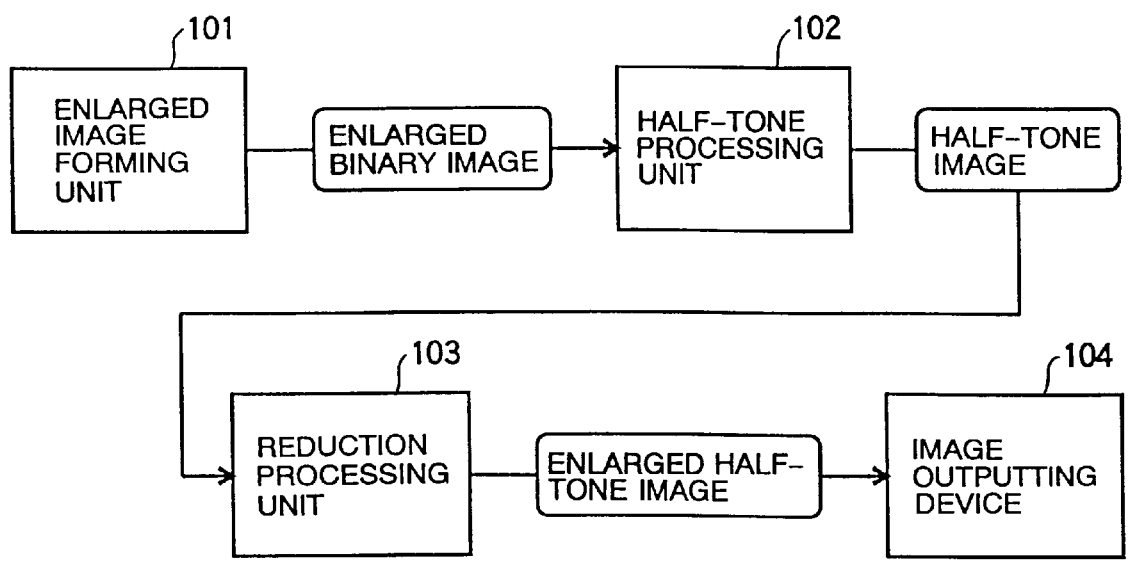
FIG. 25 is a block diagram showing a system construction of the image half-tone processor in a seventh embodiment of the present invention.

FIG. 25 illustrates a construction of the image half-tone processor in a seventh embodiment of the present invention. The image half-tone processor shown in FIG. 25 is constructed of an enlarged image forming unit 101, a half-tone processing unit 102, a reduction processing unit 103 and an image outputting device 104.

The enlarged image forming unit 101 outputs an enlarged binary image that is (x×y) times, e.g., (2×2) times as large as a desired output size. This enlarged binary image is defined as an image of a character font, etc., and the enlarged image forming unit 101 forms, as in the case of a font generator of a so-called outline font, such an image that a pixel resolution, viz., the dot density does not decrease due to the enlargement.

The half-tone processing unit 102 gradates the above enlarged binary image substantially in the same manner as the half-tone processing unit 1 shown in FIG. 2, thus obtaining a half-tone image.

The reduction processing unit 103 reduces the half-tone image gradated by the half-tone processing unit 102 by a factor of (1/x)×(1/y), in this case, (½)×(½) corresponding to a factor of enlargement of the enlarged image forming unit 101, thus forming a reduced half-tone image.

The image outputting device 104 is classified as a display or a printer for outputting the reduced half-tone image formed by the reduction processing unit 103 while giving it a multi-gradation expression, and is, it is assumed, e.g., the display such as a liquid crystal display.

Figures 26, 27:
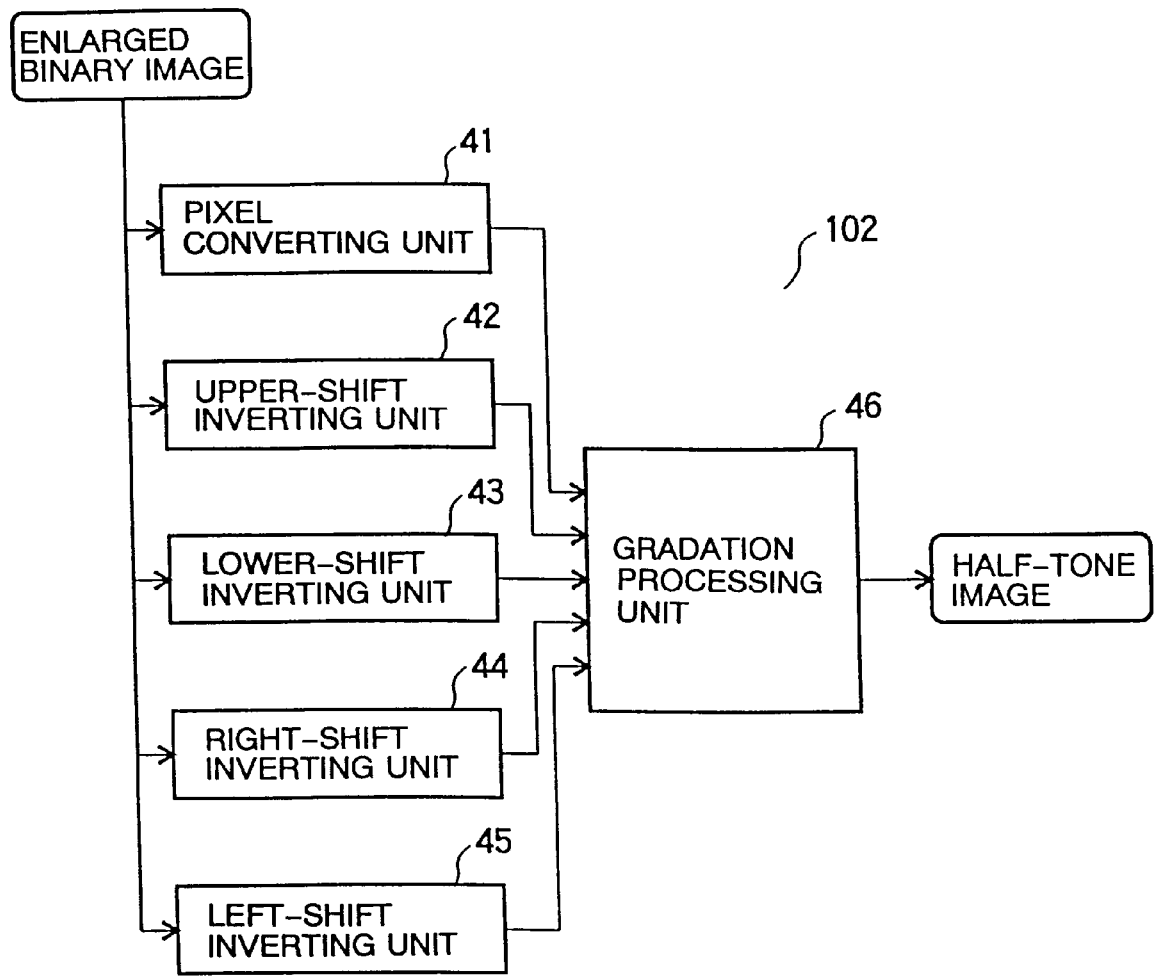
FIG. 26 is a block diagram illustrating the functional construction of the half-tone processing unit defined as a principal portion of the image half-tone processor in FIG. 25.
FIG. 27 is a schematic diagram showing image data for explaining an operation in the image processor in FIG. 25.

FIG. 26 shows details of functional construction of the half-tone processing unit 102.

The half-tone processing unit 102 in FIG. 25 includes a pixel converting unit 41, an upper-shift inverting unit 42, a lower-shift inverting unit 43, a right-shift inverting unit 44, a left-shift inverting unit 45 and a gradation processing unit 46.

The pixel converting unit 11 weights each of pixels constituting the above enlarged binary image formed by the enlarged image forming unit 101. A specific weighting process by this pixel converting unit 41 is that, for example, with a white pixel set to "0" and a black pixel set to "1", "0" is, as it is, allocated to the white pixel, while the black pixel is allocated with a value of "5" in this case, which is larger than "1", with respect to the enlarged binary image consisting of those binary numbers, i.e., "0" and "1".

The upper-shift inverting unit 42 black-and-white-inverts the enlarged binary image and shifts it upward by one pixel, i.e., by one dot on the pixel coordinates. That is, the upper-shift inverting unit 42 forms an inverted binary image with the exchange of the white pixel "0" and the black pixel "1" of the given enlarged binary image, shifts this inverted binary-image upward by one dot, and further forms a binary image wherein the lowermost single row is filled with "1".

The lower-shift inverting unit 43 black-and-white-inverts the enlarged binary image and shifts it downward by one pixel, i.e., by one dot on the pixel coordinates. That is, the lower-shift inverting unit 43 forms an inverted binary image with the exchange of the white pixel "0" and the black pixel "1" of the given enlarged binary image, shifts this inverted binary image downward by one dot, and further forms a binary image wherein the uppermost single row is filled with "1".

The right-shift inverting unit 44 black-and-white-inverts the enlarged binary image and shifts it rightward by one pixel, i.e., by one dot the on the pixel coordinates. That is, the right-shift inverting unit 44 forms an inverted binary image with the exchange of the white pixel "0" and the black pixel "1" of the given enlarged binary image, shifts the inverted binary image rightward by one dot, and further forms a binary image wherein the leftest single row is filled with "1".

The left-shift inverting unit 45 black-and-white-inverts the enlarged binary image and shifts it leftward by one pixel, i.e., by one dot on the pixel coordinates. That is, the left-shift inverting unit 45 forms an inverted binary image with the exchange of the white pixel "0" and the black pixel "1" of the given enlarged binary image, shifts this inverted binary image leftward by one dot, and further forms a binary image wherein the rightest single row is filled with "1".

The gradation processing unit 46 forms a half-tone image based on a multivalued image obtained by the pixel converting unit 41, and four pieces of binary images obtained respectively by the upper-shift inverting unit 42, the lower-shift inverting unit 43, the right-shift inverting unit 44 and the left-shift inverting unit 45. That is, the gradation processing unit 46 executes a subtracting process on the pixel basis between the multivalued image obtained by the pixel converting unit 41 and the four binary images obtained respectively by the upper-shift inverting unit 42, the lower-shift inverting unit 43, the right-shift inverting unit 44 and the left-shift inverting unit 45, and thereby obtains the half-tone image by additionally synthesizing these images. More specifically, the gradation processing unit 46 subtracts "1" from the weighted pixels described above, when the pixels of the thus inverted/shifted binary image which pixels are disposed in corresponding coordinate positions, are "1" with respect to the weighted pixels having the pixel values "5" in the coordinate positions where the multivalued image exists. At this time, no subtracting process is effected on the pixels "0" of the multivalued image. This subtracting process is repeated with respect to each of the four inverted/shifted binary images. For instance, if all the pixel values of the four binary images in the coordinate positions corresponding to the pixel values "5" of the above multivalued image, are "1", the pixel value of the relevant pixel as a result (5−1−1−1−1=1) of executing all the subtractions, becomes "1". The half-tone image is a result of all the four inverted/shifted binary images being subtracted per pixel by the gradation processing unit 46.

The above-described half-tone image formed by the half-tone processing unit 102 is a half-tone image corresponding to the enlarged binary image, and therefore reduced by the reduction processing unit 103 shown in FIG. 25 into a reduced half-tone image in accordance with a desired output size. This reduced half-tone image is outputted by the image outputting device 104.

The processing operation of the half-tone processing unit 102 in this case is substantially the same as that by the half-tone processing unit 1 in FIG. 1.

Given to the half-tone processing unit 102 is the binary image as a (2×2)-fold enlarged binary image consisting of the white and black pixels as illustrated in FIG. 3. The enlarged binary image is expressed in such a way that, for example, the white pixel has the pixel value "0", while the black pixel has the pixel value "1".

The pixel converting unit 41 converts the enlarged binary image in FIG. 3 into a weighted multivalued image as shown in FIG. 4 by setting the pixel value of the white pixel to "0" as it is and by weighting the pixel value of the black pixel having the pixel value "1", with "5"

The upper-shift inverting unit 42 black-and-white-inverts the above enlarged binary image in FIG. 3 by exchanging the pixel values "0" and the pixel values "1" to eahc other, and shifts the entire image upward by one pixel, i.e., by one dot, whereby the binary image is converted into an inverted upper-shifted image as shown in FIG. 5. At this time, the lowermost single row is filled with "1".

The lower-shift inverting unit 43 exchanges the pixel values "0" and the pixel values "1" to each other, of the enlarged binary image in FIG. 3, and shifts the entire image downward by one pixel, i.e., by one dot, whereby the binary image is converted into an inverted lower-shifted image as shown in FIG. 6. At this time, the uppermost single row is filled with "1".

The right-shift inverting unit 44 exchanges the pixel values "0" and the pixel values "1" to each other, of the enlarged binary image in FIG. 3, and shifts the entire image rightward by one pixel, i.e., by one dot, whereby the binary image is converted into an inverted right-shifted image as shown in FIG. 7. At this time, the leftest single row is filled with "1".

Similarly, the left-shift inverting unit 45 exchanges the pixel values "0" and the pixel values "1" to each other, of the enlarged binary image in FIG. 3, and shifts the entire image leftward by one pixel, i.e., by one dot, whereby the binary image is converted into an inverted left-shifted image as shown in FIG. 8. At this time, the rightest single row is filled with "1".

Subtracted from the weighted multivalued image formed by the pixel converting unit 41 that is shown in FIG. 4 are the inverted upper-shifted image (FIG. 5), the inverted lower-shifted image (FIG. 6), the inverted right-shifted image (FIG. 7), and the inverted left-shifted image (FIG. 8) that are composed of the binary images formed respectively by the upper-shift inverting unit 42, the lower-shift inverting unit 43, the right-shift inverting unit 44 and the left-shift inverting unit 45. Then, the image data thereof are synthesized, and a half-tone image with gradations containing a half-tone as shown in FIG. 9 is formed. More specifically, the half-tone image in FIG. 9 is formed by subtracting the pixel values "0" or "1" of the inverted upper-shifted image, the inverted lower-shifted image, the inverted right-shifted image and the inverted left-shifted image, from the pixel values "5" with respect to the pixels having the pixel values "5" excluding the portions of the pixel values "0" of the weighted multivalued image.

The thus formed half-tone image is given to the reduction processing unit 103 shown in FIG. 25 and reduced by a factor of (½)×(½), thereby obtaining the reduced half-tone image as illustrated in FIG. 27. The reduction processing unit 103 performs the reduction by the factor of (½)×(½) by taking an average value for every (2×2) dots with respect to the previous half-tone image illustrated in FIG. 9 and setting it as a pixel value.

Figure 28:
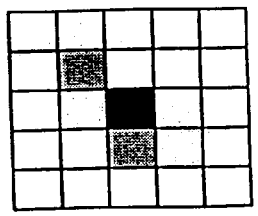
FIG. 28 is a schematic diagram showing the image data for explaining the operation in the image processor in FIG. 25.

This reduced half-tone image is provided with gradations, e.g., density gradations corresponding to the pixel values and then outputted by the image outputting device 104. FIG. 28 shows one example of outputting, wherein, for example, the pixels having the pixel values "4" are expressed in 100% black, the pixels having the pixel values "3" are in 75% black, the pixels having the pixel values "2" are in 50% black, the pixels having the pixel values "1" are in 25% black, and the pixels having the pixel values "0" are in 0% black (i.e., white).

With this arrangement also, the whole outline thereof is smoothed at a high accuracy in terms of a visual aspect, and this makes it feasible to provide an easy-to-see display or print with a high visual recognizability.

Embodiment 8

In the above-mentioned gradation processing unit 102 shown in FIG. 26, the half-tone image is formed by shifting the inverted image of the enlarged binary image upward, downward, leftward and rightward and effecting the subtraction from the weighted multivalued image. The half-tone image may also be, however, formed by subtracting the inverted image shifted in the four oblique left-upper-, left-lower-, right-upper- and right-lower-directions instead of the upper-, lower-, left- and right-directions. This is an eighth embodiment of the present invention.

Figure 29:
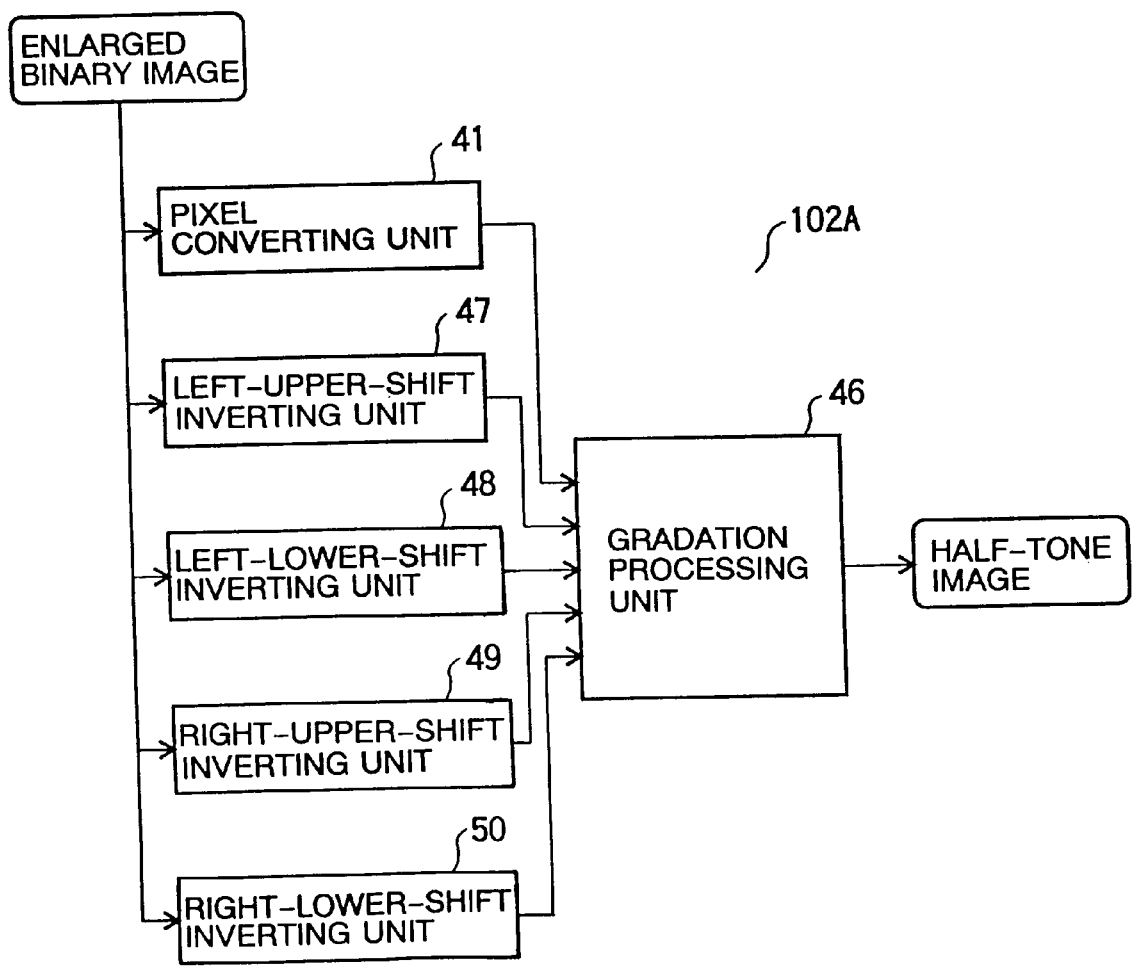
FIG. 29 is a block diagram showing a functional construction of the half-tone processing unit defined as a principal portion of the image half-tone processor in an eighth embodiment of the present invention.

FIG. 29 illustrates a functional construction of the half-tone processing unit defined as the principal unit of the image half-tone processor in accordance with the eighth embodiment of the present invention.

A half-tone processing unit 102A in FIG. 29 includes the pixel converting unit 41 and the gradation processing unit 46 that incorporate the same functions as those in FIG. 26, and, in addition thereto, a left-upper-shift inverting unit 47, a left-lower-shift inverting unit 48, a right-upper-shift inverting unit 49 and a light-downward-shift inverting unit 50.

The pixel converting unit 41, as already stated, weights each of the pixels constituting the enlarged binary image. A specific weighting process by this pixel converting unit 41 is that, for instance, "0" is, as it is, allocated to the white pixel, while the black pixel is allocated with a value of "5", which is larger than "1", with respect to the binary image consisting of the white pixels set to "0" and the black pixels set to "1".

The left-upper-shift inverting unit 47 black-and-white-inverts the enlarged binary image and shifts it leftward upward by one pixel, i.e., by one dot on the pixel coordinates. That is, the left-upper-shift inverting unit 47 forms an invented binary image with the exchange of the white pixel "0" and the black pixel "1" of the given enlarged binary image, shifts this inverted binary image leftward by one dot and upward by one dot, and further forms a binary image wherein each of the rightest and lowermost rows is filled with "1".

The left-lower-shift inverting unit 48 black-and-white-inverts the enlarged binary image and shifts it leftward downward by one pixel, i.e., by one dot on the pixel coordinates. That is, the left-lower-shift inverting unit 48 forms an inverted binary image with the exchange of the white pixel "0" and the black pixel "1" of the given enlarged binary image, shifts this inverted binary image leftward by one dot and downward by one dot, and further forms a binary image wherein each of the rightest and uppermost rows is filled with "1".

The right-upper-shift inverting unit 49 black-and-white-inverts the enlarged binary image and shifts it rightward upward by one pixel, i.e., by one dot the on the pixel coordinates. That is, the right-upper-shift inverting unit 49 forms an inverted binary image with the exchange of the white pixel "0" and the black pixel "1" of the given enlarged binary image, shifts the inverted binary image rightward by one dot and upward by one dot, and further forms a binary image wherein each of the leftest and lowermost rows is filled with "1".

The right-lower-shift inverting unit 50 black-and-white-inverts the enlarged binary image and shifts it rightward downward by one pixel, i.e., by one dot on the pixel coordinates. That is, the right-lower-shift inverting unit 50 forms an inverted binary image with the exchange of the white pixel "0" and the black pixel "1" of the given enlarged binary image, shifts this inverted binary image rightward by one dot and downward by one dot, and further forms a binary image wherein the leftest and uppermost rows is filled with "1".

The gradation processing unit 46 forms a half-tone image based on a multivalued image obtained by the pixel converting unit 41, and four pieces of binary images obtained respectively by, in this case, the left-upper-shift inverting unit 47, the left-lower-shift inverting unit 48, the right-upper-shift inverting unit 49 and the right-lower-shift inverting unit 50. The gradation processing unit 16 executes a subtracting process on the pixel basis between the multivalued image obtained by the pixel converting unit 41 and the four binary images obtained respectively by the left-upper-shift inverting unit 47, the left-lower-shift inverting unit 48, the right-upper-shift inverting unit 49 and the right-lower-shift inverting unit 50, and thereby obtains the half-tone image by additionally synthesizing these images. More specifically, the gradation processing unit 46 subtracts "1" from the weighted pixels described above, when the pixels of the thus inverted/shifted binary image which pixels are disposed in corresponding coordinate positions, are "1" with respect to the weighted pixels having the pixel values "5" in the coordinate positions where the multivalued image exists. At this time, no subtracting process is effected on the pixels "0" of the multivalued image. This subtracting process is repeated with respect to each of the four inverted/shifted binary images. The half-tone image is a result of all the four inverted/shifted binary images being subtracted per pixel by the gradation processing unit 46.

The image half-tone processor using the thus operated half-tone processing 102A is, as in the same way in FIG. 25, constructed. In this case, the half-tone processing unit 102 is replaced with the half-tone processing unit 102A. The half-tone image formed by the half-tone processing unit 102A is a half-tone image corresponding to the enlarged binary image, and therefore reduced by the reduction processing unit 103 shown in FIG. 25 into a reduced half-tone image in accordance with a desired output size. This reduced half-tone image is outputted by the image outputting device 104.

The processing operation of the half-tone processing unit 102A in this case is substantially the same as that by the half-tone processing unit 102 in FIG. 26.

Given to the half-tone processing unit 102A is the binary image as a (2×2)-fold enlarged binary image consisting of the white and black pixels as illustrated in FIG. 3. The enlarged binary image is expressed in such a way that, for example, the white pixel has the pixel value "0", while the black pixel has the pixel value "1".

The pixel converting unit 41 converts the enlarged binary image in FIG. 3 into a weighted multivalued image as shown in FIG. 4 by setting the pixel value of the white pixel to "0" as it is and by weighting the pixel value of the black pixel having the pixel value "1", with "5" Further, the left-upper-shift inverting unit 47 black-and-white-inverts the above enlarged binary image in FIG. 3 by exchanging the pixel values "0" and the pixel values "1" to each other, and shifts the entire image leftward by one dot and upward by one dot, whereby the binary image is converted into an inverted left-upper-shifted image as shown in FIG. 12. At this time, each of the rightest and lowermost rows is filled with "1".

The left-lower-shift inverting unit 48 exchanges the pixel values "0" and the pixel values "1" to each other, of the enlarged binary image in FIG. 3, and shifts the entire image leftward by one dot and downward by one dot in the Figure, whereby the binary image is converted into an inverted left-lower-shifted image as shown in FIG. 13. At this time, each of the rightest and uppermost rows is filled with "1".

The right-upper-shift inverting unit 49 exchanges the pixel values "0" and the pixel values "1" to each other, of the enlarged binary image in FIG. 3, and shifts the entire image rightward by one dot and upward by one dot in the Figure, whereby the binary image is converted into an inverted right-upper-shifted image as shown in FIG. 14. At this time, each of the leftest and lowermost rows is filled with "1".

Similarly, the right-lower-shift inverting unit 50 exchanges the pixel values "0" and the pixel values "1" to each other, of the enlarged binary image in FIG. 3, and shifts the entire image rightward by one dot and downward by one dot in the Figure, whereby the binary image is converted into an inverted right-lower-shifted image as shown in FIG. 15. At this time, each of the leftest and uppermost rows is filled with "1".

Subtracted from the weighted multivalued image formed by the pixel converting unit 11 that is shown in FIG. 4 are the inverted left-upper-shifted image (FIG. 12), the inverted left-lower-shifted image (FIG. 13), the inverted right-upper-shifted image (FIG. 14), and the inverted right-lower-shifted image (FIG. 15) that are composed of the binary images formed respectively by the left-upper-shift inverting unit 47, the left-lower-shift inverting unit 48, the right-upper-shift inverting unit 49 and the right-lower-shift inverting unit 50. Then, the image data thereof are synthesized, and a half-tone image with gradations containing a half-tone as shown in FIG. 16 is formed. More specifically, the half-tone image in FIG. 16 is formed by subtracting the pixel values "0" or "1" of the inverted left-upper-shifted image, the inverted left-lower-shifted image, the inverted right-upper-shifted image and the inverted-right-lower-shifted image, from the pixel values "5" with respect to the pixels having the pixel values "5" excluding the portions of the pixel values "0" of the weighted multivalued image.

Figures 30, 31:
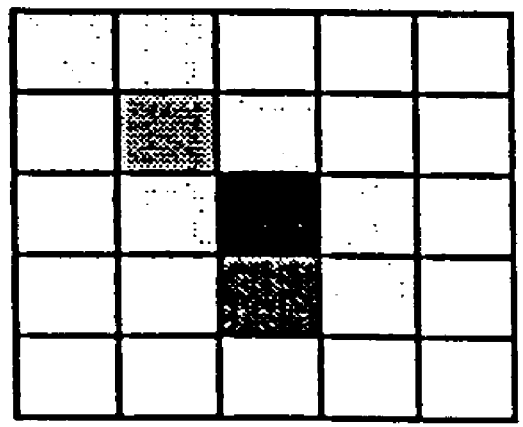
FIG. 30 is a schematic diagram showing the image data for explaining the operation in the image processor in FIG. 29.
FIG. 31 is a schematic diagram showing the image data for explaining the operation in the image processor in FIG. 29.

The thus formed half-tone image is supplied to the reduction processing unit 103 shown in FIG. 25 and then reduced by a factor of (½)×(½), thereby obtaining the reduced half-tone image as illustrated in FIG. 30. This reduced half-tone image is provided with gradations, e.g., density gradations corresponding to the pixel values and then outputted by the image outputting device 104. FIG. 31 shows one example of outputting, wherein, for example, the pixels having the pixel values "4" are expressed in 100% black, the pixels having the pixel values "3" are in 75% black, the pixels having the pixel values "2" are in 50% black, the pixels having the pixel values "1" are in 25% black, and the pixels having the pixel values "0" are in 0% black (i.e., white).

Embodiment 9

In the above-mentioned gradation processing unit 102 shown in FIG. 26, the half-tone image is formed by shifting the inverted image of the enlarged binary image upward, downward, leftward and rightward and effecting the subtraction from the weighted multivalued image. In the gradation processing unit 102A in FIG. 29, the half-tone image is formed by performing the subtraction from the weighted multivalued image by shifting the inverted image of the enlarged binary image left upward, left downward, right upward and right downward. The half-tone image may also be, however, formed by subtracting the inverted image shifted in totally eight directions containing the oblique left-upper-, left-lower-, right-upper- and right-lower-directions plus the upper-, lower-, left- and right-directions. This is a ninth embodiment of the present invention.

Figure 32:
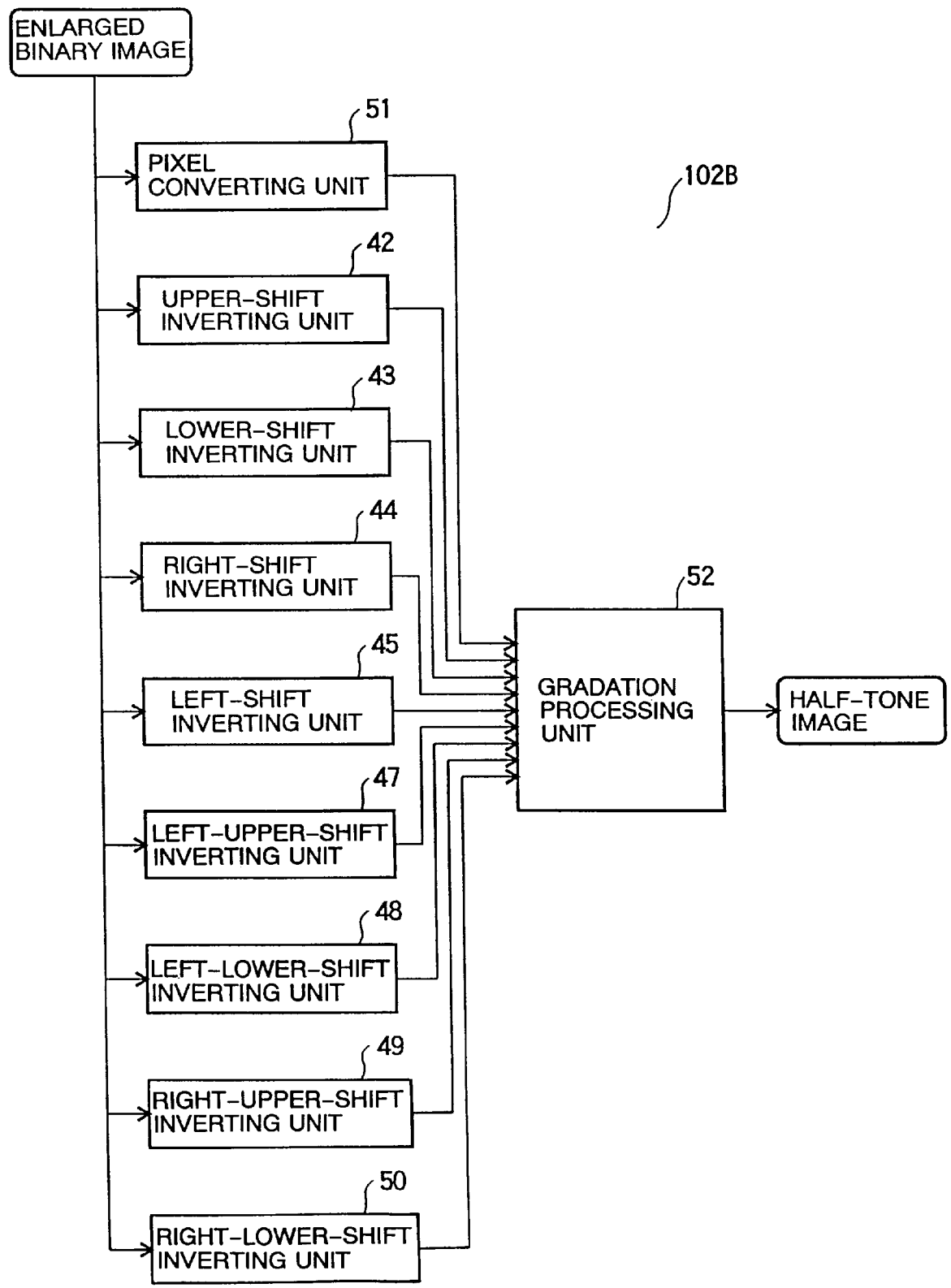
FIG. 32 is a block diagram illustrating a functional construction of the image half-tone processor in a ninth embodiment of the present invention.

FIG. 32 illustrates a functional construction of the half-tone processing unit defined as the principal unit of the image half-tone processor in accordance with the ninth embodiment of the present invention.

A half-tone processing unit 102B in FIG. 32 includes a pixel converting unit 51 and a gradation processing unit 52 in addition to the upper-shift inverting unit 42, the lower-shift inverting unit 43, the right-shift inverting unit 44, the left-shift inverting unit 45, the left-upper-shift inverting unit 47, the left-lower-shift inverting unit 48, the right-upper-shift inverting unit 49 and the light-downward-shift inverting unit 50, which incorporate the same functions as those shown in FIGS. 26 and 29.

The pixel converting unit 51 weights each of the pixels constituting the enlarged binary image. A specific weighting process by this pixel converting unit 51 is that, for instance, "0" is, as it is, allocated to the white pixel, while the black pixel is allocated with a value of "9", which is larger than "1", with respect to the binary image consisting of the white pixels set to "0" and the black pixels set to "1".

The upper-shift inverting unit 42, the lower-shift inverting unit 43, the left-shift inverting unit 44, the right-shift inverting unit 45, the left-upper-shift inverting unit 47, the left-lower-shift inverting unit 48, the right-upper-shift inverting unit 49 and the right-lower-shift inverting unit 50 black-and-white-invert the enlarged binary image and shift it upward, downward, leftward, rightward, left upward, left downward, right upward, and right downward by one dot on the pixel coordinates, and space areas produced due to shifting are filled with "1", thereby generating the binary image.

The gradation processing unit 52 forms a half-tone image on the basis of the multivalued image obtained by the pixel converting unit 51, and eight pieces of binary images obtained respectively by, in this case, the upper-shift inverting unit 42, the lower-shift inverting unit 43, the left-shift inverting unit 44, the right-shift inverting unit 45, the left-upper-shift inverting unit 47, the left-lower-shift inverting unit 48, the right-upper-shift inverting unit 49 and the right-lower-shift inverting unit 50. The gradation processing unit 52 executes a subtracting process on the pixel basis between the multivalued image obtained by the pixel converting unit 51 and the eight binary images obtained respectively by the upper-shift inverting unit 42, the lower-shift inverting unit 43, the right-shift inverting unit 44, the left-shift inverting unit 45, the left-upper-shift inverting unit 47, the left-lower-shift inverting unit 48, the right-upper-shift inverting unit 49 and the right-lower-shift inverting unit 50, and thereby obtains the half-tone image by additionally synthesizing these images. More specifically, the gradation processing unit 52 subtracts "1" from the weighted pixels described above, when the pixels of the thus inverted/shifted binary image which pixels are disposed in corresponding coordinate positions, are "1" with respect to the weighted pixels having the pixel values "9" in the coordinate positions where the multivalued image exists. At this time, no subtracting process is effected on the pixels "0" of the multivalued image. This subtracting process is repeated with respect to each of the eight inverted/shifted binary images. The half-tone image is a result of all the eight inverted/shifted binary images being subtracted per pixel by the gradation processing unit 52.

The image half-tone processor using the thus operated half-tone processing 102B is constructed in the same way as illustrated in FIG. 25. In this case, the half-tone processing unit 102B substitutes for the half-tone processing unit 102. The half-tone image formed by the half-tone processing unit 102B is a half-tone image corresponding to the enlarged binary image described above, and therefore reduced corresponding to a desired output size into a reduced half-tone image by the reduction processing unit illustrated in FIG. 25. This reduced half-tone image is outputted by the image outputting device 104.

Next, the processing operation of the image half-tone processing unit 102B illustrated in FIG. 32 will be specifically explained. Given to the half-tone processing unit 102B is the binary image as a (2×2)-fold enlarged binary image consisting of the white and black pixels as illustrated in FIG. 3. The enlarged binary image is expressed in such a way that, for example, the white pixel has the pixel value "0", while the black pixel has the pixel value "1".

The pixel converting unit 51 converts the enlarged binary image in FIG. 3 into a weighted multivalued image as shown in FIG. 19 by setting the pixel value of the white pixel to "0" as it is and by weighting the pixel value of the black pixel having the pixel value "1", with The upper-shift inverting unit 42 exchanges the pixel values "0" and the pixel values "1" to each other, and shifts the entire image upward by one pixel, i.e., by one dot, whereby the binary image is converted into an inverted upper-shifted image as shown in FIG. 5. At this time, the lowermost single row is filled with "1".

The lower-shift inverting unit 43 exchanges the pixel values "0" and the pixel values "1" to each other, of the enlarged binary image in FIG. 3, and shifts the entire image downward by one pixel, i.e., by one dot, whereby the binary image is converted into an inverted lower-shifted image as shown in FIG. 6. At this time, the uppermost single row is filled with "1".

The right-shift inverting unit 44 exchanges the pixel values "0" and the pixel values "1" to each other, of the enlarged binary image in FIG. 3, and shifts the entire image rightward by one pixel, i.e., by one dot, whereby the binary image is converted into an inverted right-shifted image as shown in FIG. 7. At this time, the leftest single row is filled with "1".

The left-shift inverting unit 45 exchanges the pixel values "0" and the pixel values "1" to each other, of the enlarged binary image in FIG. 3, and shifts the entire image leftward by one pixel, i.e., by one dot, whereby the binary image is converted into an inverted left-shifted image as shown in FIG. 8. At this time, the rightest single row is filled with "1".

The left-upper-shift inverting unit 47 exchanges the pixel values "0" and the pixel values "1" to each other, of the enlarged binary image in FIG. 3, and shifts the entire image leftward by one dot and upward by one dot in the Figure, whereby the binary image is converted into an inverted left-upper-shifted image as shown in FIG. 12. At this time, each of the rightest and lowermost rows is filled with "1".

The left-lower-shift inverting unit 48 exchanges the pixel values "0" and the pixel values "1" to each other, of the enlarged binary image in FIG. 3, and shifts the entire image leftward by one dot and downward by one dot in the Figure, whereby the binary image is converted into an inverted left-lower-shifted image as shown in FIG. 13. At this time, each of the rightest and uppermost rows is filled with "1".

The right-upper-shift inverting unit 49 exchanges the pixel values "0" and the pixel values "1" to each other, of the enlarged binary image in FIG. 3, and shifts the entire image rightward by one dot and upward by one dot in the Figure, whereby the binary image is converted into an inverted right-upper-shifted image as shown in FIG. 14. At this time, each of the leftest and lowermost rows is filled with "1".

Similarly, the right-lower-shift inverting unit 50 exchanges the pixel values "0" and the pixel values "1" to each other, of the enlarged binary image in FIG. 3, and shifts the entire image rightward by one dot and downward by one dot in the Figure, whereby the binary image is converted into an inverted right-lower-shifted image as shown in FIG. 15. At this time, each of the leftest and uppermost rows is filled with "1".

Subtracted from the weighted multivalued image formed by the pixel converting unit 51 that is shown in FIG. 19 are the inverted upper-shifted image (FIG. 5), the inverted lower-shifted image (FIG. 6), the inverted right-shifted image (FIG. 7), the inverted left-shifted image (FIG. 8), the inverted left-upper-shifted image (FIG. 12), the inverted left-lower-shifted image (FIG. 13), the inverted right-upper-shifted image (FIG. 14), and the inverted right-lower-shifted image (FIG. 15) that are composed of the binary images formed respectively by the upper-shift inverting unit 42, the lower-shift inverting unit 43, the left-shift inverting unit 44, the right-shift inverting unit 45, the left-upper-shift inverting unit 47, the left-lower-shift inverting unit 48, the right-upper-shift inverting unit 49 and the right-lower-shift inverting unit 50. Then, the image data thereof are synthesized, and a half-tone image with gradations containing a half-tone as shown in FIG. 20 is formed. More specifically, the half-tone image in FIG. 20 is formed by subtracting the pixel values "0" or "1" of the inverted upper-shifted image, the inverted lower-shifted image, the inverted right-shifted image, the inverted left-shifted image, the inverted left-upper-shifted image, the inverted left-lower-shifted image, the inverted right-upper-shifted image and the inverted right-lower-shifted image, from the pixel values "9" with respect to the pixels having the pixel values "9" excluding the portions of the pixel values "0" of the weighted multivalued image.

Figures 33, 34, 35:
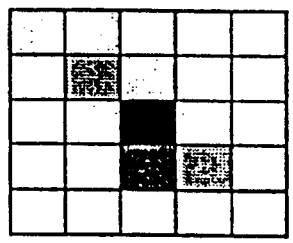
FIG. 33 is a schematic diagram showing image data for explaining an operation in the image processor in FIG. 32.
FIG. 34 is a schematic diagram showing the image data for explaining the operation in the image processor in FIG. 32.
FIG. 35 is a diagram showing output image data for explaining the operation in the image processor in FIG. 32.

The thus formed half-tone image is supplied to the reduction processing unit 103 shown in FIG. 25 and then reduced by a factor of (½)×(½), thereby obtaining a reduced half-tone image as shown in FIG. 33. This reduced half-tone image is provided with gradations, e.g., density gradations corresponding to the pixel values and then outputted by the image outputting device 104. FIG. 34 shows one example of outputting, wherein, for example, the pixels having the pixel values "7" are expressed in 100% black, the pixels having the pixel values "5" are in 80% black, the pixels having the pixel values "4" are in 60% black, the pixels having the pixel values "3" are in 50% black, the pixels having the pixel values "2" are in 40% black, the pixels having the pixel values "1" are in 20% black, and the pixels having the pixel values "0" are in 0% black (i.e., white).

Figures 36, 37:
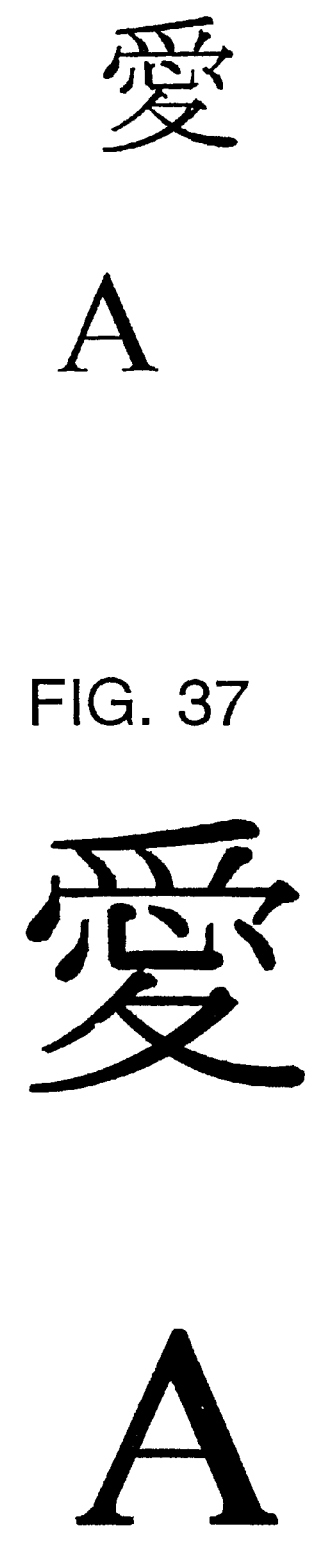
Figure 38:
FIG. 38 is a diagram showing the enlarged image of the output image data in FIG. 36.

Incidentally, FIG. 35 illustrates an example of outputting a kanji character "ai" and a letter "A" in accordance with the ninth embodiment. FIG. 36 shows the same kanji character and letter as those in FIG. 35, which are outputted as they are without being processed according to the present invention. FIG. 37 shows enlarged images of those in FIG. 35 for a comparison therebetween. FIG. 38 shows enlarged images of those in FIG. 36. It might be understood that the images in FIGS. 35 and 37 are less conspicuous of raggedness of the outlines than in FIGS. 36 and 38.

Embodiment 10

In the above-mentioned gradation processing unit 102 shown in FIG. 26, the half-tone image is formed by shifting the inverted image of the enlarged binary image upward, downward, leftward and rightward and effecting the subtraction from the weighted multivalued image. The half-tone image may also be, however, formed by subtracting the pixels having the pixel values of the image shifted upward, downward, leftward and rightward without inverting the enlarged binary image given above. This is a tenth embodiment of the present invention.

Figure 39:
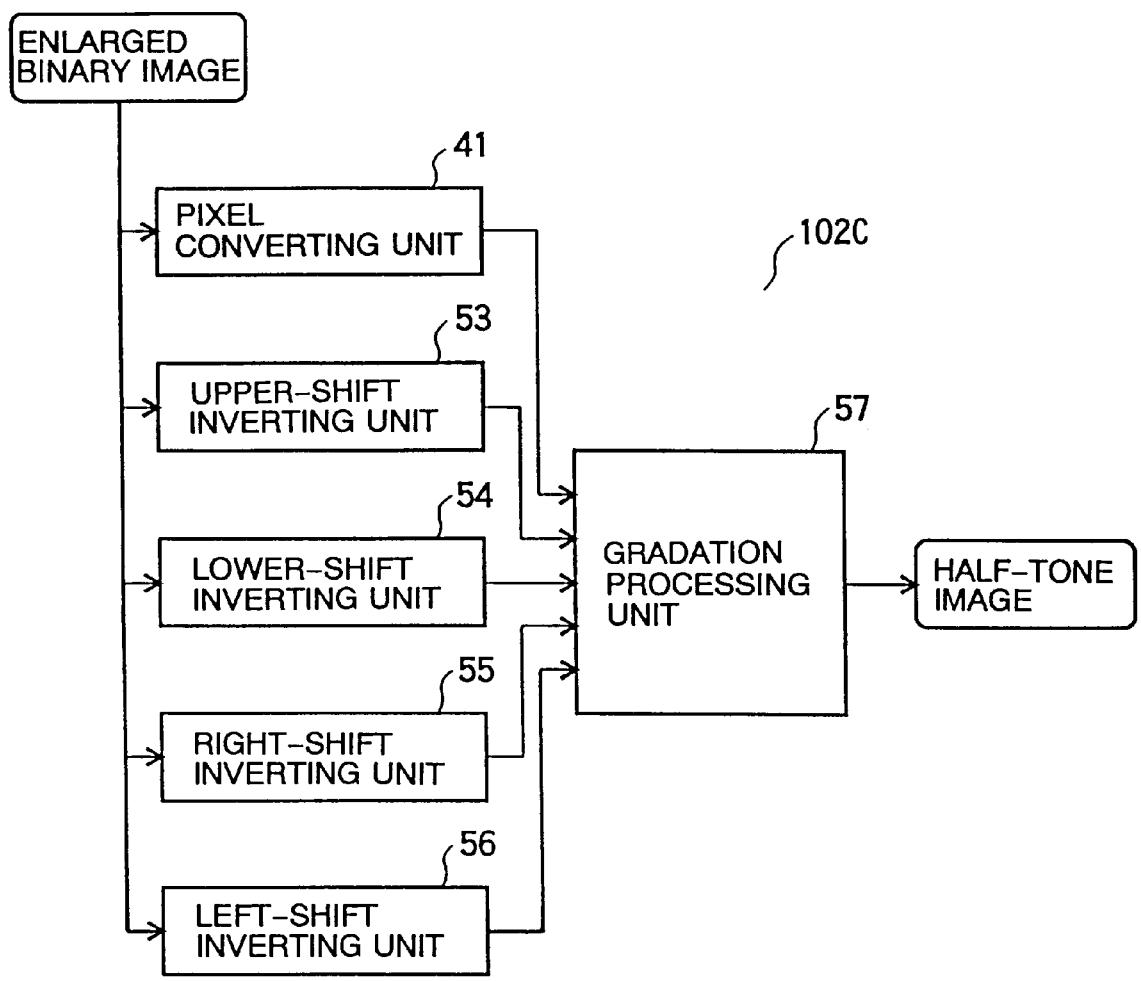
FIG. 39 is a block diagram showing a functional construction of the half-tone processing unit defined as a principal portion of the image half-tone processor in a tenth embodiment of the present invention.

FIG. 39 illustrates a functional construction of the half-tone processing unit defined as the principal unit of the image half-tone processor in accordance with the tenth embodiment of the present invention.

A half-tone processing unit 102C in FIG. 39 includes the pixel converting unit 41 incorporating the same function as that in FIG. 26, and, in addition, an upper-shift processing unit 53, a lower-shift processing unit 54, a right-shift processing unit 55, a left-shift processing unit 56 and a gradation processing unit 57.

The pixel converting unit 41 weights each of the pixels constituting the enlarged binary image. A specific weighting process by this pixel converting unit 41 is that, for instance, "0" is, as it is, allocated to the white pixel, while the black pixel is allocated with a value of "5" in this case, which is larger than "1", with respect to the binary image consisting of the white pixels set to "0" and the black pixels set to "1".

The upper-shift processing unit 53 shifts the enlarged binary image upward by one pixel, i.e., by one dot on the pixel coordinates. That is, the upper-shift processing unit 53 shifts the given enlarged binary image upward by one dot, and further forms a binary image wherein the lowermost single row is filled with "0".

The lower-shift processing unit 54 shifts the enlarged binary image downward by one pixel, i.e., by one dot on the pixel coordinates. That is, the lower-shift processing unit 54 shifts the given enlarged binary image downward by one dot, and further forms a binary image wherein the uppermost single row is filled with "0".

The right-shift processing unit 55 shifts the enlarged binary image rightward by one pixel, i.e., by one dot on the pixel coordinates. That is, the right-shift processing unit 55 shifts the given enlarged binary image rightward by one dot, and further forms a binary image wherein the leftest single row is filled with "0".

The left-shift processing unit 56 shifts the enlarged binary image leftward by one pixel, i.e., by one dot on the pixel coordinates. That is, the left-shift processing unit 56 shifts the given enlarged binary image leftward by one dot, and further forms a binary image wherein the rightest single row is filled with "0".

The gradation processing unit 57 forms a half-tone image based on a multivalued image obtained by the pixel converting unit 41, and four pieces of binary images obtained respectively by the upper-shift processing unit 53, the lower-shift processing unit 54, the right-shift processing unit 55 and the left-shift processing unit 56. The gradation processing unit 57 executes a subtracting process on the pixel basis on the basis of the four binary images obtained respectively by the upper-shift processing unit 53, the lower-shift processing unit 54, the right-shift processing unit 55 and the left-shift processing unit 56, and thereby obtains the half-tone image by additionally synthesizing these images. More specifically, the gradation processing unit 57 subtracts "1" from the weighted pixels described above, when the pixels of the thus shifted binary image which pixels are disposed in corresponding coordinate positions, are "0" with respect to the weighted pixels having the pixel values "5" in the coordinate positions where the multivalued image exists. At this time, no subtracting process is effected on the pixels "0" of the multivalued image. This subtracting process is repeated with respect to each of the four shifted binary images. For example, if all the pixel values of the four binary images in the coordinate positions corresponding to the pixel values "5" of the multivalued image, are "0", the pixel value of the relevant pixel as a result (5−1−1−1−1=1) of performing all the subtractions, becomes "1". The half-tone image is a result of all the four shifted binary images being subtracted per pixel by the gradation processing unit 57.

The image half-tone processor using the thus operated half-tone processing 102C is constructed as in the same way in FIG. 25. In this case, the half-tone processing unit 102 is replaced with the half-tone processing unit 102C.

The thus formed half-tone image is given to the reduction processing unit 103 shown in FIG. 25 and reduced by a factor of (½)×(½), thereby obtaining the reduced half-tone image as illustrated in FIG. 27. This reduced half-tone image is provided with gradations, e.g., density gradations corresponding to the pixel values and then outputted by the image outputting device 104. FIG. 28 shows one example of outputting, wherein, for example, the pixels having the pixel values "4" are expressed in 100% black, the pixels having the pixel values "3" are in 75% black, the pixels having the pixel values "2" are in 50% black, the pixels having the pixel values "1" are in 25% black, and the pixels having the pixel values "0" are in 0% black (i.e., white).

Embodiment 11

In the above-mentioned gradation processing unit 102C shown in FIG. 39, the half-tone image is formed by shifting the enlarged binary image upward, downward, leftward and rightward and effecting the subtraction from the weighted multivalued image. The half-tone image may also be, however, formed by executing the subtraction based on the image shifted left upward, left downward, right upward and right downward instead of the upper-, lower-, left- and right-directions. This is an eleventh embodiment of the present invention.

Figure 40:
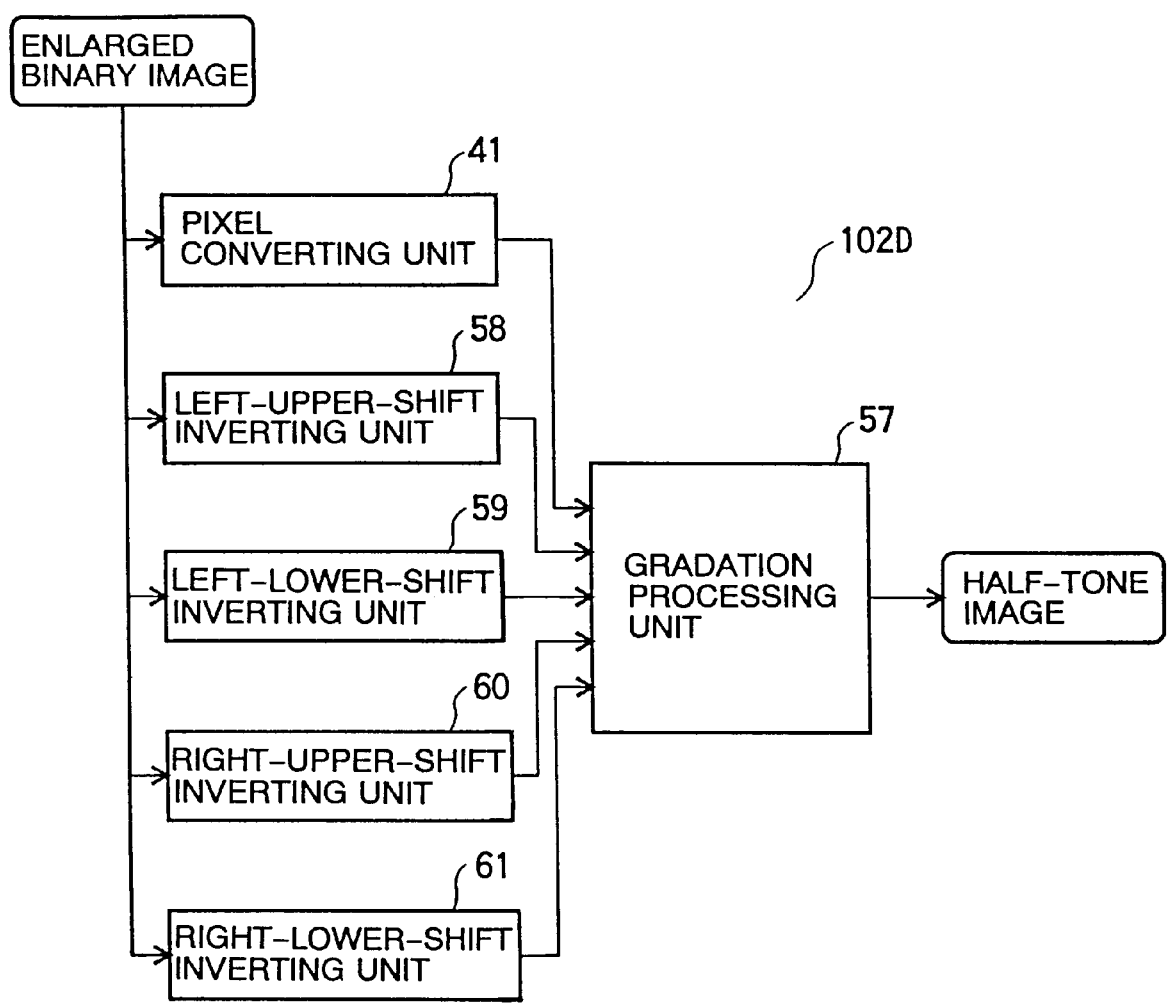
FIG. 40 is a block diagram illustrating a functional construction of the half-tone processing unit defined as a principal portion of the image half-tone processor in an eleventh embodiment of the present invention.

FIG. 40 illustrates a functional construction of the half-tone processing unit defined as the principal unit of the image half-tone processor in accordance with the eleventh embodiment of the present invention.

A half-tone processing unit 102D in FIG. 40 includes the pixel converting unit 41 and the gradation processing unit 57 that incorporate the same functions as those in FIG. 39, and, in addition, a left-upper-shift processing unit 58, a left-lower-shift processing unit 59, a right-upper-shift processing unit 60, a right-upper-shift processing unit 60 and a right-lower-shift processing unit 61.

The pixel converting unit 41, as already stated, weights each of the pixels constituting the enlarged binary image. A specific weighting process by this pixel converting unit 41 is that, for instance, "0" is, as it is, allocated to the white pixel, while the black pixel is allocated with a value of "5", which is larger than "1", with respect to the binary image consisting of the white pixels set to "0" and the black pixels set to "1".

The left-upper-shift processing unit 58 shifts the enlarged binary image left upward by one dot on the pixel coordinates. That is, the left-upper-shift processing unit 58 shifts the given enlarged binary image leftward by one dot and upward by one dot, and further forms a binary image wherein each of the rightest and lowermost rows is filled with "0".

The left-lower-shift processing unit 59 shifts the enlarged binary image left downward by one dot on the pixel coordinates. That is, the left-lower-shift processing unit 59 shifts the given enlarged binary image leftward by one dot and downward by one dot, and further forms a binary image wherein each of the rightest and uppermost rows is filled with "0".

The right-upper-shift processing unit 60 shifts the enlarged binary image right upward by one dot on the pixel coordinates. That is, the right-upper-shift processing unit 60 shifts the given enlarged binary image rightward by one dot and upward by one dot, and further forms a binary image wherein each of the leftest and lowermost rows is filled with "0".

The right-lower-shift processing unit 61 shifts the enlarged binary image right downward by one dot on the pixel coordinates. That is, the right-lower-shift processing unit 61 shifts the given enlarged binary image rightward by one dot and downward by one dot, and further forms a binary image wherein each of the leftest and uppermost rows is filled with "0".

The gradation processing unit 57 forms a half-tone image based on a multivalued image obtained by the pixel converting unit 41, and four pieces of binary images obtained respectively by, in this case, the left-upper-shift processing unit 58, the left-lower-shift processing unit 59, the right-upper-shift processing unit 60 and the right-lower-shift processing unit 61. The gradation processing unit 57 executes a subtracting process on the pixel basis between the multivalued image obtained by the pixel converting unit 41 and the four binary images obtained respectively by the left-upper-shift processing unit 58, the left-lower-shift processing unit 59, the right-upper-shift processing unit 60 and the right-lower-shift processing unit 61, and thereby obtains the half-tone image by additionally synthesizing these images. More specifically, the gradation processing unit 57 subtracts "1" from the weighted pixels described above, when the pixels of the thus shifted binary image which pixels are disposed in corresponding coordinate positions, are "0" with respect to the weighted pixels having the pixel values "5" in the coordinate positions where the multivalued image exists. At this time, no subtracting process is effected on the pixels "0" of the multivalued image. This subtracting process is repeated with respect to each of the four shifted binary images. The half-tone image is a result of all the four shifted binary images being subtracted per pixel by the gradation processing unit 57.

The image half-tone processor using the thus operated half-tone processing 102D is constructed as in the same way in FIG. 25. In this case, the half-tone processing unit 102 is replaced with the half-tone processing unit 102D. The half-tone image formed by the half-tone processing unit 102D is a half-tone image corresponding to the enlarged binary image, and therefore reduced by the reduction processing unit 103 shown in FIG. 25 into a reduced half-tone image in accordance with a desired output size. This reduced half-tone image is outputted by the image outputting device 104. That is, the half-tone image formed by the half-tone processing unit 102D is given to the reduction processing unit 103 and reduced by a factor of (½)×(½), thereby obtaining the reduced half-tone image as illustrated in FIG. 30. This reduced half-tone image is provided with gradations, e.g., density gradations corresponding to the pixel values and then outputted by the image outputting device 104. FIG. 31 shows one example of outputting, wherein, for example, the pixels having the pixel values "4" are expressed in 100% black, the pixels having the pixel values "3" are in 75% black, the pixels having the pixel values "2" are in 50% black, the pixels having the pixel values "1" are in 25% black, and the pixels having the pixel values "0" are in 0% black (i.e., white).

Embodiment 12

In the above-mentioned gradation processing unit 102C shown in FIG. 39, the half-tone image is formed by shifting the enlarged binary image upward, downward, leftward and rightward and effecting the subtraction from the weighted multivalued image. In the gradation processing unit 102D, the half-tone image is formed by executing the subtraction from the weighted multivalued image by shifting the enlarged binary image left upward, left downward, right upward and right downward. The half-tone image may also be, however, formed by subtracting the image shifted in totally eight directions containing the oblique four left-upper-, left-lower-, right-upper- and right-lower-directions plus the four upper- lower-, left- and right-directions. This is a twelfth embodiment of the present invention.

Figure 41:
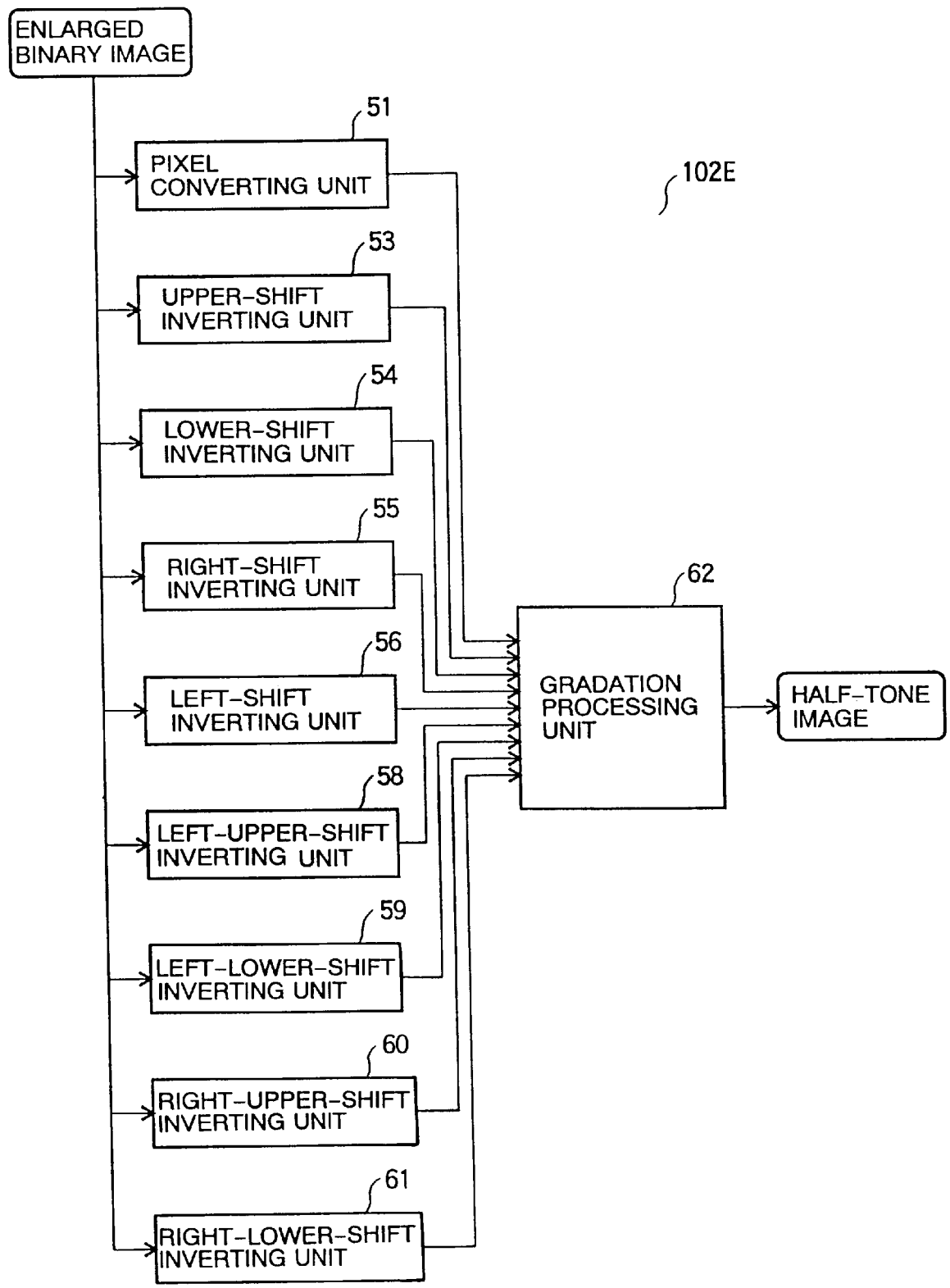
FIG. 41 is a block diagram illustrating a functional construction of the half-tone processing unit defined as a principal portion of the image half-tone processor in a twelfth embodiment of the present invention.

FIG. 41 illustrates a functional construction of the half-tone processing unit defined as the principal unit of the image half-tone processor in accordance with the twelfth embodiment of the present invention.

A half-tone processing unit 102E in FIG. 41 includes the pixel converting unit 51 incorporating the same function as that in FIG. 32, the upper-shift processing unit 53, the lower-shift processing unit 54, the right-shift processing unit 55, the left-shift processing unit 56, the left-upper-shift processing unit 58, the left-lower-shift processing unit 59, the right-upper-shift processing unit 60 and the right-lower-shift processing unit, and, in addition, a gradation processing unit 62.

The pixel converting unit 51, as already stated, weights each of the pixels constituting the enlarged binary image. A specific weighting process by this pixel converting unit 51 is that, for instance, "0" is, as it is, allocated to the white pixel, while the black pixel is allocated with a value of "9", which is larger than "1", with respect to the binary image consisting of the white pixels set to "0" and the black pixels set to "1".

The upper-shift processing unit 53, the lower-shift processing unit 54, the right-shift processing unit 55, the left-shift processing unit 56, the left-upper-shift processing unit 57, the left-upper-shift processing unit 58, the left-lower-shift processing unit 59, the right-upper-shift processing unit 60 and the right-lower-shift processing unit 61 shift the above enlarged binary image upward, downward, leftward, rightward, left upward, left downward, right upward, and right downward by one dot on the pixel coordinates, and space areas produced due to shifting are filled with "0", thereby generating the binary image.

The gradation processing unit 62 forms a half-tone image based on a multivalued image obtained by the pixel converting unit 51, and eight pieces of binary images obtained respectively by, in this case, the upper-shift processing unit 53, the lower-shift processing unit 54, the right-shift processing unit 55, the left-shift processing unit 56, the left-upper-shift processing unit 58, the left-lower-shift processing unit 59, the right-upper-shift processing unit 60 and the right-lower-shift processing unit 61. The gradation processing unit 62 executes a subtracting process on the pixel basis between the multivalued image obtained by the pixel converting unit 51 and the eight binary images obtained respectively by the upper-shift processing unit 53, the lower-shift processing unit 54, the right-shift processing unit 55, the left-shift processing unit 56, the left-upper-shift processing unit 58, the left-lower-shift processing unit 59, the right-upper-shift processing unit 60 and the right-lower-shift processing unit 61, and thereby obtains the half-tone image by additionally synthesizing these images. More specifically, the gradation processing unit 62 subtracts "1" from the weighted pixels described above, when the pixels of the thus shifted binary image which pixels are disposed in corresponding coordinate positions, are "0" with respect to the weighted pixels having the pixel values "9" in the coordinate positions where the multivalued image exists. At this time, no subtracting process is effected on the pixels "0" of the multivalued image. This subtracting process is repeated with respect to each of the eight shifted binary images. The half-tone image is a result of all the eight shifted binary images being subtracted per pixel by the gradation processing unit 62. The image half-tone processor using the thus operated half-tone processing 102E is constructed as in the same way in FIG. 25. In this case, the half-tone processing unit 102 is replaced with the half-tone processing unit 102E. The half-tone image formed by the half-tone processing unit 102E is a half-tone image corresponding to the enlarged binary image, and therefore reduced by the reduction processing unit 103 shown in FIG. 25 into a reduced half-tone image in accordance with a desired output size. This reduced half-tone image is outputted by the image outputting device 104.

That is, the half-tone image formed by the half-tone processing unit 102E is given to the reduction processing unit 103 shown in FIG. 25 and reduced by a factor of (½)×(½), thereby obtaining the reduced half-tone image as illustrated in FIG. 33. This reduced half-tone image is provided with gradations, e.g., density gradations corresponding to the pixel values and then outputted by the image outputting device 104. FIG. 34 shows one example of outputting, wherein, for example, the pixels having the pixel values "7" are expressed in 100% black, the pixels having the pixel values "5" are in 80% black, the pixels having the pixel values "4" are in 60% black, the pixels having the pixel values "3" are in 50% black, the pixels having the pixel values "2" are in 40% black, the pixels having the pixel values "1" are in 20% black, and the pixels having the pixel values "1" are in 0% black (i.e., white).

Embodiment 13

Figure 42:
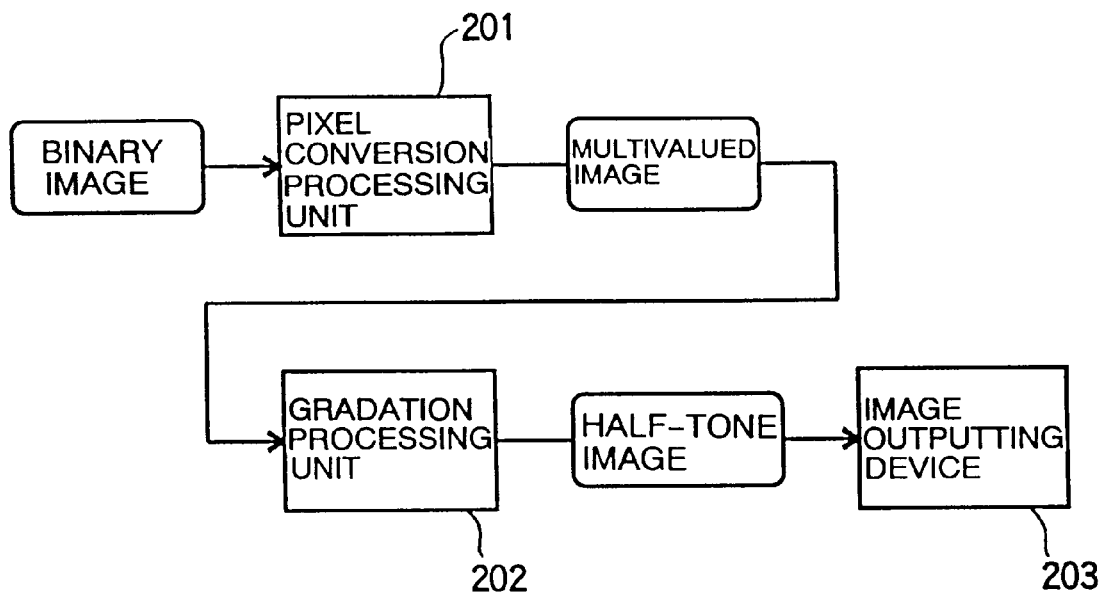
FIG. 42 is a block diagram showing a system construction of the image half-tone processor in a thirteenth embodiment of the present invention.

FIG. 42 illustrates a construction of the image half-tone processor in a thirteenth embodiment of the present invention. The image half-tone processor shown in FIG. 42 is constructed of a pixel conversion processing unit 201, a gradation processing unit 202 and an image outputting device 203.

The pixel conversion processing unit 201 functions substantially the same as the pixel converting unit 11 shown in FIG. 1, and executes a multivalued processing on a weighting basis upon each of the pixels constituting the primary binary image, thereby obtaining a multivalued image. A specific weighting process by this pixel conversion processing unit 201 is that, for instance, "0" is, as it is, allocated to the white pixel, while the black pixel is allocated with a value of "5" in this case, which is larger than "1", with respect to the binary image consisting of binary numbers of "0" and "1", wherein white pixels are set to "0", and the black pixels are set to "1".

The gradation processing unit 202 performs processes substantially equal to those by the upper-shift inverting unit 12, the lower-shift inverting unit 13, the right-shift inverting unit 14, the left-shift inverting unit 15, and the gradation processing unit 16. More specifically, the gradation processing unit 202 forms a half-tone image, wherein gradation pixels of the relevant pixels are values obtained by subtracting the number of white pixels existing in the pixels adjacent upward, downward, leftward and rightward to the black pixels of the above multivalued image multivalued by the pixel conversion processing unit 201, from the pixel values of the weighted black pixels. The subtracting process on each of the black pixels is effected on all the pixels of the given multivalued image.

The image outputting device 203 is classified as a display or a printer for outputting the half-tone image formed by the gradation processing unit 202 while giving it a multi-gradation expression, and is, it is assumed, e.g., the display such as a liquid crystal display in this case.

Next, one example of the operation of the image half-tone processor illustrated in FIG. 42 will be specifically explained with reference to FIG. 43.

The primary binary image inputted to the pixel conversion processing unit 201 is composed of the white and black pixels as depicted in FIG. 3 in such a way that, for instance, the white pixels are set to the pixel values "0", while the black pixels are set to pixel values "1".

The primary binary image in FIG. 3 is converted by the pixel conversion processing unit 201 into the weighted multivalued image as shown in FIG. 4 by setting the pixel value of the white pixel to "0" as it is and by weighting the pixel value of the black pixel having the pixel value "1", with "5".

Figure 43:
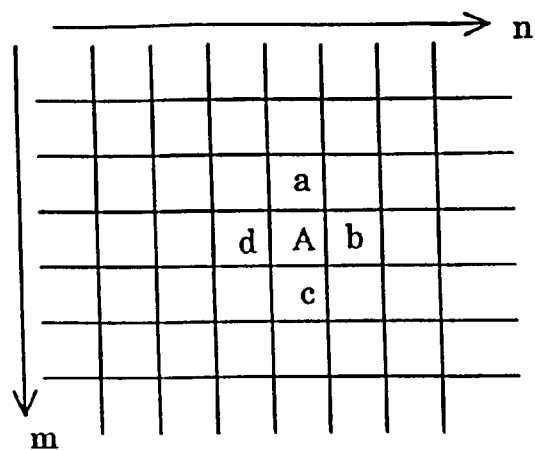
FIG. 43 is a schematic diagram showing image data for explaining an operation in the image processing unit in FIG. 42.

The weighted multivalued image in FIG. 4 that is formed by the pixel conversion processing unit 201, is such that when a subtracted pixel A to be gradated is, as illustrated in FIG. 43, disposed in coordinates (n, m), the gradation processing unit 202 counts the number of white pixels from four reference pixels, i.e., a reference pixel a so disposed in coordinates (n, m−1) as to be adjacent upward thereto in the Figure, a reference pixel b disposed in coordinates (n+1, m) adjacent rightward thereto in the Figure, a reference pixel c disposed in coordinates (n, m+1) adjacent downward thereto in the Figure, and a reference pixel d disposed in coordinates (n−1, m) adjacent leftward thereto in the Figure. Then, the gradation processing unit 202 subtracts the counted number of white pixels from the pixel value of the above subtracted pixel A. That is, in the case of the pixel in coordinates (1, 1) in FIG. 4, the white pixels are three pixels having coordinates (1, 0), (1, 2) and (0, 1) among the reference pixels a–d, and therefore, from a result of 5−3=2, the pixel value of the gradation pixel in the coordinates (1, 1) becomes "2".

The half-tone image containing a half-tone as depicted in FIG. 9 is formed by thus gradating the respective black pixels in FIG. 4.

The thus formed half-tone image is provided with gradations, e.g., density gradations corresponding to the pixel values and then outputted by the image outputting device 203. FIG. 10 shows one example of outputting, wherein, for example, the pixels having the pixel values "5" are expressed in 100% black, the pixels having the pixel values "4" are in 75% black, the pixels having the pixel values "3" are in 50% black, the pixels having the pixel values "2" are in 25% black, and the pixels having the pixel values "0" are in 0% black (i.e., white).

With this arrangement also, a protruded portion of rugged portions of outline of the primary binary image is expressed with a low gradation, thereby smoothing the whole outline in terms of a visual aspect. This makes it feasible to provide an easy-to-see display or print with a high visual recognizability.

In the image half-tone processor in FIG. 42, the primary binary image is converted into the multivalued image with the black pixels weighted, and the gradation is performed by controlling the black levels of the black pixels in accordance with the number of white pixels disposed along the peripheries of the multivalued pixels. It is therefore feasible to effectively smooth a boundary between the image and the background portion.

Embodiment 14

Figure 44:
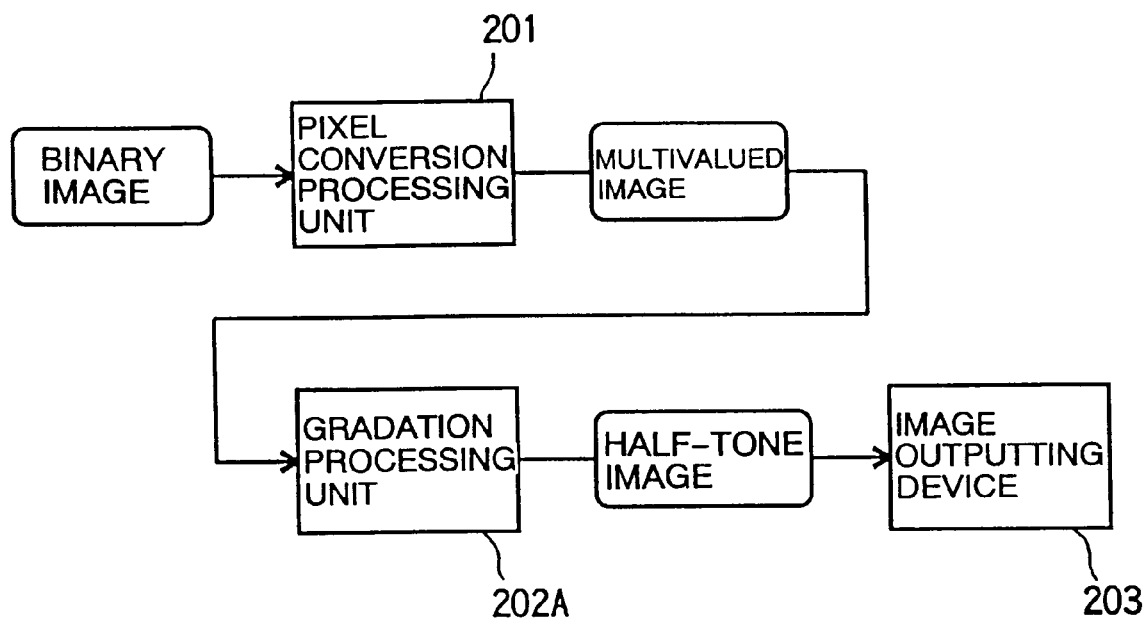
FIG. 44 is a block diagram illustrating a system construction of the image half-tone processor in a fourteenth embodiment of the present invention.

FIG. 44 illustrates a construction of the image half-tone processor in a fourteenth embodiment of the present invention. The image half-tone processor shown in FIG. 44 is constructed of the pixel conversion processing unit 201 and the gradation processing unit 202 that are the same as those in FIG. 42, and, in addition, a gradation processing unit 202A slightly different from the gradation processing unit 202 in FIG. 42.

That is, the pixel conversion processing unit 201 executes a multivalued processing on the weighting basis upon each of the pixels constituting the primary binary image, thereby obtaining a multivalued image. A specific weighting process by this pixel conversion processing unit 201 is that, for instance, "0" is, as it is, allocated to the white pixel, while the black pixel is allocated with a value of "5" in this case, which is larger than "1", with respect to the binary image consisting of binary numbers of "0" and "1", wherein white pixels are set to "0", and the black pixels are set to "1".

The gradation processing unit 202A performs processes substantially equal to those by the left-upper-shift inverting unit 17, the left-lower-shift inverting unit 18, the right-upper-shift inverting unit 19, the right-lower-shift inverting unit 20, and the gradation processing unit 16, which are shown in FIG. 11. More specifically, the gradation processing unit 202A forms a half-tone image, wherein the gradation pixels of the relevant pixels are values obtained by subtracting the number of white pixels existing in the pixels adjacent left upward, left downward, right upward and right downward to the black pixels of the above multivalued image multivalued by the pixel conversion processing unit 201, from the pixel values of the weighted black pixels. The subtracting process on eahc of the black pixels is effected on all the pixels of the given multivalued image.

The image outputting device 203 is classified as the display or the printer for outputting the half-tone image formed by the gradation processing unit 202 while giving it the multi-gradation expression, and is, it is assumed, e.g., the display such as the liquid crystal display in this case.

Next, one example of the operation of the image half-tone processor illustrated in FIG. 44 will be specifically explained with reference to FIG. 45.

The primary binary image inputted to the pixel conversion processing unit 201 is composed of the white and black pixels as depicted in FIG. 3 in such a way that, for instance, the white pixels are set to the pixel values "0", while the black pixels are set to pixel values "1".

The primary binary image in FIG. 3 is converted by the pixel conversion processing unit 201 into the weighted multivalued image as shown in FIG. 4 by setting the pixel value of the white pixel to "0" as it is and by weighting the pixel value of the black pixel having the pixel value "1", with "5".

Figure 45:
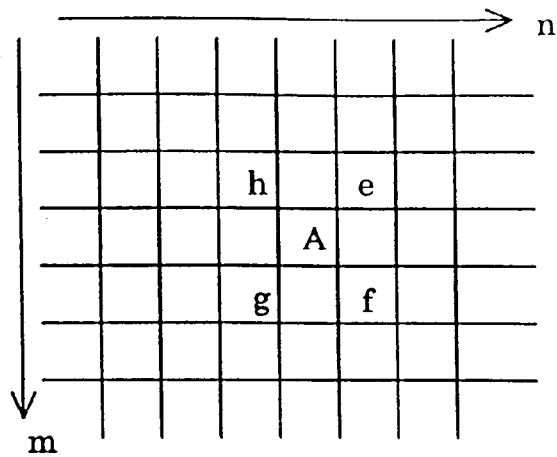
FIG. 45 is a schematic diagram showing the image data for explaining the operation in the image processing unit in FIG. 44.

The weighted multivalued image in FIG. 4 that is formed by the pixel conversion processing unit 201, is such that when the subtracted pixel A to be gradated is, as illustrated in FIG. 45, disposed in coordinates (n, m), the gradation processing unit 202A counts the number of white pixels from four reference pixels, i.e., a reference pixel e so disposed in coordinates (n+1, m−1) as to be adjacent right upward thereto in the Figure, a reference pixel f disposed in coordinates (n+1, m+1) adjacent right downward thereto in the Figure, a reference pixel g disposed in coordinates (n−1, m+1) adjacent left downward thereto in the Figure, and a reference pixel h disposed in coordinates (n−1, m−1) adjacent left upward thereto in the Figure. Then, the gradation processing unit 202A subtracts the counted number of white pixels from the pixel value of the above subtracted pixel A. That is, in the case of the pixel in coordinates (1, 1) in FIG. 4, the white pixels are three pixels having coordinates (2, 0), (0, 2) and (0, 0) among the reference pixels a–d, and therefore, from a result of 5−3=2, the pixel value of the gradation pixel in the coordinates (1, 1) becomes "2".

The half-tone image containing a half-tone as depicted in FIG. 16 is formed by thus gradating the respective black pixels in FIG. 4.

The thus formed half-tone image is provided with gradations, e.g., density gradations corresponding to the pixel values and then outputted by the image outputting device 203. FIG. 17 shows one example of outputting, wherein, for example, the pixels having the pixel values "4" are expressed in 100% black, the pixels having the pixel values "3" are in 66% black, the pixels having the pixel values "2" are in 33% black, and the pixels having the pixel values "0" are in 0% black (i.e., white).

With this arrangement also, the primary binary image is converted into the multivalued image with the black pixels weighted, and it is possible to adjust the gradations by controlling the black levels of the black pixels in accordance with the number of white pixels existing along the peripheries of the multivalued pixels. It is also feasible to effectively smooth the boundary between the image and the background portion.

Embodiment 15

Figure 46:
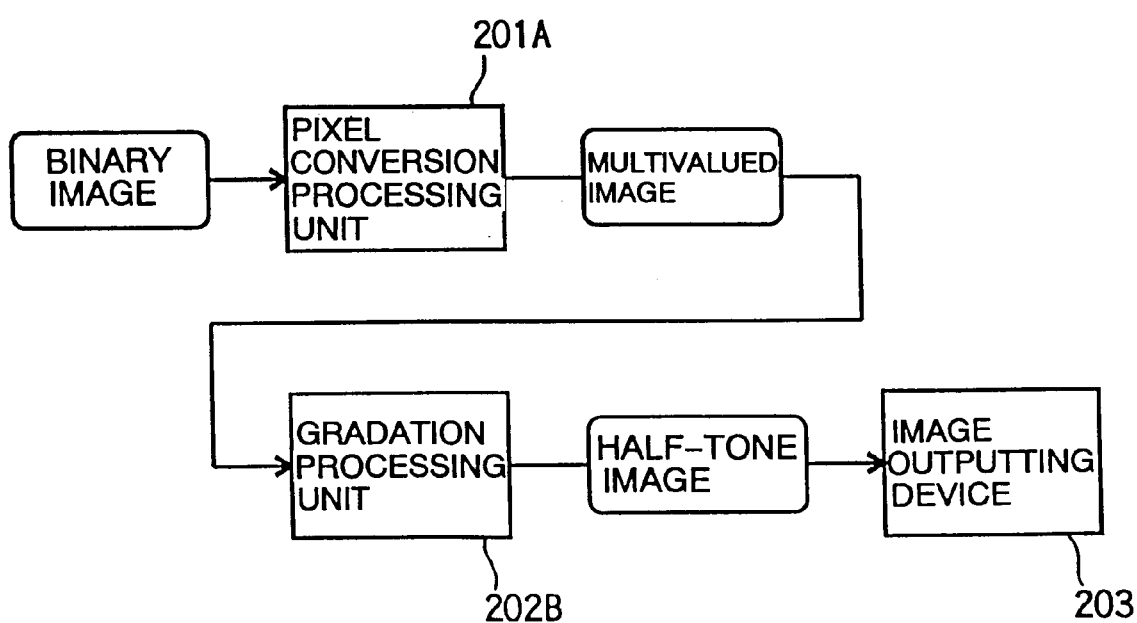
FIG. 46 is a block diagram showing a system construction of the image half-tone processor in a fifteenth embodiment of the present invention.

FIG. 46 illustrates a construction of the image half-tone processor in a fifteenth embodiment of the present invention. The image half-tone processor shown in FIG. 46 is constructed of the same image outputting device 203 as the device in FIG. 42, and, in addition, a pixel conversion processing unit 201A and a gradation processing unit 202B that are slightly different from the pixel conversion processing unit 201 and the gradation processing unit 202A in FIG. 44.

That is, the pixel conversion processing unit 201A executes a multivalued processing on the weighting basis upon each of the pixels constituting the primary binary image, thereby obtaining a multivalued image. A specific weighting process by this pixel conversion processing unit 201A is that, for instance, "0" is, as it is, allocated to the white pixel, while the black pixel is allocated with a value of "9" in this case, which is larger than "1", with respect to the binary image consisting of binary numbers of "0" and "1", wherein white pixels are set to "0", and the black pixels are set to "1".

The gradation processing unit 202B performs processes substantially equal to those by the upper-shift inverting unit 12, the lower-shift inverting unit 13, the right-shift inverting unit 14, the left-shift inverting unit 15, the left-upper-shift inverting unit 17, the left-lower-shift inverting unit 18, the right-upper-shift inverting unit 19, the right-lower-shift inverting unit 20, and the gradation processing unit 22, which are shown in FIG. 18. More specifically, the gradation processing unit 202B forms a half-tone image, wherein the gradation pixels of the relevant pixels are values obtained by subtracting the number of white pixels existing in the pixels adjacent upward, downward, leftward, rightward, left upward, left downward, right upward and right downward to the black pixels of the above multivalued image multivalued by the pixel conversion processing unit 201A, from the pixel values of the weighted black pixels. The subtracting process on each of the black pixels is effected on all the pixels of the given multivalued image.

The image outputting device 203 is classified as the display or the printer for outputting the half-tone image formed by the gradation processing unit 202B while giving it the multi-gradation expression, and is, it is assumed, e.g., the display such as the liquid crystal display in this case.

Next, one example of the operation of the image half-tone processor illustrated in FIG. 46 will be specifically explained with reference to FIG. 46.

The primary binary image inputted to the pixel conversion processing unit 201A is composed of the white and black pixels as depicted in FIG. 3 in such a way that, for instance, the white pixels are set to the pixel values "0", while the black pixels are set to pixel values "1".

The primary binary image in FIG. 3 is converted by the pixel conversion processing unit 201 into the weighted multivalued image as shown in FIG. 19 by setting the pixel value of the white pixel to "0" as it is and by weighting the pixel value of the black pixel having the pixel value "1", with "9".

Figure 47:
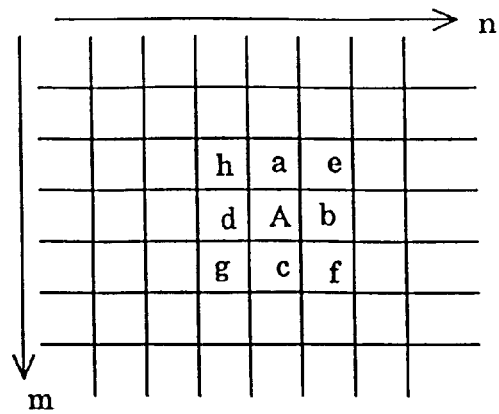
FIG. 47 is a schematic diagram showing the image data for explaining the operation in the image processing unit in FIG. 46.

The weighted multivalued image in FIG. 19 that is formed by the pixel conversion processing unit 201A, is such that when the subtracted pixel A to be gradated is, as illustrated in FIG. 47, disposed in coordinates (n, m), the gradation processing unit 202B counts the number of white pixels from eight reference pixels, i.e., the reference pixel a disposed In the coordinates (n, m−1) adjacent to upward thereto, the reference pixel b disposed in the coordinates (n+1, m) adjacent rightward thereto in the Figure, the reference pixel c disposed in the coordinates (m, m+1) adjacent downward thereto in the Figure, the reference pixel d disposed in the coordinates (n=1, m) adjacent leftward thereto in the Figure, the reference pixel e disposed in coordinates (n+1, m−1) adjacent right upward thereto in the Figure, the reference pixel f disposed in coordinates (n+1, m+1) adjacent right downward thereto in the Figure, the reference pixel g disposed in coordinates (n−1, m+1) adjacent left downward thereto in the Figure, and the reference pixel h disposed in coordinates (n−1, m−1) adjacent left upward thereto in the Figure. Then, the gradation processing unit 202B subtracts the counted number of white pixels from the pixel value of the above subtracted pixel A. That is, in the case of the pixel in coordinates (1, 1) in FIG. 19, the white pixels are six pixels having coordinates (1, 0), (1, 2), (0, 1) (2, 0), (0, 2) and (0, 0) among the reference pixels a–h, and therefore, from a result of 9−6=3, the pixel value of the gradation pixel in the coordinates (1, 1) becomes "3".

The half-tone image containing a half-tone as depicted in FIG. 20 is formed by thus gradating the respective black pixels in FIG. 19.

The thus formed half-tone image is provided with gradations, e.g., density gradations corresponding to the pixel values and then outputted by the image outputting device 203. FIG. 21 shows one example of outputting, wherein, for example, the pixels having the pixel values "8" are expressed in 100% black, the pixels having the pixel values "7" are in 80% black, the pixels having the pixel values "6" are in 64% black, the pixels having the pixel values "5" are in 48%, the pixels having the pixel values "4" are in 32% black, the pixels having the pixel values "3" are in 16% black, and the pixels having the pixel values "0" are in 0% black (i.e., white).

Embodiment 16

Figure 48:
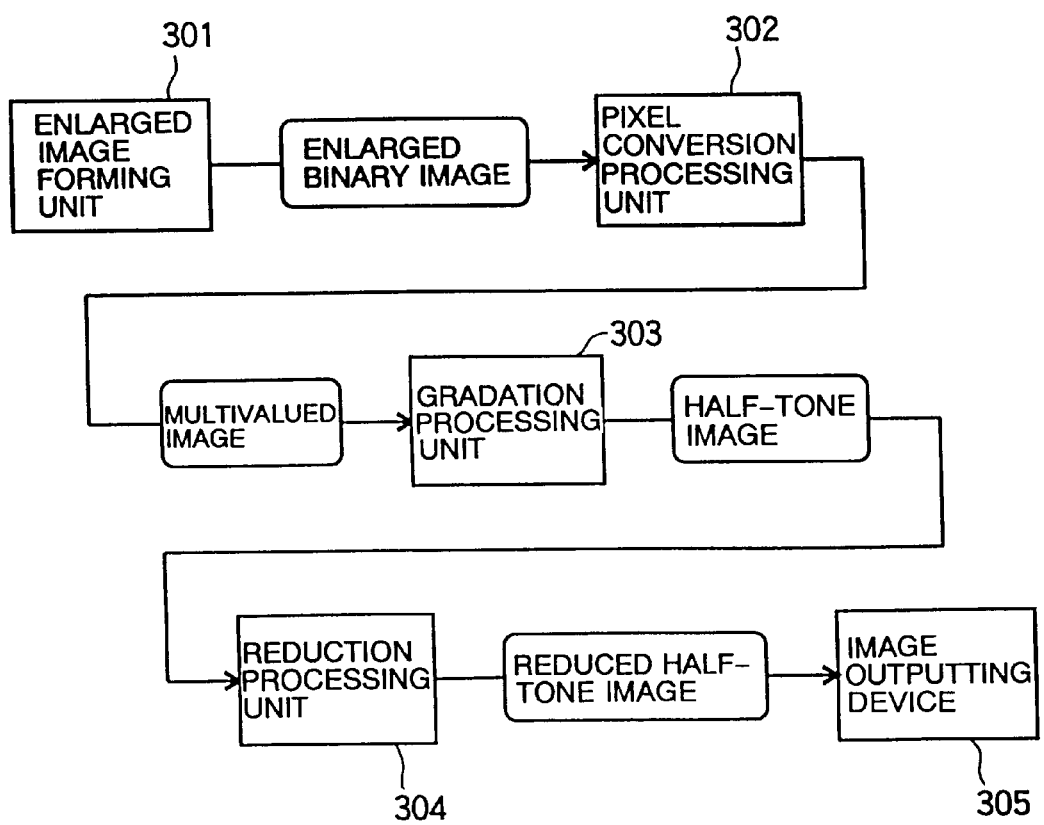
FIG. 48 is a diagram showing a system construction of the image half-tone processor in a sixteenth embodiment of the present invention.

FIG. 48 illustrates a construction of the image half-tone processor in a sixteenth embodiment of the present invention. The image half-tone processor shown in FIG. 48 is constructed of an enlarged image forming unit 301, a pixel conversion processing unit 302, a gradation processing unit 303, a reduction processing unit 304 and an image outputting device 305.

The enlarged image forming unit 301 outputs an enlarged binary image that is (x×y) times, e.g., (2×2) times as large as a desired output size. This enlarged binary image is defined as an image of, e.g., a character font, etc., and the enlarged image forming unit 301 forms, as in the case of a font generator of a so-called outline font, such an image that a pixel resolution, viz., the dot density does not decrease due to the enlargement.

The pixel conversion processing unit 302 functions substantially the same as the pixel conversion processing unit 201 illustrated in FIG. 42, and executes the multivalued processing on the weighting basis upon each of the pixels constituting the enlarged binary image, thereby obtaining a multivalued image. A specific weighting process by this pixel conversion processing unit 302 is that, for example, with a white pixel set to "0" and a black pixel set to "1"; "0" is, as it is, allocated to the white pixel, while the black pixel is allocated with a value of "5" in this case, which is larger than "1", with respect to the binary image consisting of those binary numbers, i.e., "0" and "1".

The gradation processing unit 303 functions substantially the same as the gradation processing unit 202 shown in FIG. 42, and forms a half-tone image, wherein the gradation pixels of the relevant pixels are values obtained by subtracting the number of white pixels existing in the pixels adjacent upward, downward, leftward, rightward to the black pixels of the above multivalued image multivalued by the pixel conversion processing unit 302, from the pixel values of the weighted black pixels. The subtracting process on each of the black pixels is effected on all the pixels of the given multivalued image.

The reduction processing unit 304 reduces the half-tone image gradated by the gradation processing unit 303 by a factor of (1/x)×(1/y), in this case, (½)×(½) corresponding to a factor of enlargement of the enlarged image forming unit 301, thus forming a reduced half-tone image.

The image outputting device 305 is classified as the display or the printer for outputting the reduced half-tone image formed by the reduction processing unit 304 while giving it a multi-gradation expression, and is, it is assumed, e.g., the display such as the liquid crystal display.

Next, one example of the operation of the image half-tone processor illustrated in FIG. 48 will be specifically explained with reference to FIG. 43.

The enlarged image forming unit 301 provides the pixel conversion processing unit 302 with the binary image consisting of the white and black pixels as shown in FIG. 3 as a (2×2)-fold enlarged binary image in this case. The above enlarged binary image is composed of the white and black pixels as shown in FIG. 3, and is expressed in such a way that, for instance, the white pixels are set to the pixel values "0", while the black pixels are set to pixel values "1".

The enlarged binary image in FIG. 3 is converted by the pixel conversion processing unit 302 into the weighted multivalued image as shown in FIG. 4 by setting the pixel value of the white pixel to "0" as it is and by weighting the pixel value of the black pixel having the pixel value "1", with "5".

The weighted multivalued image in FIG. 4 that is formed by the pixel conversion processing unit 302, is such that when the subtracted pixel A to be gradated is, as illustrated in FIG. 43, disposed in coordinates (n, m), the gradation processing unit 303 counts the number of white pixels from four reference pixels, i.e., the reference pixel a disposed in coordinates (n, m−1) adjacent upward thereto in the Figure, the reference pixel b disposed in coordinates (n+1, m) adjacent rightward thereto in the Figure, the reference pixel c disposed in coordinates (n, m+1) adjacent downward thereto in the Figure, and the reference pixel d disposed in coordinates (n−1, m) adjacent leftward thereto in the Figure. Then, the gradation processing unit 303 subtracts the counted number of white pixels from the pixel value of the above subtracted pixel A. That is, in the case of the pixel in coordinates (1, 1) in FIG. 4, the white pixels are three pixels having coordinates (1, 0), (1, 2) and (0, 1) among the reference pixels a–d, and therefore, from a result of 5−3=2, the pixel value of the gradation pixel in the coordinates (1, 1) becomes "2".

The half-tone image containing a half-tone as depicted in FIG. 9 is formed by thus gradating the respective black pixels in FIG. 4.

The thus formed half-tone image is supplied to the reduction processing unit 304 and then reduced by a factor of (½)×(½), thereby obtaining the reduced half-tone image as illustrated in FIG. 27. This reduction processing unit 304 performs the reduction by the factor of (½)×(½) by taking an average value for every (2×2) dots with respect to the previous half-tone image shown in FIG. 9 and setting it as a pixel value.

This reduced half-tone image is provided with gradations, e.g., density gradations corresponding to the pixel values and then outputted by the image outputting device 305. FIG. 28 shows one example of outputting, wherein, for example, the pixels having the pixel values "4" are expressed in 100% black, the pixels having the pixel values "3" are in 75% black, the pixels having the pixel values "2" are in 50% black, the pixels having the pixel values "1" are in 25% black, and the pixels having the pixel values "0" are in 0% black (i.e., white).

With this arrangement, the whole outline is smoothed at a high accuracy in terms of a visual aspect, and this makes it feasible to provide an easy-to-see display or print with a high visual recognizability.

Embodiment 17

Figure 49:
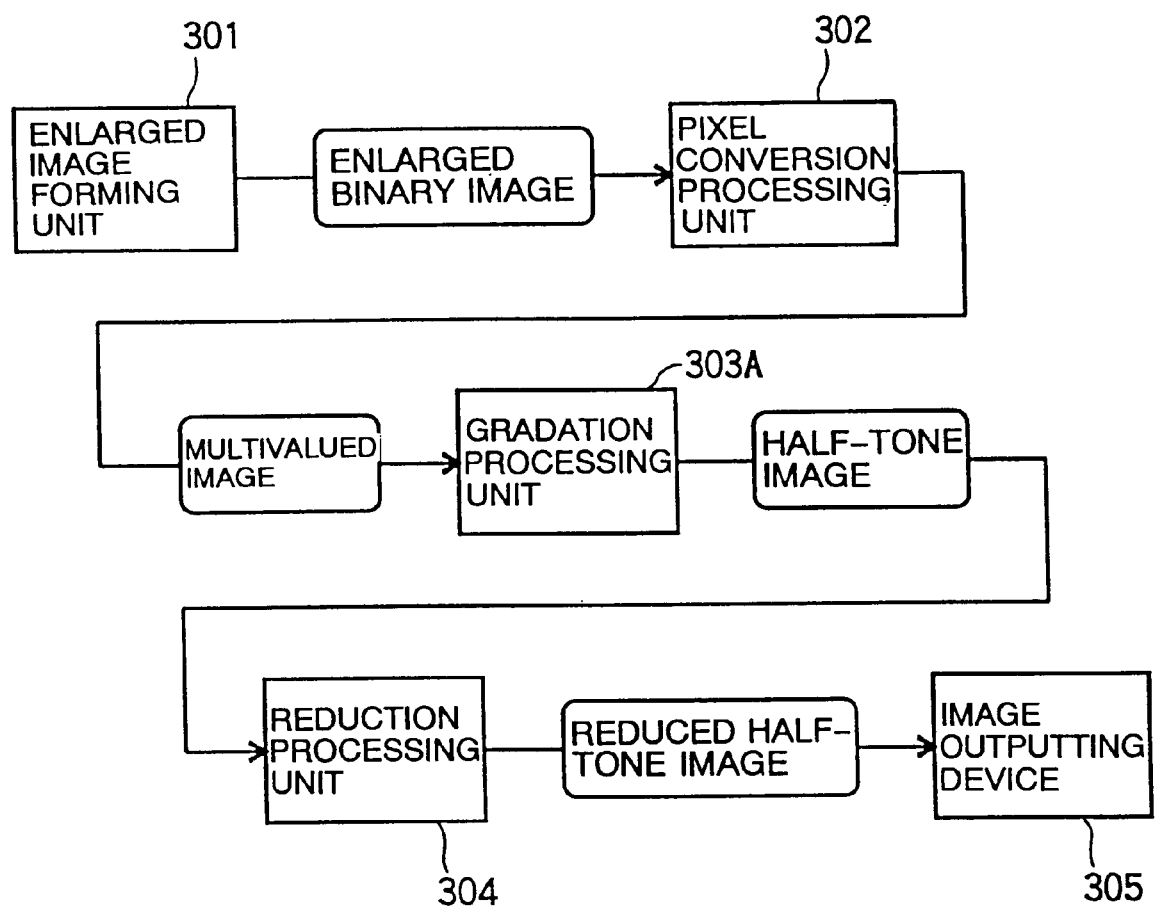
FIG. 49 is a block diagram showing a system construction of the image half-tone processor in a seventeenth embodiment of the present invention.

FIG. 49 illustrates a construction of the image half-tone processor in a seventeenth embodiment of the present invention. The image half-tone processor shown in FIG. 49 is constructed of the same enlarged image forming unit 301, the pixel conversion processing unit 302, the reduction processing unit 304 and the image outputting device 305 that are the same as those in FIG. 48, and, in addition, a gradation processing unit 303A slightly different from the gradation processing unit 303 in FIG. 48.

The enlarged image forming unit 301 outputs an enlarged binary image that is (x×y) times, e.g., (2×2) times as large as a desired output size.

The pixel conversion processing unit 302 executes the multivalued processing on the weighting basis upon each of the pixels constituting the enlarged binary image, thereby obtaining a multivalued image. A specific weighting process by this pixel conversion processing unit 302 is that, for example, with a white pixel set to "0" and a black pixel set to "1", "0" is, as it is, allocated to the white pixel, while the black pixel is allocated with a value of "5" in this case, which is larger than "1", with respect to the binary image consisting of those binary numbers, i.e., "0" and "1".

The gradation processing unit 303A forms a half-tone image, wherein the gradation pixels of the relevant pixels are values obtained by subtracting the number of white pixels existing in the pixels adjacent left upward, left downward, right upward, and right downward to the black pixels of the above multivalued image multivalued by the pixel conversion processing unit 302, from the pixel values of the weighted black pixels. The subtracting process on each of the black pixels is effected on all the pixels of the given multivalued image.

The reduction processing unit 304 reduces the half-tone image gradated by the gradation processing unit 303A by a factor of (1/x)×(1/y), in this case, (½)×(½) corresponding to a factor of enlargement of the enlarged image forming unit 301, thus forming a reduced half-tone image.

The image outputting device 305 outputs the half-tone image formed by the reduction processing unit 304 while giving it a multi-gradation expression.

Next, one example of the operation of the image half-tone processor illustrated in FIG. 49 will be specifically explained with reference to FIG. 45.

The enlarged image forming unit 301 provides the pixel conversion processing unit 302 with the binary image consisting of the white and black pixels as shown in FIG. 3 as a (2×2)-fold enlarged binary image in this case. The above enlarged binary image is, as shown in FIG. 3, composed of the white and black pixels, and is expressed in such a way that, for instance, the white pixels are set to the pixel values "0", while the black pixels are set to pixel values "1".

The enlarged binary image in FIG. 3 is converted by the pixel conversion processing unit 302 into the weighted multivalued image as shown in FIG. 4 by setting the pixel value of the white pixel to "0" as it is and by weighting the pixel value of the black pixel having the pixel value "1", with "5".

The weighted multivalued image in FIG. 4 that is formed by the pixel conversion processing unit 302, is such that when the subtracted pixel A to be gradated is, as illustrated in FIG. 45, disposed in coordinates (n, m), the gradation processing unit 303A counts the number of white pixels from four reference pixels, i.e., the reference pixel e disposed in coordinates (n+1, m−1) adjacent right upward thereto in the Figure, the reference pixel f disposed in coordinates (n+1, m+1) adjacent right downward thereto in the Figure, the reference pixel g disposed in coordinates (n−1, m+1),adjacent left downward thereto in the Figure, and the reference pixel h disposed in coordinates (n−1, m−1) adjacent left upward thereto in the Figure. Then, the gradation processing unit 303A subtracts the counted number of white pixels from the pixel value of the above subtracted pixel A. That is, in the case of the pixel in coordinates (1, 1) in FIG. 4, the white pixels are three pixels having coordinates (2, 0), (0, 2) and (0, 0) among the reference pixels a–d, and therefore, from a result of 5−3=2, the pixel value of the gradation pixel in the coordinates (1, 1) becomes "2".

The half-tone image containing a half-tone as depicted in FIG. 16 is formed by thus gradating the respective black pixels in FIG. 4.

The thus formed half-tone image is supplied to the reduction processing unit 304 and then reduced by a factor of (½)×(½), thereby obtaining the reduced half-tone image as illustrated in FIG. 30. This reduction processing unit 304 performs the reduction by the factor of (½)×(½) by taking an average value for every (2×2) dots with respect to the previous half-tone image shown in FIG. 16 and setting it as a pixel value.

This reduced half-tone image is provided with gradations, e.g., density gradations corresponding to the pixel values and then outputted by the image outputting device 305. FIG. 31 shows one example of outputting, wherein, for example, the pixels having the pixel values "4" are expressed in 100% black, the pixels having the pixel values "3" are in 75% black, the pixels having the pixel values "2" are in 50% black, the pixels having the pixel values "1" are in 25% black, and the pixels having the pixel values "0" are in 0% black (i.e., white).

With this arrangement also, the whole outline is smoothed at a high accuracy in terms of a visual aspect, and this makes it feasible to provide an easy-to-see display or print with a high visual recognizability.

Embodiment 18

Figure 50:
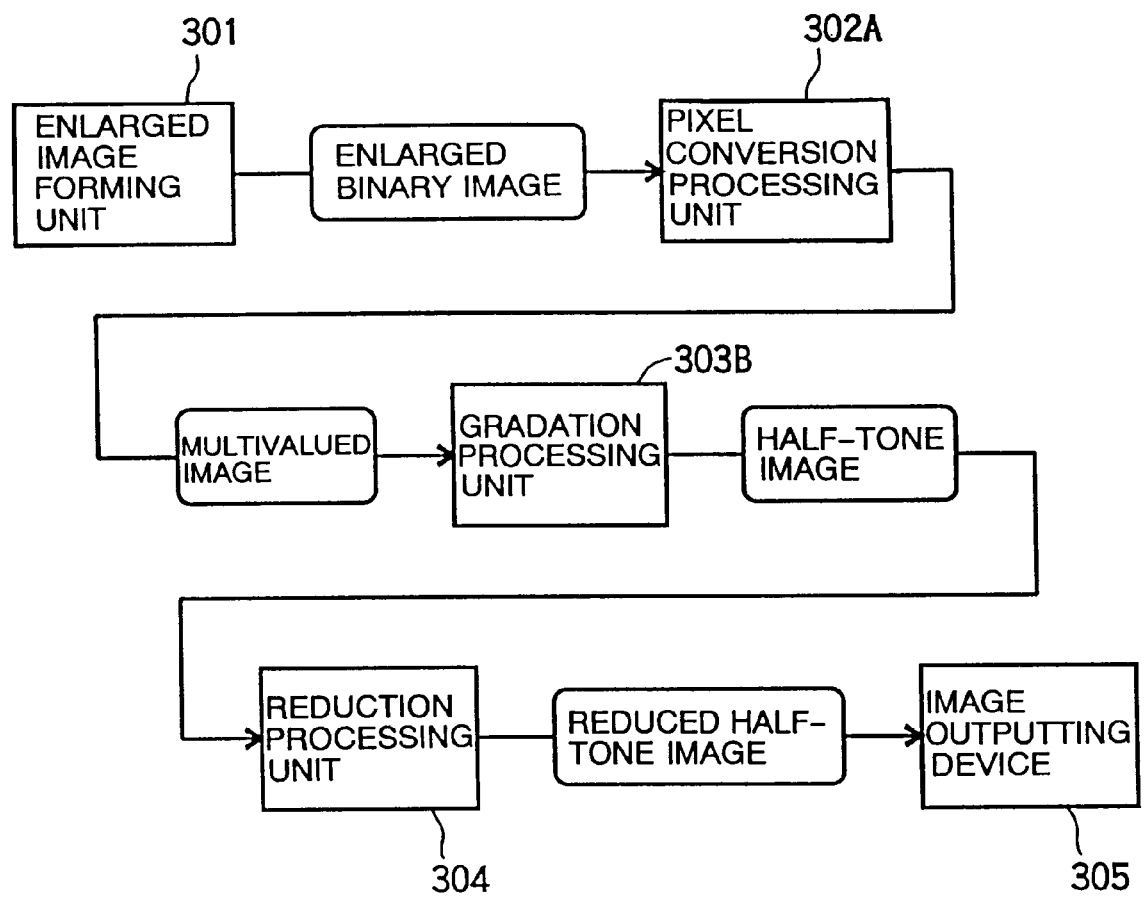
FIG. 50 is a block diagram showing a system construction of the image half-tone processor in an eighteenth embodiment of the present invention.

FIG. 50 illustrates a construction of the image half-tone processor in an eighteenth embodiment of the present invention. The image half-tone processor shown in FIG. 50 is constructed of the enlarged image forming unit 301, the reduction processing unit 304 and the image outputting device 305 that are the same as those in FIG. 48, and, in addition, a pixel conversion processing unit 302A and a gradation processing unit 303B that are slightly different from the pixel conversion processing unit 302 and the gradation processing unit 303 in FIG. 48.

The enlarged image forming unit 301 outputs an enlarged binary image that is (x×y) times, e.g., (2×2) times as large as a desired output size.

The pixel conversion processing unit 302A executes the multivalued processing on the weighting basis upon each of the pixels constituting the enlarged binary image, thereby obtaining a multivalued image. A specific weighting process by this pixel conversion processing unit 302A is that, for example, with a white pixel set to "0" and a black pixel set to "1", "0" is, as it is, allocated to the white pixel, while the black pixel is allocated with a value of "9" in this case, which is larger than "1", with respect to the binary image consisting of those binary numbers, i.e., "0" and "1".

The gradation processing unit 303B forms a half-tone image, wherein the gradation pixels of the relevant pixels are values obtained by subtracting the number of white pixels existing in the pixels adjacent upward, downward, leftward, rightward, left upward,. left downward, right upward and right downward to the black pixels of the above multivalued image multivalued by the pixel conversion processing unit 302A, from the pixel values of the weighted black pixels. The subtracting process on each of the black pixels is effected on all the pixels of the given multivalued image.

The reduction processing unit 304 reduces the half-tone image gradated by the gradation processing unit 303B by a factor of (1/x)×(1/y), in this case, (½)×(½) corresponding to a factor of enlargement of the enlarged image forming unit 301, thus forming a reduced half-tone image.

The image outputting device 305 outputs the reduced half-tone image formed by the reduction processing unit 304 while giving it a multi-gradation expression.

Next, one example of the operation of the image half-tone processor illustrated in FIG. 50 will be specifically explained with reference to FIG. 47.

The enlarged image forming unit 301 provides the pixel conversion processing unit 302A with the binary image consisting of the white and black pixels as shown in FIG. 3 as a (2×2)-fold enlarged binary image in this case. The above enlarged binary image is composed of the white and black pixels as illustrated in FIG. 3, and is expressed in such a way that, for instance, the white pixels are set to the pixel values "0", while the black pixels are set to pixel values "1".

The enlarged binary image in FIG. 3 is converted by the pixel conversion processing unit 302A into the weighted multivalued image as shown in FIG. 19 by setting the pixel value of the white pixel to "0" as it is and by weighting the pixel value of the black pixel having the pixel value "1", with "9".

The weighted multivalued image in FIG. 19 that is formed by the pixel conversion processing unit 302A, is such that when the subtracted pixel A to be gradated is, as illustrated in FIG. 47, disposed in coordinates (n, m), the gradation processing unit 303B counts the number of white pixels from eight reference pixels, i.e., the reference pixel a disposed in coordinates (n, m−1) adjacent upward thereto in the Figure, the reference pixel b disposed in coordinates (n+1, m) adjacent rightward thereto in the Figure, the reference pixel c disposed in coordinates (n, m+1) adjacent downward thereto in the Figure, the reference pixel d disposed in coordinates (n−1, m) adjacent leftward thereto in the Figure, the reference pixel e disposed in coordinates (n+1, m−1) adjacent right upward thereto in the Figure, the reference pixel f disposed in coordinates (n+1, m+1) adjacent right downward thereto in the Figure, the reference pixel g disposed in coordinates (n−1, m+1) adjacent left downward thereto in the Figure, and the reference pixel h disposed in coordinates (n−1, m−1) adjacent left upward thereto in the Figure. Then, the gradation processing unit 303B subtracts the counted number of white pixels from the pixel value of the above subtracted pixel A. That is, in the case of the pixel in coordinates (1, 1) in FIG. 19, the white pixels are six pixels having coordinates (1, 0), (1, 2), (0, 1), (2, 0), (0, 2) and (0, 0) among the reference pixels a–h, and therefore, from a result of 9−6=3, the pixel value of the gradation pixel in the coordinates (1, 1) becomes "3".

The half-tone image containing a half-tone as depicted in FIG. 20 is formed by thus gradating the respective black pixels in FIG. 19.

The thus formed half-tone image is supplied to the reduction processing unit 304 and then reduced by a factor of (½)×(½), thereby obtaining the reduced half-tone image as illustrated in FIG. 33. This reduction processing unit 304 performs the reduction by the factor of (½)×(½) by taking an average value for every (2×2) dots with respect to the previous half-tone image shown in FIG. 20 and setting it as a pixel value.

This reduced half-tone image is provided with gradations, e.g., density gradations corresponding to the pixel values and then outputted by the image outputting device 305. FIG. 34 shows one example of outputting, wherein, for example, the pixels having the pixel values "7" are expressed in 100% black, the pixels having the pixel values "5" are in 80% black, the pixels having the pixel values "4" are in 60% black, the pixels having the pixel values "3" are in 50% black, the pixels having the pixel values "2" are in 40% black, the pixels having the pixel values "1" are in 20% black, and the pixels having the pixel values "0" are in 0% black (i.e., white).

INDUSTRIAL APPLICABILITY

The present invention is applicable to industrial alliances equipped with computer systems and display devices using displays for displaying characters, etc., livelihood appliances for video games, etc., and portable information appliances including small-sized display units.

What is claimed is:

1. An image half-tone processor comprising:
pixel converting means for weighting each of pixels of a primary binary image, and converting the primary binary image into a multivalued image consisting of weighted pixel values;
shift inversion processing means for forming respectively a plurality of shift-inverted images into which the primary binary image is inverted and shifted in a plurality of peripheral directions corresponding to a pixel array of the primary binary image;
gradation processing means for forming a half-tone image on the basis of the multivalued image obtained by said pixel converting means and the plurality of shift-inverted images obtained by said shift inversion processing means; and image outputting means for outputting the half-tone image formed by said gradation processing means.

2. An image half-tone processor according to claim 1, wherein said shift inversion processing means forms respectively four shift-inverted images into which the primary binary image is inverted and shifted in upper-, lower-, left- and right-directions, and said gradation processing means forms a half-tone image on the basis of the multivalued image obtained by said pixel converting means and the four shift-inverted images obtained by said shift inversion processing means.

3. An image half-tone processor according to claim 1, wherein said shift inversion processing means forms respectively four shift-inverted images into which the primary binary image is inverted and shifted in left-upper-, left-lower-, right-upper- and right-lower-directions, and said gradation processing means forms a half-tone image on the basis of the multivalued image obtained by said pixel converting means and the four shift-inverted images obtained by said shift inversion processing means.

4. An image half-tone processor according to claim 1, wherein said shift inversion processing means forms respectively eight shift-inverted images into which the primary binary image is inverted and shifted in upper-, lower-, left-, right-, left-upper-, left-lower-, right-upper- and right-lower-directions, and said gradation processing means forms a half-tone image on the basis of the multivalued image obtained by said pixel converting means and the eight shift-inverted images obtained by said shift inversion processing means.

5. An image half-tone processor according to claim 2, wherein said gradation processing means additionally synthesizes the multivalued image obtained by said pixel converting means and the plurality of shift-inverted images obtained by said shift inversion processing means per pixel corresponding to the multivalued image.

6. An image half-tone processor comprising:

pixel converting means for weighting each of pixels of a primary binary image, and converting the primary binary image into a multivalued image consisting of weighted pixel values;

shift processing means for forming respectively a plurality of shifted images shifted in a plurality of peripheral directions corresponding to a pixel array thereof;

gradation processing means for forming a half-tone image on the basis of the multivalued image obtained by said pixel converting means and the plurality of shifted images obtained by said shift processing means; and image outputting means for outputting the half-tone image formed by said gradation processing means.

7. An image half-tone processor according to claim 6, wherein said shift processing means forms respectively four shifted images into which the primary binary image is shifted in upper-, lower-, left- and right-directions, and said gradation processing means forms a half-tone image on the basis of the multivalued image obtained by said pixel converting means and the four shifted images obtained by said shift processing means.

8. An image half-tone processor according to claim 6, wherein said shift processing means forms respectively four shifted images into which the primary binary image is shifted in left-upper-, left-lower-, right-upper- and right-lower-directions, and said gradation processing means forms a half-tone image on the basis of the multivalued image obtained by said pixel converting means and the four shifted images obtained by said shift processing means.

9. An image half-tone processor according to claim 6, wherein said shift processing means forms respectively eight shifted images into which the primary binary image is shifted in upper-, lower-, left-, right-, left-upper-, left-lower-, right-upper- and right-lower-directions, and said gradation processing means forms a half-tone image on the basis of the multivalued image obtained by said pixel converting means and the eight shifted images obtained by said shift processing means.

10. An image half-tone processor according to claim 7, wherein said gradation processing means additionally synthesizes the multivalued image obtained by said pixel converting means and the plurality of shifted images obtained by said shift processing means per pixel corresponding to the multivalued image.

11. An image half-tone processor comprising:

enlarged image forming means for forming a primary binary image having a size that is (x×y) times as large as a desired output size;

pixel converting means for weighting each of pixels of the primary binary image, and converting the primary binary image into a multivalued image consisting of weighted pixel values;

shift inversion processing means for forming respectively a plurality of shift-inverted images into which the primary binary image is inverted and shifted in a plurality of peripheral directions corresponding to a pixel array thereof;

gradation processing means for forming a half-tone image on the basis of the multivalued image obtained by said pixel converting means and the plurality of shifted images obtained by said shift processing means;

reduction processing means for reducing the half-tone image formed by said gradation processing means down to a size by a factor of $(1/x)\times(1/y)$; and image outputting means for outputting the half-tone image formed by said reduction processing means.

12. An image half-tone processor according to claim 11, wherein said shift inversion processing means forms respectively four shift-inverted images into which the primary binary image is inverted and shifted in upper-, lower-, left- and right-directions, and said gradation processing means forms a half-tone image on the basis of the multivalued image obtained by said pixel converting means and the four shift-inverted images obtained by said shift inversion processing means.

13. An image half-tone processor according to claim 11, wherein said shift inversion processing means forms respectively four shift-inverted images into which the primary binary image is inverted and shifted in left-upper-, left-lower-, right-upper- and right-lower-directions, and said gradation processing means forms a half-tone image on the basis of the multivalued image obtained by said pixel converting means and the four shift-inverted images obtained by said shift inversion processing means.

14. An image half-tone processor according to claim 11, wherein said shift inversion processing means forms respectively eight shift-inverted images into which the primary binary image is inverted and shifted in upper-, lower-, left-, right-, left-upper-, left-lower-, right-upper- and right-lower-directions, and said gradation processing means forms a half-tone image on the basis of the multivalued image obtained by said pixel converting means and the eight shift-inverted images obtained by said shift inversion processing means.

15. An image half-tone processor according to claim 12, wherein said gradation processing means additionally synthesizes the multivalued image obtained by said pixel converting means and the plurality of shift-inverted images obtained by said shift inversion processing means per pixel corresponding to the multivalued image.

16. An image half-tone processor comprising:

enlarged image forming means for forming a primary binary image having a size that is (x×y) times as large as a desired output size;

pixel converting means for weighting each of pixels of the primary binary image, and converting the primary binary image into a multivalued image consisting of weighted pixel values;

shift processing means for forming respectively a plurality of shifted images shifted in a plurality of peripheral directions corresponding to a pixel array thereof;

gradation processing means for forming a half-tone image on the basis of the multivalued image obtained by said pixel converting means and the plurality of shifted images obtained by said shift processing means;

reduction processing means for reducing the half-tone image formed by said gradation processing means down to a size by a factor of (1/x)×(1/y); and image outputting means for outputting the half-tone image formed by said gradation processing means.

17. An image half-tone processor according to claim 16, wherein said shift processing means forms respectively four shifted images into which the primary binary image is shifted in upper-, lower-, left- and right-directions, and said gradation processing means forms a half-tone image on the basis of the multivalued image obtained by said pixel converting means and the four shifted images obtained by said shift processing means.

18. An image half-tone processor according to claim 16, wherein said shift processing means forms respectively four shifted images into which the primary binary image is shifted in left-upper-, left-lower-, right-upper- and right-lower-directions, and said gradation processing means forms a half-tone image on the basis of the multivalued image obtained by said pixel converting means and the four shifted images obtained by said shift processing means.

19. An image half-tone processor according to claim 16, wherein said shift processing means forms respectively eight shifted images into which the primary binary image is shifted in upper-, lower-, left-, right-, left-upper-, left-lower-, right-upper- and right-lower-directions, and said gradation processing means forms a half-tone image on the basis of the multivalued image obtained by said pixel converting means and the eight shifted images obtained by said shift processing means.

20. An image half-tone processor according to claim 17, wherein said gradation processing means additionally synthesizes the multivalued image obtained by said pixel converting means and the plurality of shifted images obtained by said shift processing means per pixel corresponding to the multivalued image.

21. An image half-tone processing method comprising:

a pixel converting step of weighting each of pixels of a primary binary image, and converting the primary binary image into a multivalued image consisting of weighted pixel values;

a shift inversion processing step of forming respectively a plurality of shift-inverted images into which the primary binary image is inverted and shifted in a plurality of peripheral directions corresponding to a pixel array of the primary binary image;

a gradation processing step of forming a half-tone image on the basis of the multivalued image obtained by said pixel converting means and the plurality of shift-inverted images obtained by said shift inversion processing means; and an image outputting step of outputting the half-tone image formed by said gradation processing means.

22. A recording medium stored with:

a pixel converting step of weighting each of pixels of a primary binary image, and converting the primary binary image into a multivalued image consisting of weighted pixel values;

a shift inversion processing step of forming respectively a plurality of shift-inverted images into which the primary binary image is inverted and shifted in a plurality of peripheral directions corresponding to a pixel array of the primary binary image;

a gradation processing step of forming a half-tone image on the basis of the multivalued image obtained by said pixel converting means and the plurality of shift-inverted images obtained by said shift inversion processing means; and an image outputting step of outputting the half-tone image formed by said reduction processing means.

* * * * *